(12) United States Patent
Robinson et al.

(10) Patent No.: US 7,523,215 B1
(45) Date of Patent: Apr. 21, 2009

(54) METHOD AND APPARATUS FOR CONFIGURING DATA TRANSMISSIONS WITHIN A MICRO-AREA NETWORK

(75) Inventors: Moises E. Robinson, Austin, TX (US); Shahriar Rokhsaz, Austin, TX (US); Jinghui Lu, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 1034 days.

(21) Appl. No.: 10/047,195

(22) Filed: Jan. 14, 2002

(51) Int. Cl.
G06F 15/16 (2006.01)
(52) U.S. Cl. .................................. 709/236; 709/235
(58) Field of Classification Search ............... 709/203, 709/227, 228, 230–237, 245–246
See application file for complete search history.

(56) References Cited

U.S. PATENT DOCUMENTS

| | | | |
|---|---|---|---|
| 6,172,981 B1 * | 1/2001 | Cox et al. ................... 370/401 |
| 6,266,345 B1 * | 7/2001 | Huang ........................ 370/468 |
| 6,266,701 B1 * | 7/2001 | Sridhar et al. ............... 709/232 |
| 6,577,229 B1 * | 6/2003 | Bonneau et al. ........... 340/10.41 |
| 6,618,360 B1 * | 9/2003 | Scoville et al. ............. 370/248 |
| 6,912,223 B1 * | 6/2005 | Sloane ........................ 370/401 |
| 6,917,594 B2 * | 7/2005 | Feuerstraeter et al. ...... 370/244 |
| 7,089,320 B1 * | 8/2006 | Biederman et al. ......... 709/234 |
| 7,096,272 B1 * | 8/2006 | Raman ....................... 709/231 |
| 7,165,175 B1 * | 1/2007 | Kollmyer et al. ............ 713/154 |
| 2001/0034209 A1 * | 10/2001 | Tong et al. .................. 455/69 |
| 2003/0093550 A1 * | 5/2003 | Lebizay et al. .............. 709/236 |
| 2003/0110286 A1 * | 6/2003 | Antal et al. ................. 709/236 |
| 2004/0105423 A1 * | 6/2004 | Koehler et al. .............. 370/351 |

* cited by examiner

*Primary Examiner*—Salad Abdullahi
(74) *Attorney, Agent, or Firm*—Timothy W. Markison; Michael T. Wallace

(57) ABSTRACT

A method and apparatus for a transmitting entity within a micro-area network to establish a data transmission within the network includes processing that begins by determining the identity of a target entity within the micro-area network. The processing then continues by determining transmission characteristics of at least one communication path between the transmitting entity and target entity of the micro-area network. The processing then continues by determining a transmission convention based on the transmission characteristics. The processing then continues by providing the transmission convention to the target entity.

47 Claims, 27 Drawing Sheets device 174 - 196 device 238 - 256

| transmission assignments 524 | | |
|---|---|---|
| source | destination | scheme |
| 132-118-104 | 134-118-104 | A |
| 132-118-104 | 136-118-104 | B |
| 132-118-104 | x-130-104 | C |
| 132-118-104 | x-x-106 | D |
| 132-118-104 | x-x-108 | D |
| 132-118-104 | x-x-110 | E |
| 132-118-104 | x-x-112 | E |
| 132-118-104 | x-x-114 | E |
| ... | ... | ... |

FIG. 17

| scheme-resource assignment 526 | | |
|---|---|---|
| scheme | resources | encode/mod/S-P |
| A | 1 path | 1-0-S |
| A | 2 paths | 1-0-P |
| A | 1-OH, 1-PL | 2-1-S |
| ... | ... | ... |
| B | 1 path | 2-0-S |

FIG. 18

| encoding-modulation-serial/parallel table 528 | | | | | |
|---|---|---|---|---|---|
| encode/mod/S-P | OH encoding | payload encoding | OH modulation | payload mod | Serial/Parallel |
| 1-0-S | multi-level | NRZ | none | none | S-Tx of OH and PL |
| 1-0-P | multi-level | NRZ | none | none | P-Tx of OH and PL |
| 2-1-S | multi-level | nB/mB | none | none | OH:path1; PL:path2 |
| 0-1-S | none | NRZ | PPM | mix | S-Tx of OH and PL |
| ... | ... | ... | ... | ... | ... |

FIG. 19

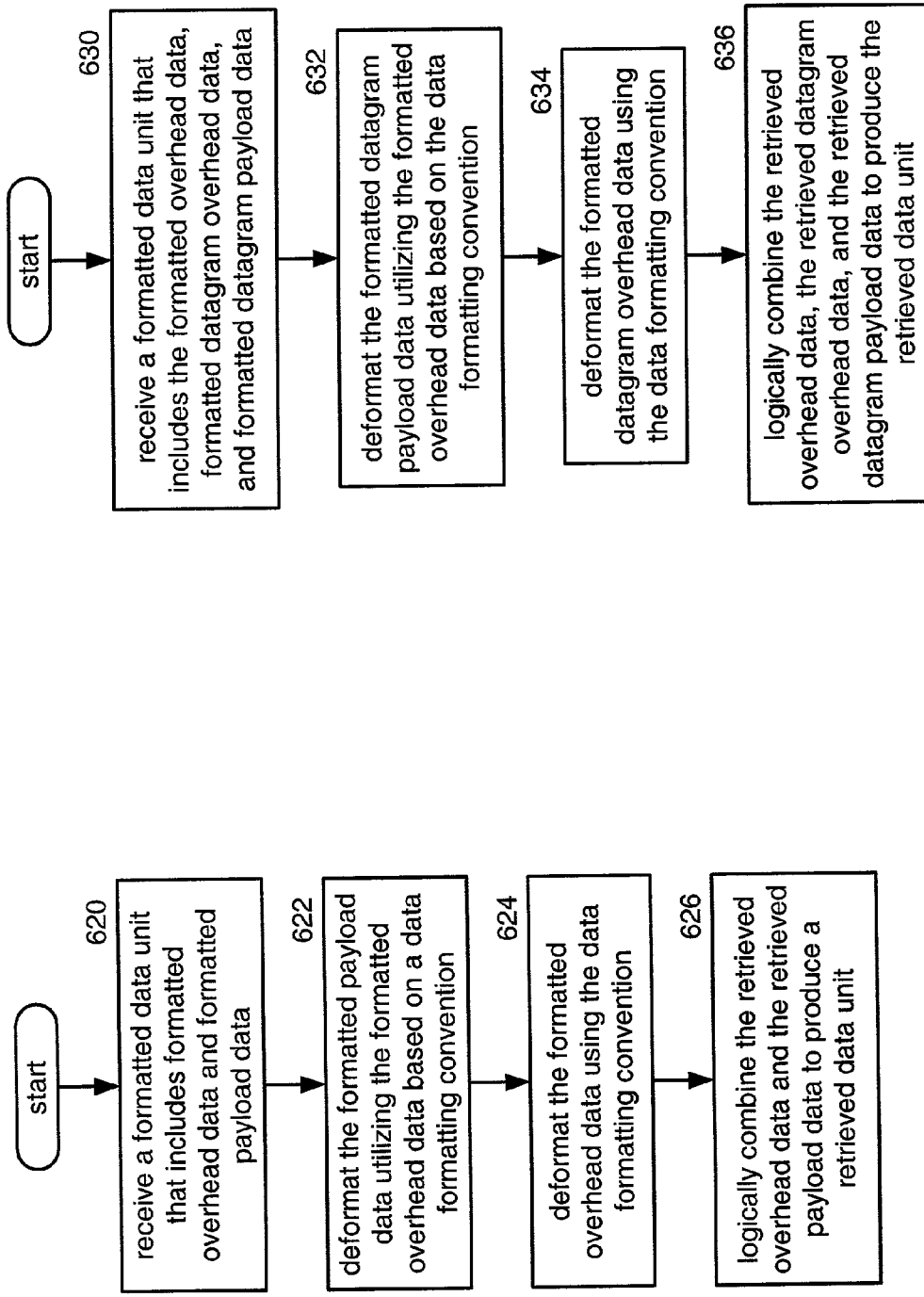

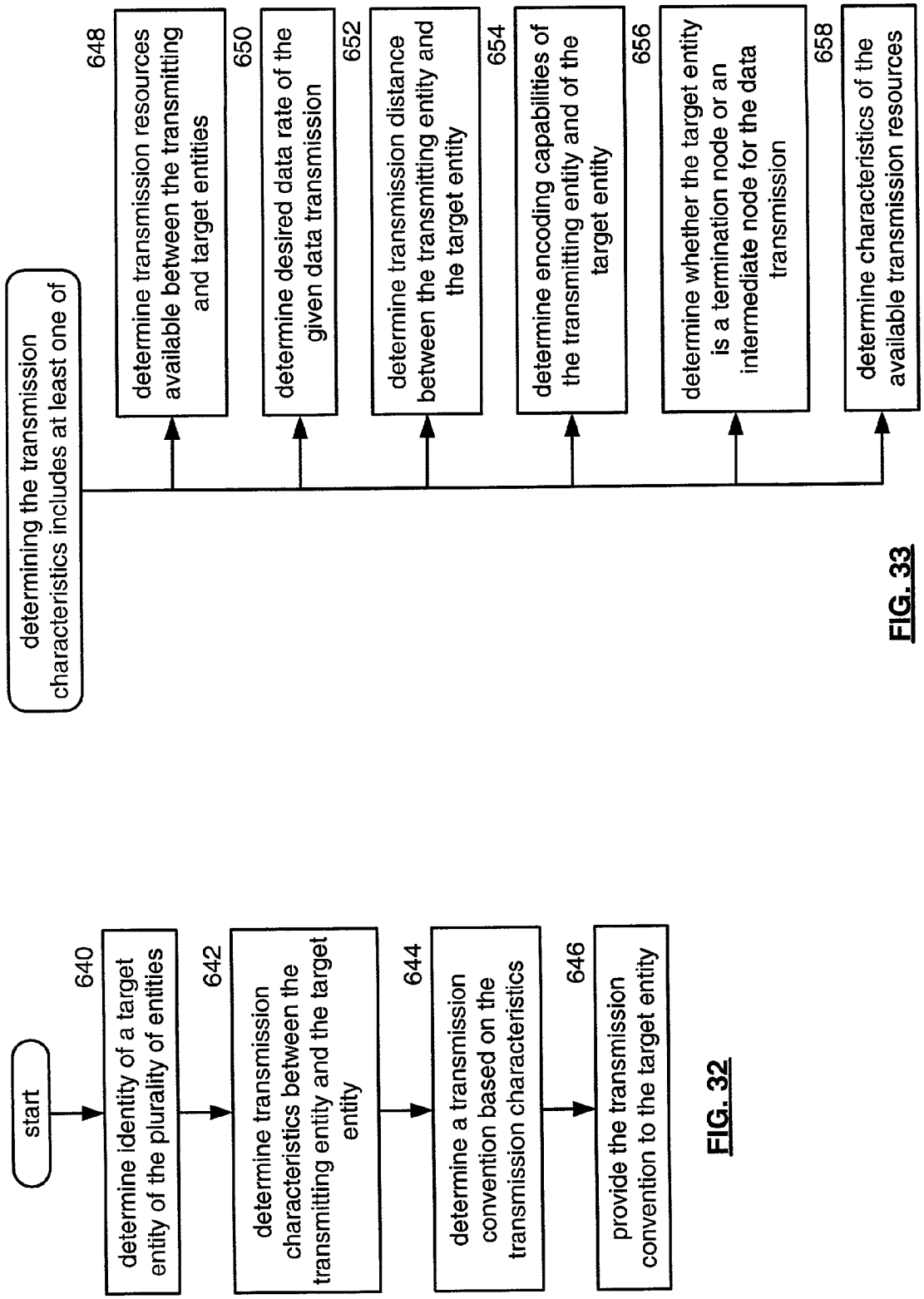

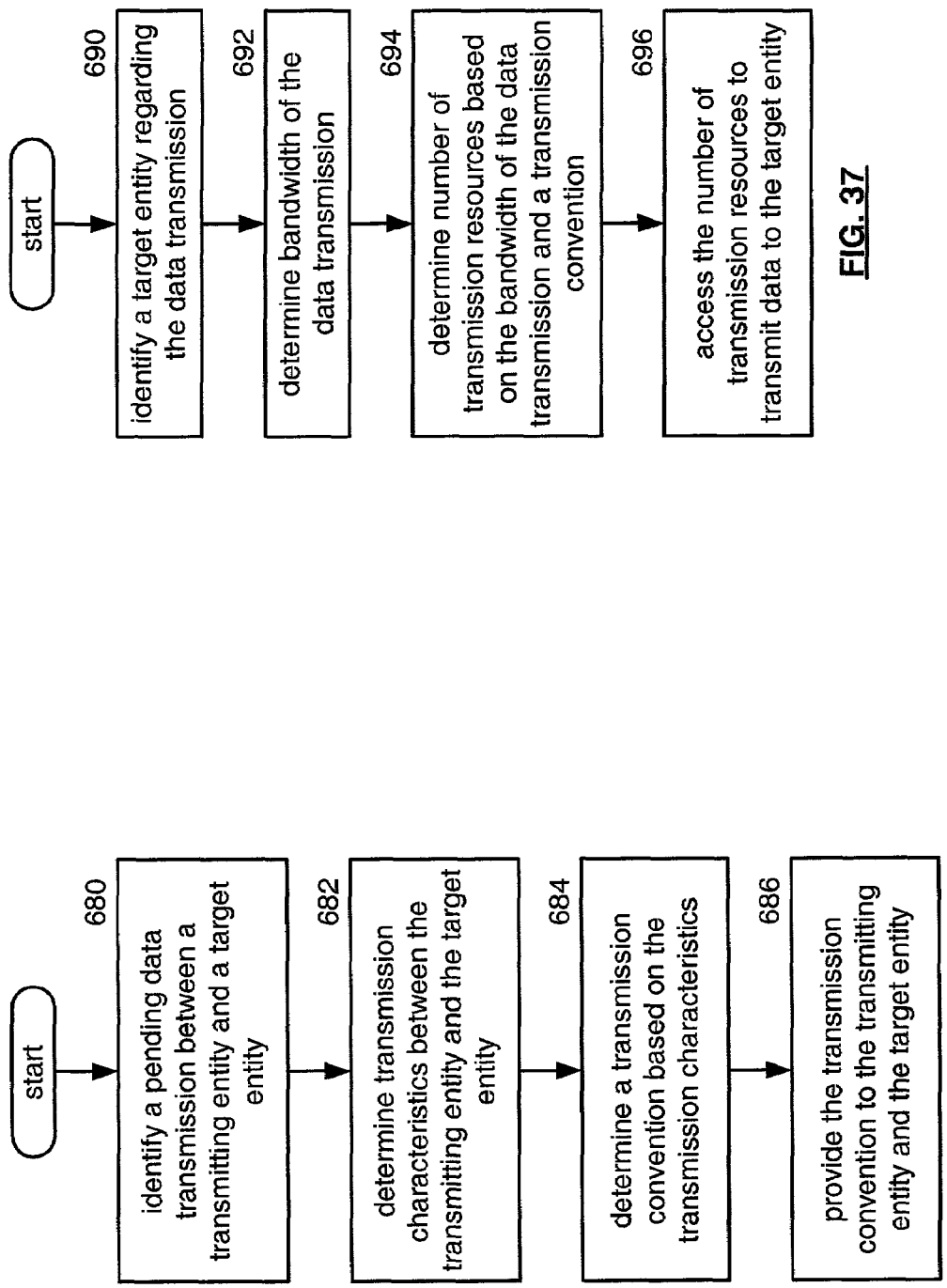

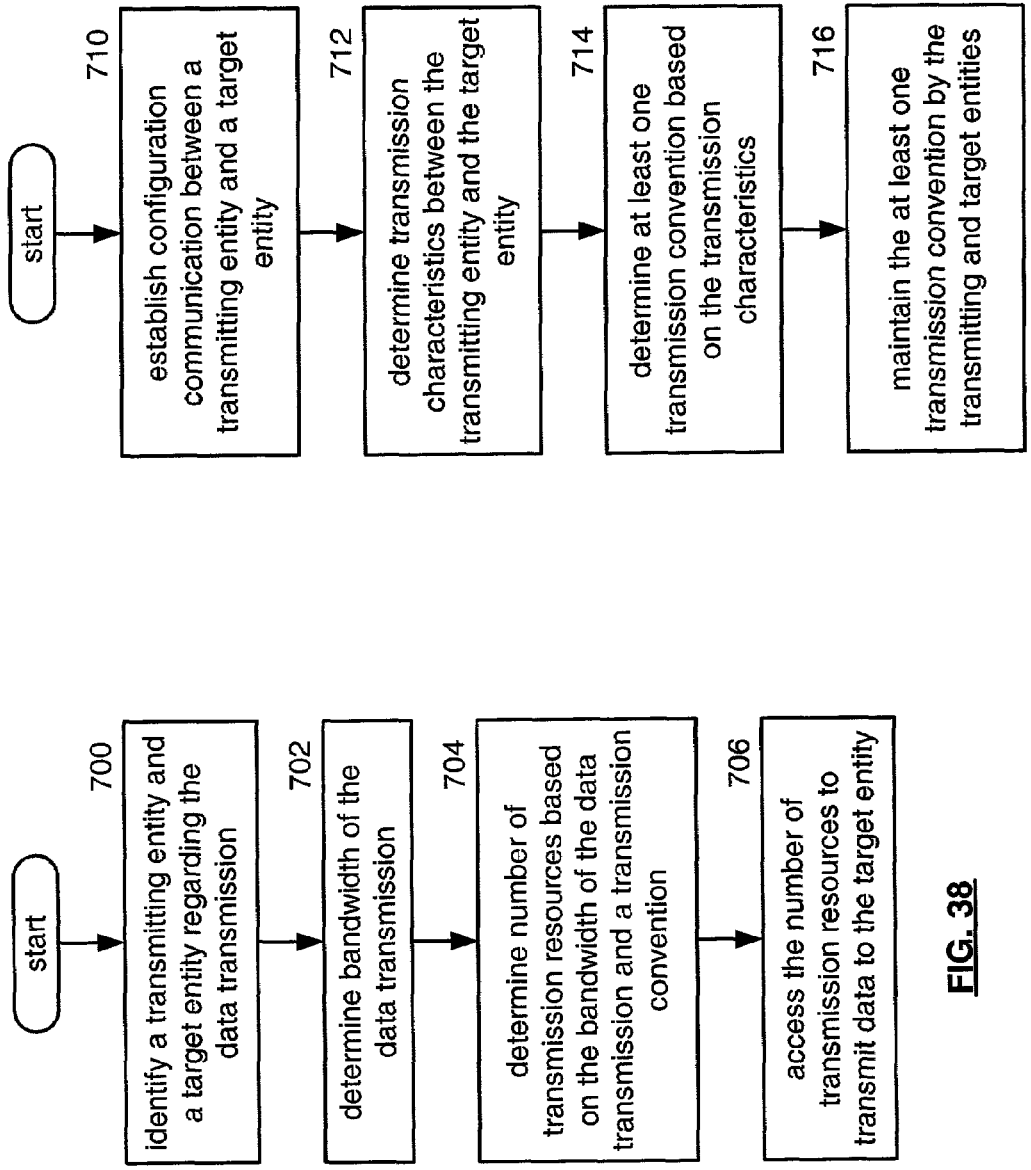

METHOD AND APPARATUS FOR CONFIGURING DATA TRANSMISSIONS WITHIN A MICRO-AREA NETWORK

TECHNICAL FIELD OF THE INVENTION

This invention relates generally to communication systems and more particularly to an enhanced data conveyance scheme within micro-area networks of such communication systems.

BACKGROUND OF THE INVENTION

Communication systems are known to transport large amounts of data between a plurality of end user devices. Such end user devices include telephones, facsimile machines, computers, television sets, cellular phones, personal digital assistants, et cetera. As is also known, such communication systems may be a local area network (LAN) and/or a wide area network (WAN). A local area network is generally understood to be a network that interconnects a plurality of end user devices distributed over a localized area (e.g., up to a radius of 10 kilometers). For example, a local area network may be used to interconnect workstations distributed within an office of a single building or a group of buildings, to interconnect computer based equipment distributed around a factory or hospital, et cetera.

As is further known, local area networks may be wired local area networks or wireless local area networks. Wired local area networks typically have a star topology, ring topology, bus topology or hub/tree topology. A local area network that utilizes a star topology includes a private automatic branch exchange (PABX) and/or a private digital exchange (PDX). Such devices switch data among the end user devices and/or data terminal equipment (DTE). Such exchange devices allow for voice and/or data to be conveyed between the end user devices and/or the DTE's of the local area network.

A local area network that utilizes a ring topology passes cable access from one DTE and/or end user device to another until the DTE's and/or end user devices are interconnected in a loop or ring. A local area network that utilizes a bus topology typically employs one of the Ethernet protocols to convey data within the network. As is known, there are a variety of Ethernet protocols that range from conveying data at rates of 10 megabits per second to multiple gigabits per second. A local area network that utilizes a hub technology is essentially a bus or ring topology with the wiring collapsed into a central unit. The central unit includes a set of repeaters that retransmit all of the signals received from DTE's and/or end user devices to other DTE's and/or end user devices on the same bus or in the same ring.

Wireless local area networks have the end user devices and/or DTE's operably coupled to a server via a wireless connection via a portable access unit. The wireless coupling may be a fixed wire placement, such as for application by a personal computer, or via portable devices that roam within the local area network. The wireless local area network may utilize a variety of modulation schemes including spread spectrum, quadrature amplitude modulation, time division multiple access, orthogonal frequency division multiplexing or frequency division multiple access.

A wide area network is generally understood to be a network that covers a wide geographic area. Wide area networks include both public data networks and enterprise wide private data networks. A public data network is established and operated by a national network administrator specifically for data transmission. Such public data networks facilitate the inner working of equipment from different manufacturers. Accordingly, standardizations by the ITU-T have been established for conveying data within public data networks. Currently, there are two main types of public data networks: packet switched public data networks and circuit switched public data networks. For example, the public switched telephone network is a circuit switched public data network while the Internet is a packet switched public data network. Other examples of wide area networks include integrated service digital networks (ISDN) and broadband multiservice networks.

Regardless of the type of communication system (e.g., LAN or WAN), each communication system employs a data conveyance protocol to ensure that data is accurately conveyed within the system. All such data conveyance protocols (hereinafter referred to as protocols) are based on layers 1, 2, 3 and/or 4 of the open system interconnection (OSI) 7 layer reference model. As is known, the layers include a physical layer (Layer 1), a data link layer (Layer 2), a network layer (Layer 3), a transport layer (Layer 4), a session layer (Layer 5), a presentation layer (Layer 6), and an application layer (Layer 7).

In general, a protocol is a formal set of rules and conventions that govern how end user devices and/or DTE's exchange information within the communication system. A wide variety of protocols exist, but can be generally categorized into one of four types of protocols: a local area network protocol, a wide area network protocol, network protocol, or routing protocol. Local area network protocols operate at the physical and data link layers and define communication over various local area network media. Wide area network protocols operate at the lowest three layers of the OSI model and define communication over the various wide area media. Routing protocols are network layer protocols that are responsible for path determination and traffic switching. Network protocols are the various upper layer protocols that exist in a given protocol suite. Examples of such protocols include asynchronous transfer mode (ATM), frame relay, TCP/IP, Ethernet, et cetera.

As is further known, communication systems may be networked together to yield larger communication systems, where such networking is typically referred to as internetworking. Internetworking is achieved via internetworking units that allow communication networks using the same or different protocols to be linked together. The internetworking units may be routers, gateways, protocol converters, bridges, and/or switches.

Routers are intelligent devices that connect like and unlike local area networks. They also connect to metropolitan area networks and wide area networks, such as X.25, frame relay and/or ATM based networks. Accordingly, routers operate at the physical layer, link layer and/or network layer of the OSI model to provide addressing and switching. In addition, routers may also operate at Layer 4, the transport layer, in order to ensure end-to-end reliability of data transfers.

A gateway provides an entrance and an exit into a communication system. For example, a gateway may be a connection between local area networks, between a local area network and a wide area network, or between wide area networks. Accordingly, a gateway is a node on both networks and provides mapping to all 7 layers of the OSI model. Thus allowing interfacing between 2 incompatible systems (e.g., mail system and data file transfer system) to be interconnected.

A bridge is a data communications device that connects two or more network segments and forwards packets between them. A bridge operates at the physical layer of the OSI reference model and serves as a physical connection between segments, amplifies carrier signals and buffers data during periods of network congestion. As is known, bridges are protocol specific (e.g., supports only one of Ethernet, token ring, et cetera).

A switch works at the physical and data link layers of the OSI reference model with emphasis on the data link layer. A switch reads incoming data (e.g., voice or data) to determine a destination address, or addresses. Based on each address, a transmission path is set up through a switch matrix between an incoming communication port and an outgoing physical communication port. In addition, switches include buffering to hold data packets until the necessary resources are available to allow packets to be forwarded.

A protocol converter is a communication device that translates a binary data stream from one protocol format into another according to a fixed algorithm. Accordingly, the protocol converter converts data from one protocol to another and may be incorporated into a switch, a bridge, a router and/or a gateway.

As is also known, the internetworking unit processes data in accordance with the protocols of the networks it is coupled to. Such data includes a header, or overhead, section and a data payload section. The header section includes the addressing, routing, packet identification, et cetera that is particular to a certain protocol, which ensures proper transporting of the data within the network. For example, the overhead section of an Ethernet frame includes a preamble, destination address, source address, type/link field, and frame check. If the data conveyance is via the Internet and/or a local area network, the data section of the Ethernet frame will include a TCP/IP frame, or packet, which, in itself, includes an overhead section and a data section. As is further known, the bit rate of the overhead section may be slower than the bit rate of the data section such that up to 80% of an internetworking units bandwidth is consumed by conveying overhead information. As such, the throughput for the actual data is limited due to the overhead being conveyed.

To provide a minimum level of interconnection between communication systems, each type of internetworking unit processes millions of bits of data per second. Accordingly, each internetworking unit includes high-speed interfaces to efficiently input and output data. Such interfaces, in processing circuitry, are implemented in integrated circuits that are mounted on printed circuit boards. A group of printed circuit boards are mounted on a motherboard and placed in a rack.

Since each internetworking unit is the conduit for data flow between communication systems, the speed of the internetworking unit is critical to avoid bottlenecking of the internetworking process. As is known, bottlenecking occurs when one device is in the critical path of data conveyance and its speed is the limiting factor for conveying data over the path.

In an effort to meet the ever-increasing challenges of improving speed within an internetworking unit, each internetworking unit includes an increasing number of racks, which includes an increasing number of printed circuit boards (PCBs), which in turn includes an increasing number of integrated circuits that are becoming more and more complex. The racks and PCB's are coupled together using coaxial cables, fiber optics, connectors, and/or wires. The integrated circuits on a printed circuit board are operably coupled together via copper traces (e.g., FR4 connections). Data is transported over these interconnections using the latest transmission protocols, such as 10 gigabits per second Ethernet standards. While this provides greater data throughput than earlier generations of internetworking units, there are still limitations. For example, at 10 gigabits per second, the distance that data can travel over a printed circuit board trace, wire and/or coaxial cable is limited to approximately 45". If the data must traverse a connector, the distance is even less. One solution to overcome the distance limitation is to use multiple lower rate paths to convey the data, which has the inherent issues of additional circuitry to transmit the data, synchronization of data transmissions and data recovery.

Therefore, a need exists for a method and apparatus that improves data throughput within networks and/or between networks.

BRIEF DESCRIPTION OF THE DRAWINGS

FIG. 17 illustrates a graphical representation of transmission assignments within a micro area network in accordance with the present invention;

FIG. 18 illustrates a graphical representation of scheme/resource assignments within a micro area network in accordance with the present invention;

FIG. 19 illustrates a graphical representation of encoding/modulation/serial/parallel assignments within a micro area network in accordance with the present invention;

FIG. 30 illustrates a logic diagram of a method for receiving data in accordance with the present invention;

FIG. 31 illustrates a logic diagram of an alternate method for receiving data in accordance with the present invention;

FIGS. 32 through 35 illustrate a logic diagram of a method for establishing a transmission convention for a conveyance of data within a micro-area network in accordance with the present invention;

FIG. 36 illustrates a logic diagram of an alternate method for establishing a transmission convention for a conveyance of data within a micro-area network in accordance with the present invention;

FIG. 37 illustrates a logic diagram of a further alternate method for establishing a transmission convention for a conveyance of data within a micro-area network in accordance with the present invention;

FIG. 38 illustrates a logic diagram of a method for establishing a transmission convention within a micro-area network in accordance with the present invention;

FIG. 39 illustrates a logic diagram of yet another alternate method for establishing a transmission convention within a micro-area network in accordance with the present invention;

DETAIL DESCRIPTION OF A PREFERRED EMBODIMENT

Generally, the present invention provides a method and apparatus for a transmitting entity within a micro-area network to establish a data transmission within the network. The micro-area network may comprise an internetworking unit, the components within an internetworking unit, end user device, DTE, or any other component within a communication system. Such a method and apparatus includes processing that begins by determining the identity of a target entity within the micro-area network. The processing then continues by determining transmission characteristics of at least one communication path between the transmitting entity and target entity of the micro-area network. The processing then continues by determining a transmission convention based on the transmission characteristics. The processing then continues by providing the transmission convention to the target entity. With such a method and apparatus, data conveyances within a micro-area network (e.g., between components of an internetworking unit and/or components of a device within a communication system) may utilize a proprietary formatting scheme to improve the data throughput.

Figure 1:
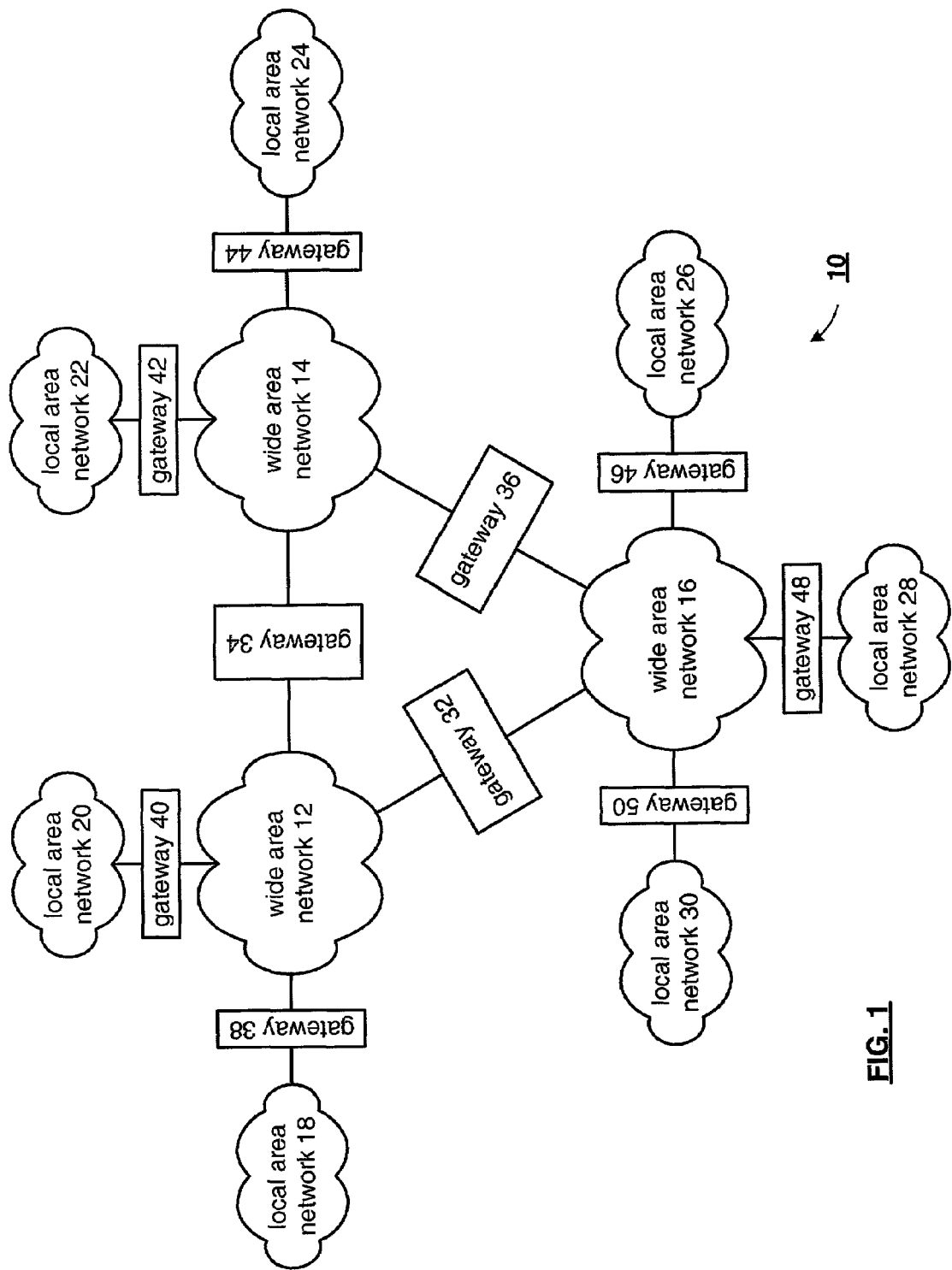
FIG. 1 illustrates a schematic block diagram of a plurality of interconnected networks in accordance with the present invention.

The present invention can be more fully described with reference to FIGS. 1 through 41. FIG. 1 illustrates a schematic block diagram of a communication network 10 that includes a plurality of communication systems 12-16 and 18-30 operably coupled together via gateways 32-50. Communication systems 12-16 are wide area networks and will be described in greater detail with reference to FIG. 3. Communication systems 18-30 are local area networks and will be described in greater detail with reference to FIG. 2.

Each of the gateways 32-50 interconnects two networks together. In addition, a gateway may perform routing of datagrams (e.g., packets) between the networks; may include protocol conversion technology that allows two networks that operate with completely different protocols to be linked together; may perform a bridge function; and/or may provide a switching function. If the gateway includes protocol conversion technology, it converts data from one protocol of one network to the protocol of the other network. Such protocol conversion deals with all 7 layers in the protocol stack. As such, the gateway performing a protocol conversion function converts the application layer, presentation layer, session layer, transport layer, network layer, data link layer, and physical layer of one protocol associated with one network into another protocol associated with the other network. If a gateway is performing a routing function, it is dealing with Layers 1-3 of the 7-layer protocol stack. As such, the routing function enables the gateway to convert the network layer, data link layer and physical layer from one protocol associated with one network to another protocol associated with the other network.

Figure 2:
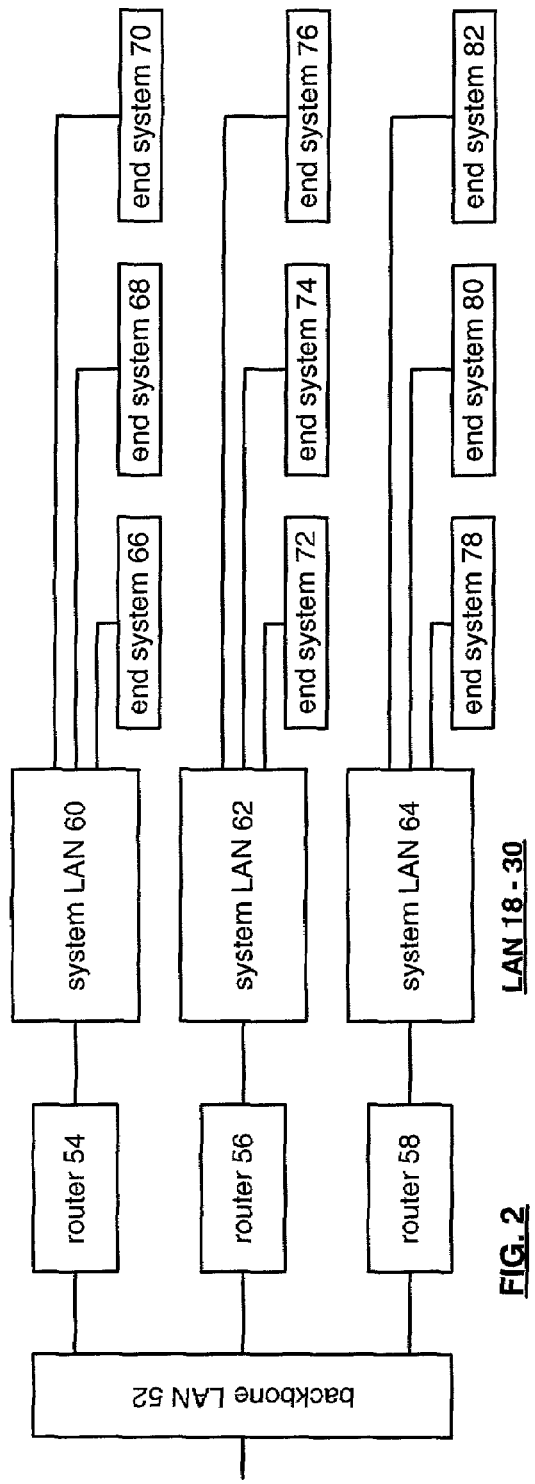
FIG. 2 illustrates a schematic block diagram of a local area network in accordance with the present invention.

FIG. 2 illustrates a schematic block diagram of a local area network 18-30. The local area network 18-30 includes a backbone local area network 52, a plurality of routers 54-58, a plurality of system LANs 60-64 and a plurality of end systems 66-82. The end systems 66-82 may be a host computer with respect to accessing the internet, an end users computer, facsimile machine, digital telephone, work station, personal digital assistant, et cetera. In general, an end system 66-82 may also be referred to as a data terminal equipment (DTE). In general, a DTE is a generic name for any user device connected to a data network and includes such devices as visual display units, computers and workstations.

Each end system 66-82 may be operably coupled to its corresponding system LAN 60-64 through a wired connection or a wireless connection. Such wired connection includes twisted pairs, coaxial cable fiber. Each wired LAN may have a topology of a star configuration, ring configuration, bus configuration, hub configuration and/or tree configuration. It may utilize a medium access control (MAC) method of collision sense multiple access (CSMA), CSMA with collision avoidance, CSMA with collision detection, token passing, and/or slotted access. There are several standards that govern wired LANs including ISO/IEEE 802.2/3/4/5.

If the system LAN 60-64 is a wired LAN having a bus architecture it may utilize the CSMA with collision detection MAC protocol. In this configuration, each of the end systems 66-82 within the local area network 60-64 is coupled to the same cable, which transmits data between pairs of end systems within a particular LAN. Accordingly, each end system within a LAN includes a MAC module that performs the CSMA with collision detection. Such a MAC module allows each of the end systems to detect whenever a frame is being transmitted. Each end system, via its MAC module, determines whether the packet is addressing its end system. If so, the MAC module provides the frame to its end system for processing. In addition, the MAC module senses the cable before transmitting a frame on the cable. If the cable is available, the MAC module transmits the frame. If not, the MAC module waits a predetermined period of time where each end system has a different predetermined wait time for retransmission of frames. If a collision occurs during the transmission of the frame, the MAC module causes the frame to cease being transmitted and wait the predetermined period of time before retransmission. In addition, the MAC module may also continue transmitting random bit patterns for a short period of time, which is generally referred to as a jam sequence.

If the local area networks 60-64 utilize a control token, each end system includes a MAC module for processing the control token. In this scheme, a token is passed from one end system to another within the local area network according to a defined set of rules understood and adhered to by each of the end systems. Accordingly, an end system may only transmit a frame when it is in possession of the token. Once the end system has transmitted a frame, it passes the token to another end system within the local area network. To facilitate the token passing, a logical ring is established between each of the end systems within the local area network.

If the LAN 60-64 are configured to use a slotted ring topology, a monitor, initializes the ring to contain a fixed number of bits. The stream of bits continually circulates around the ring from one end system to another. As each end system receives the stream of bits, it examines the bits and passes them to the next end system in the ring. The complete ring is arranged to contain a fixed number of slots, each made up of a set number of bits and capable of carrying a single fixed size frame. When an end system wishes to transmit a frame, it waits until an empty slot is detected. The end system then marks the slot as full and proceeds to insert the frame content into the slot with both the required destination address and the source address in the header of the frame.

If one or more of the system LANs 60-64 is a wireless LAN, it utilizes RF and/or infrared transmission medium to convey data with the end systems. Such a wireless LAN may utilize MAC methods such as CDMA (code division multiple access), CSMA with collision avoidance, CSMA with collision detection, TDMA (time division multiple access), and/or FDMA (frequency division multiple access). There are several standards that govern wireless LANs including IEEE 802.11 and ETSI HIPER LAN.

Each of the system LANs 60-64 is operably coupled to a backbone LAN 52 via a router 54-58. The router is used to provide the interconnectivity between the backbone LAN 52 and the system LAN 60, 62 or 64 when the protocol used by the LANs are different. If the protocol used by the LANs 52, 60, 62 and 64 are the same, then the routers may be replaced by bridges. As configured, the backbone LAN 52, via the routers 54-58, provides a larger local area network by interconnecting smaller local area networks. Depending on the topology used for the local area network 52, 60-64, each component within the local area network may comprise a plurality of circuit boards each of which includes a plurality of integrated circuits. Accordingly, each component (e.g., end system, bridge, router, DTE, etc.) within the local area network is a micro-area network (MAN) in which data is conveyed in accordance with the present invention. The details of a micro-area network will be described in greater detail with reference to FIGS. 6-41.

Figure 3:
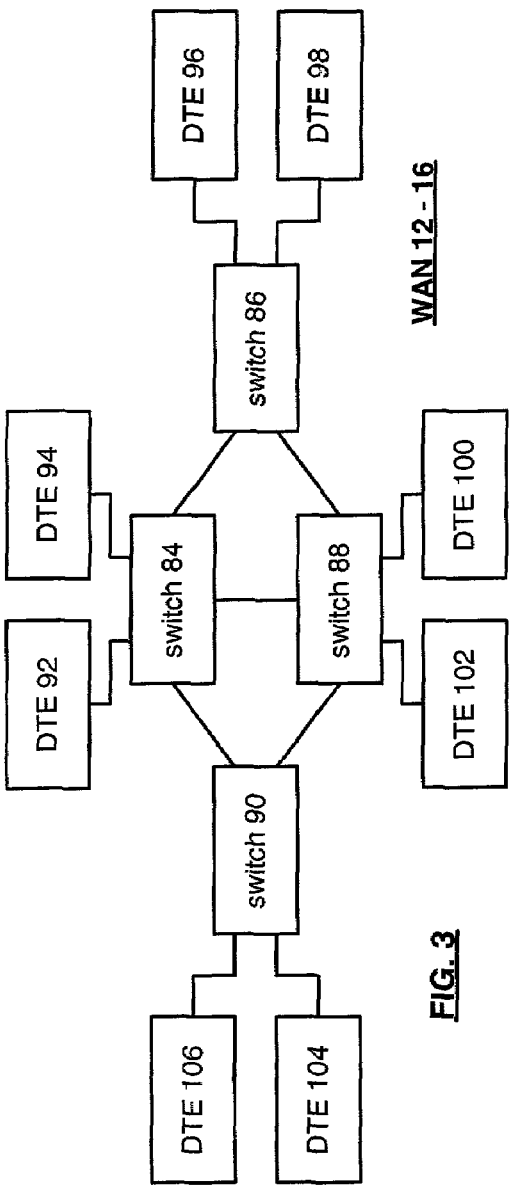
FIG. 3 illustrates a wide area network in accordance with the present invention.

FIG. 3 illustrates a schematic block diagram of a wide area network 12-16. The wide area network 12-16 includes a plurality of switches 84-90 and a plurality of data terminal equipment 92-106. Each of the switches 84-90 is operably coupled to one or more DTEs and is further coupled to one or more of the gateways. Each of the switches 84-90 includes a plurality of printed circuit boards each of which includes a plurality of integrated circuits to perform the appropriate switching function. Such switching functions include interpreting incoming data (e.g., voice data, video data, text data, et cetera) to determine a destination address. Based on the destination address, the switch establishes a transmission path through internal switching matrixes between an incoming and outgoing physical communication port and links. The switching function may further include buffering packets of data in temporary memory until the necessary resources are available to allow the data packets to be forwarded. Typically, voice switches do not include buffering since it is not desirable to delay the transmission of voice data.

The data terminal equipment 92-106 may be a terminal device that is part of a broader grouping of equipment known as customer premise equipment, which includes voice as well as data terminals. Such terminal equipment is at the terminal end of a data transmission and includes the transmit and receive circuitry necessary to facilitate the transmission and reception of data. Such DTEs may be in the form of dumb terminals (i.e., a terminal without embedded intelligence in the form of programmed logic), a semi-intelligent terminal, or an intelligent host computer (i.e., a PC, midrange or mainframe computer). The DTE interfaces with the switch via a data communications equipment (DCE). The DCE may be a local area network interface card, a modem, an ISDN terminal adapter, et cetera.

While the wide area networks 12-16 of FIG. 3 have been shown to include a plurality of switches and data terminal equipment, it may be comprised of a variety of topologies. For example, a wide area network may be a packet switched public data network (PSPDN), circuit switched public data network (CSPDN), integrated services digital network (ISDN) and/or a private network. In a circuit switched public data network, a connection is established through a circuit switch network that results in a physical communication channel being setup through the network from a calling party to the receiving party. The two parties exclusively use this connection for the duration of the call. The public switched telephone network (PSTN) generally uses such circuit switched networks.

To facilitate circuit switched transmissions, each switch or router within the wide area network includes an interface protocol. The interface protocol is established based on a particular standard, for example the X.21 standard. The X.21 interface protocol is concerned with the setup and clearing operations associated with each call. The control of insuring data transfers is the responsibility of the link layer, which, because of the operation of a CSPDN, operates on an end-to-end basis. While the X.21 interface protocol was intended for use with all digital CSPDNS, as is widely used, an alternate interface protocol has been defined, which is known as the X.21 BIS. The X.21 BIS provides an interface for DTE synchronous V series modems and is used on public switch telephone networks. Another standard is the X.21 TSS, which is a specification for Layer 1 interfaces used in the X.25 packet switching protocol and in certain types of circuit switched data transmissions.

If the wide area network is a packet switched public data network, no physical connections are established through the network of a packet switched network. Instead, all data is transmitted in one or more packets by the source DTE. The packets include both the source and destination addresses of the DTEs and are transmitted serially to the local packet switching exchange associated with the source DTE. The exchange stores each packet and then inspects the packets to determine a destination address. Each packet switch exchange includes a routing directory that specifies outgoing links to be used based on network addresses. As such, the packet switch exchange forwards the packets onto the appropriate link at the maximum available bit rate based on the destination address and the information contained in the routing directory. Such packet switched networks typically support datagrams and virtual calls, or virtual circuits. Each datagram is treated as a separate entity as it is routed through the network where packets of a virtual call are treated as being related. A packet switch network is generally developed in accordance with the X.25 standard, which provides a set of protocols that primarily deal with the transport layer, packet layer, data link layer and physical layer.

As one of average skill in the art will appreciate, the networks shown in FIGS. 1, 2 and 3 may be of any topology utilizing any protocol and/or configuration to convey data between users of the system. For example, the networks may be the public switch telephone network, Internet, private networks, public networks, et cetera. As one of average skill in the art will further appreciate, each component within the network (e.g., routers, bridges, switches, gateways, data terminal equipment, end user devices, packet switching exchange, private branch exchange, et cetera) perform certain networking functions to initiate, support and/or participate in a data conveyance. Such a data conveyance may be the transmission of voice data, video data and/or text data. Accordingly, each component within the network includes circuitry to perform the corresponding functions. As the complexity of the corresponding functions increase, the sophistication of the circuitry and amount of circuitry increases correspondingly. As such, each component within the network is, in itself, a network, which is being termed a micro-area network.

Figure 4:
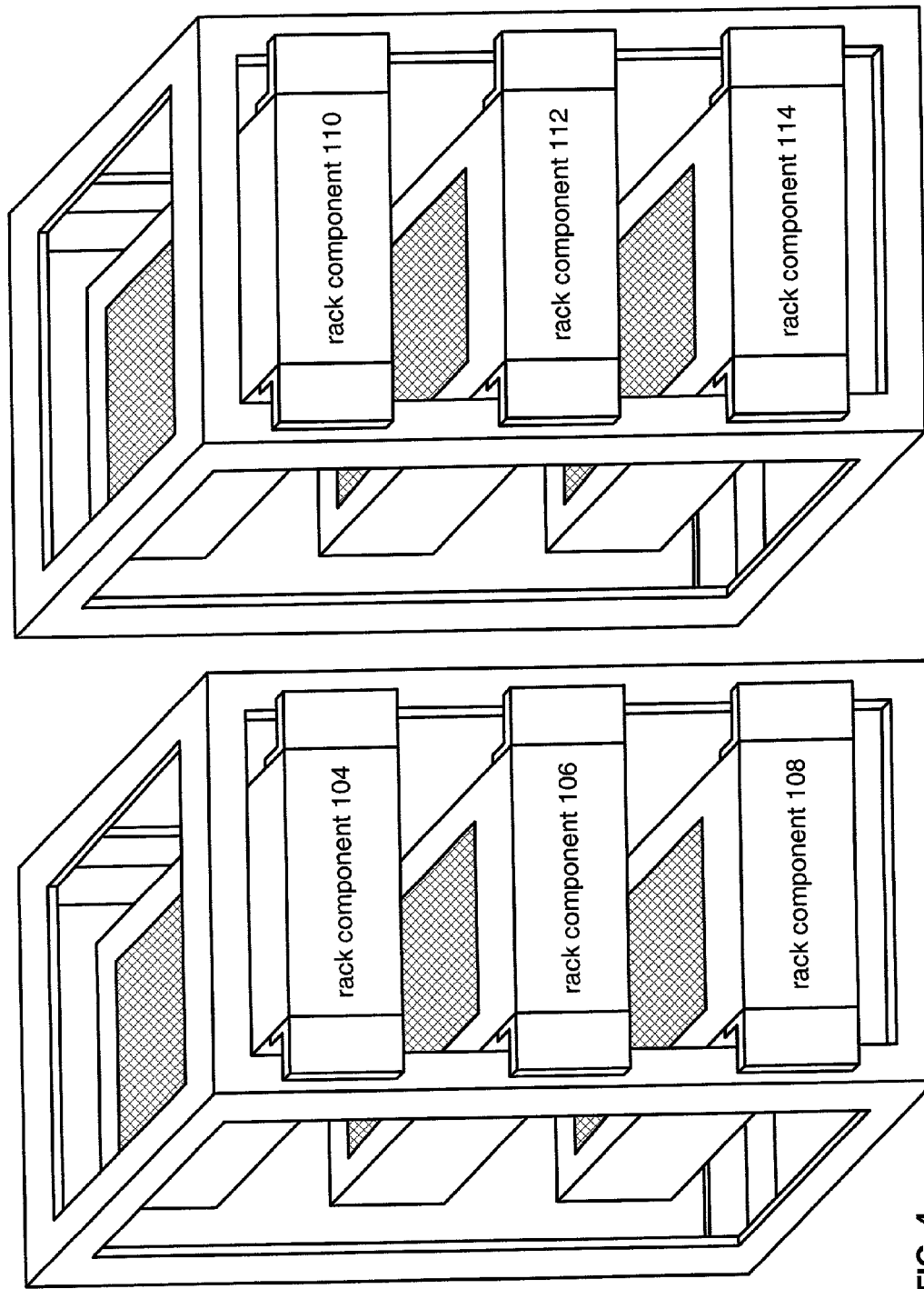
FIG. 4 illustrates a graphical representation of an internetworking unit in accordance with the present invention.

FIG. 4 illustrates a graphical illustration of a component within the network, hereinafter referred to as a network component. Such a network component may be an intermediate system, an internetworking unit, which includes a gateway, router, switch, bridge, et cetera and other components in the systems including the data terminal equipment, end user systems, packet switching exchange, private branch exchange, et cetera. Each component may include a plurality of rack components 104 through 114. Each rack component may be operably coupled to any of the other rack components within the component shown in FIG. 4 via twisted pair, coaxial cable, fiber optics, and/or motherboards, or backplanes.

Figure 5:
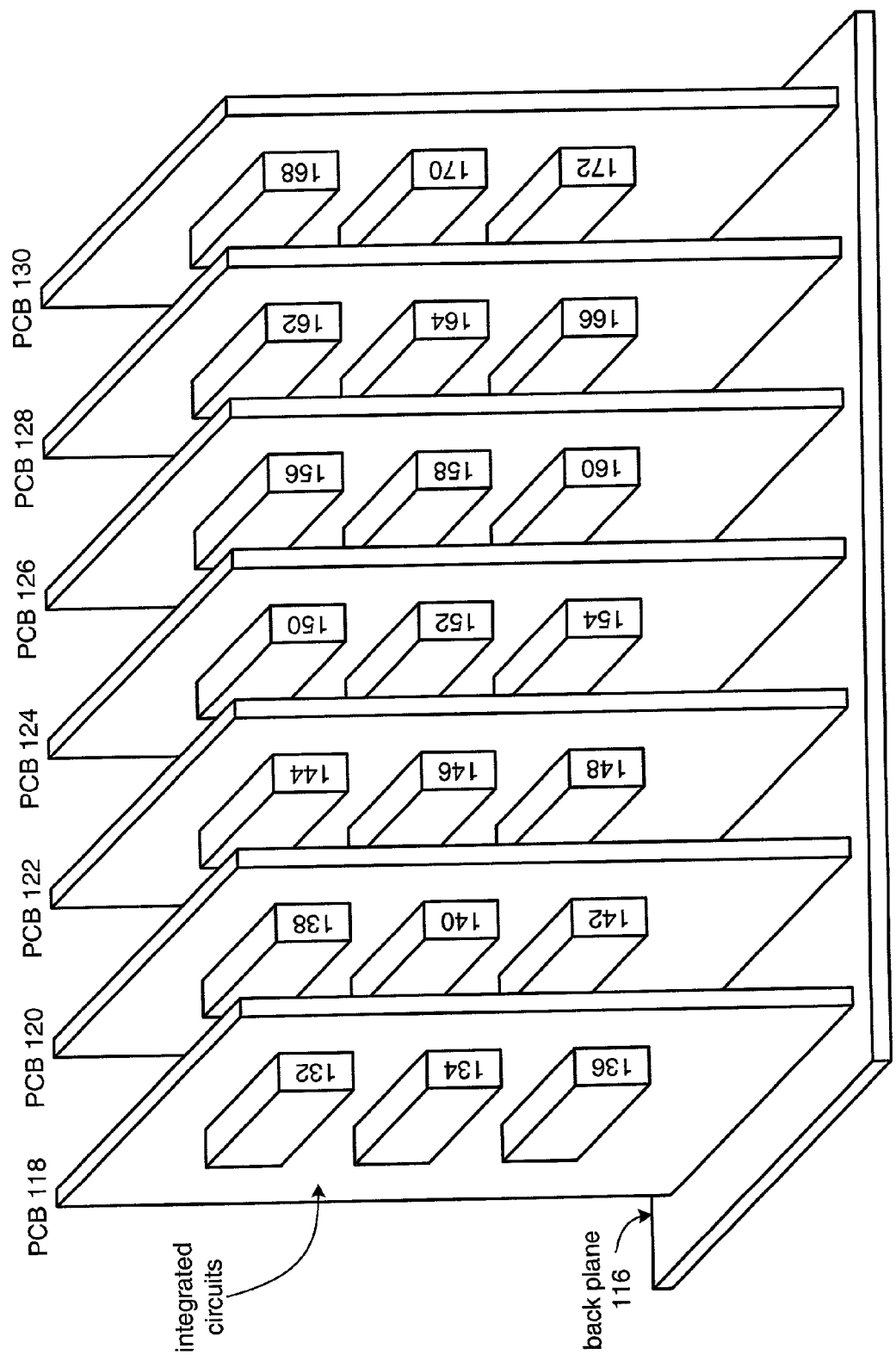
FIG. 5 illustrates a graphical representation of a rack component of an internetworking unit in accordance with the present invention.

FIG. 5 illustrates a graphical representation of a rack component 104 through 114. Each rack component includes a backplane 116 and a plurality of printed circuit boards (PCBs) 118-130. Each printed circuit board includes a plurality of integrated circuits. For example, PCB 118 includes integrated circuits 132-136, PCB 120 includes integrated circuits 138-142, PCB 122 includes integrated circuits 144-148, PCB 124 includes integrated circuits 150-154, PCB 126 includes integrated circuits 156-160, PCB 128 includes integrated circuits 162-166 and PCB 130 includes integrated circuits 168-172.

Depending on the particular network component the rack component 104-114 is included in, the functionality of the integrated circuits and corresponding PCBs will vary. For example, if the network component is a router, each of the rack components, which, in turn, means each of the PCBs and corresponding integrated circuits, function to perform routing of packets. Such routing functions include Layers 1, 2 and 3 conversions, processing at Layer 4, the transport layer, in order to ensure end-to-end reliability of data transfers, make routing decisions of packets, broadcast packets, and/or forward packets. Accordingly, each rack component may include a plurality of communication ports for receiving incoming data packets and for outputting data packets. The internal processing within the network component (e.g., routing, protocol conversion, switching, bridging, storing, duplicating, etc.) causes the data within the component to be processed before being outputted via one of the communication ports.

Each of these functions (e.g., routing, protocol conversion, switching, bridging, storing, duplicating, etc.) requires the network component to perform a particular operation upon the incoming data prior to outputting the data. As such, within each network component (i.e., at least one rack component) includes at least one micro-area network (MAN). In addition, each rack component may, in itself, include a micro-area network and each printed circuit board within each rack component may further include a micro-area network.

Figure 6:
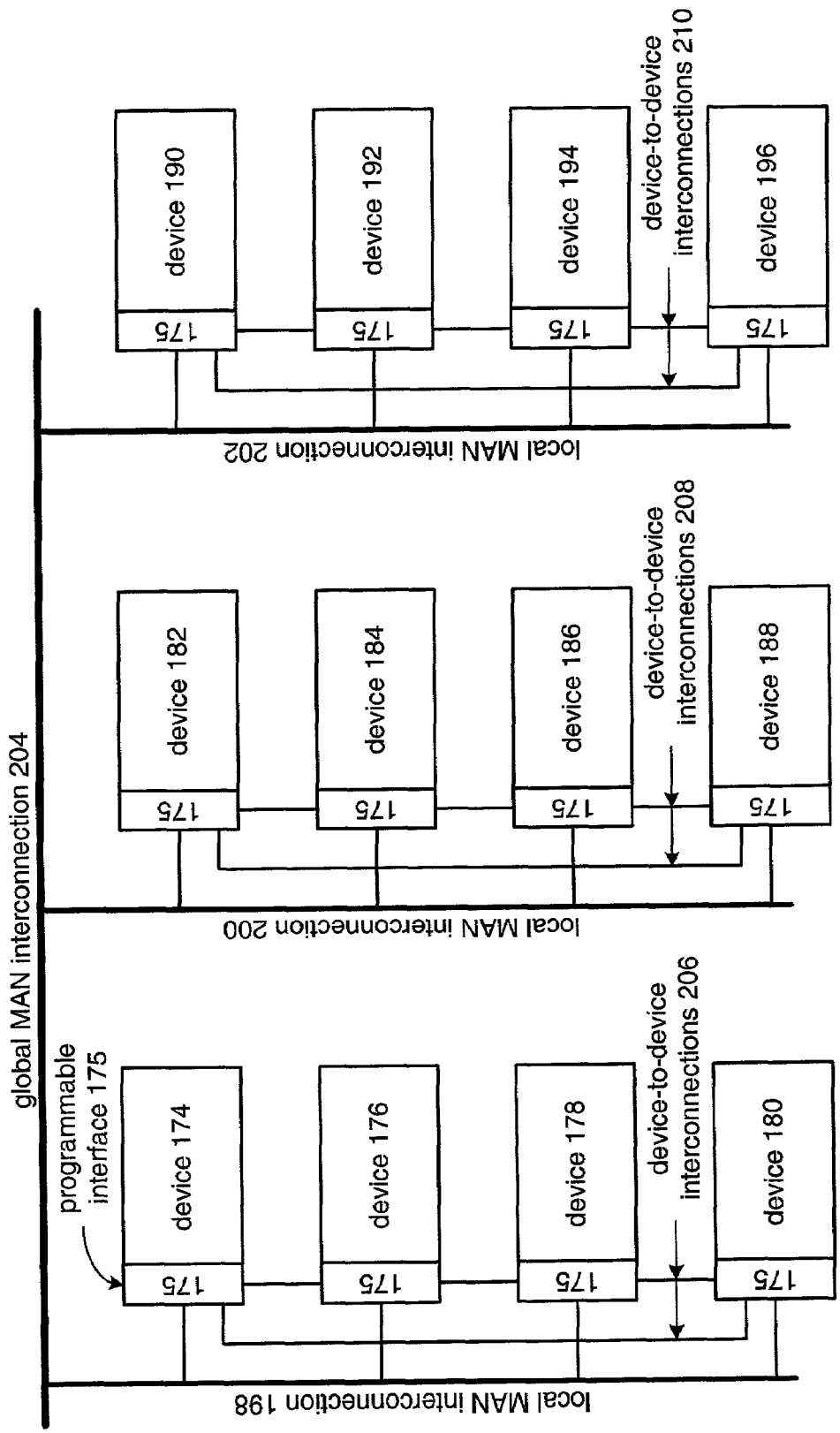
FIG. 6 illustrates a schematic block diagram of a micro area network in accordance with the present invention.

FIG. 6 illustrates a schematic block diagram of a micro-area network in accordance with the present invention. The micro-area network includes a plurality of devices 174-180, 182-188, 190-196. Each grouping of devices is operably coupled together via device-to-device interconnections 206, 208 and 210 and also by a local MAN interconnection 198, 200 and 202. As an example, devices 174-180 may be printed circuit boards within a rack, integrated circuits on a printed circuit board, racks within a network component or grouping of racks within a network component. Similarly, devices 182-188 may be integrated circuits, printed circuit boards, racks, groupings of racks, et cetera. The same applies for devices 190-196. Each grouping of devices 174-180, 182-188 and 190-196 is operably coupled to the other groupings by a global MAN interconnection 204. Each of the interconnections 198-202, 204 and 206-210 may be printed circuit board traces, twisted pair, coaxial cable, fiber optics and/or any other means for coupling devices together. In addition, each connection 198-202, 204 and 206-210 may be a single bus, a single serial bus, a parallel bus, multiple serial buses, and may further include a data bus, control bus and/or address bus. As one of average skill in the art will appreciate, the grouping of devices 174-180, 182-188 and 190-196 may be coupled together via only the local MAN interconnections 198, 200 and 202, thus omitting the device-to-device interconnections 206, 208 and 210.

Each of the devices 174-196 includes a programmable interface 175. The detailed functionality of the programmable interface 175 will be discussed in greater detail with reference to FIG. 7 and FIGS. 10-41. In general, the programmable interface 175 allows for each of the devices 174-196 to receive incoming data of the network component in one protocol, convert the data into a MAN protocol for transmission within the network component, and once the data is to be outputted, convert the data into an outgoing protocol. For example, if the plurality of devices 174-196 is included within a router that is operably coupling two local area networks together, where each local area network utilizes a different protocol, the devices 174-196 include the corresponding circuitry to provide the desired routing functions and layers 1-4 protocol conversion. Accordingly, one or more of the devices 174-196 include Layers 1-4 protocol conversion, routing, header interpretation circuitry, et cetera. For example, assume that one communication local area network utilizes a token ring technology and another utilizes CSMA/CD via a bus connection. Accordingly, data conveyed between these two local area networks needs to be converted between the corresponding protocols. Assume that a series of packets is received from the local area network utilizing the token ring configuration. Accordingly, at least one of the devices 174-196 of the router will receive the packets via its programmable interface 175.

The programmable interface 175 will customize the packet in accordance with a micro-area network protocol convention and route the data within the network component (i.e., to another device) in accordance with the MAN protocol. The MAN protocol provides for a more efficient and effective means for transporting data from device to device within a network component as schematically illustrated in FIG. 6. The MAN protocol, and establishment thereof, will be described in greater detail with reference to FIGS. 11-41.

The addressed device, via its programmable interface 175, receives the packet formatted in accordance with the MAN protocol and performs its corresponding function. As previously mentioned, such corresponding function may be protocol conversion, destination address interpretation, et cetera. Once the device has completed its function and the data is ready for transmission outside of the network component (i.e., outside of the devices illustrated in FIG. 6), the programmable interface 175 of the associated device and/or the device itself converts the data into the protocol of the other local area network. Accordingly, the packets outputted by the device via its associated programmable interface 175 will be in accordance with the protocol of the network to receive the packet.

Each of the devices 174-196, via its programmable interface 175, coordinates the reception and transmission of data onto one of the interconnections 198-202, 204, and 206-210. Such access to the interconnections will be described in greater detail with reference to FIG. 7 and FIGS. 10-41. As one of average skill in the art will appreciate, the physical distance between the devices 174-196 within a network component may vary substantially. For example, if the devices are integrated circuits on the same printed circuit board, the distance between such devices may be an inches or less. Conversely, if the devices are rack components in different racks, the distance may be several feet to several meters. Accordingly, the rate of transmission within the MAN protocol takes into account the various distances being traversed. As such, when the data traverses a small distance, the MAN protocol may be established to utilize a very high bit rate over a single communication path. Conversely, if the data is required to traverse several meters, the communication path may be established to use multiple serial connections, or a parallel connection, at lower bit rates. In addition, the particular encoding and/or modulation and corresponding decoding and demodulation may vary depending on the distance of the interconnections as well as other factors such as desired data rate, real time throughput considerations, et cetera.

As one of average skill in the art will further appreciate, each device 174-196 may perform the same functions within a rack, which constitutes a network component, each device 174-196 may perform a different function of the network component, or a combination thereof. However, each device 174-196 includes a similar programmable interface 175 such that data conveyances between devices within the micro-area network all utilize the same conventions thus enabling more efficient data throughput within such network components.

Figure 7:
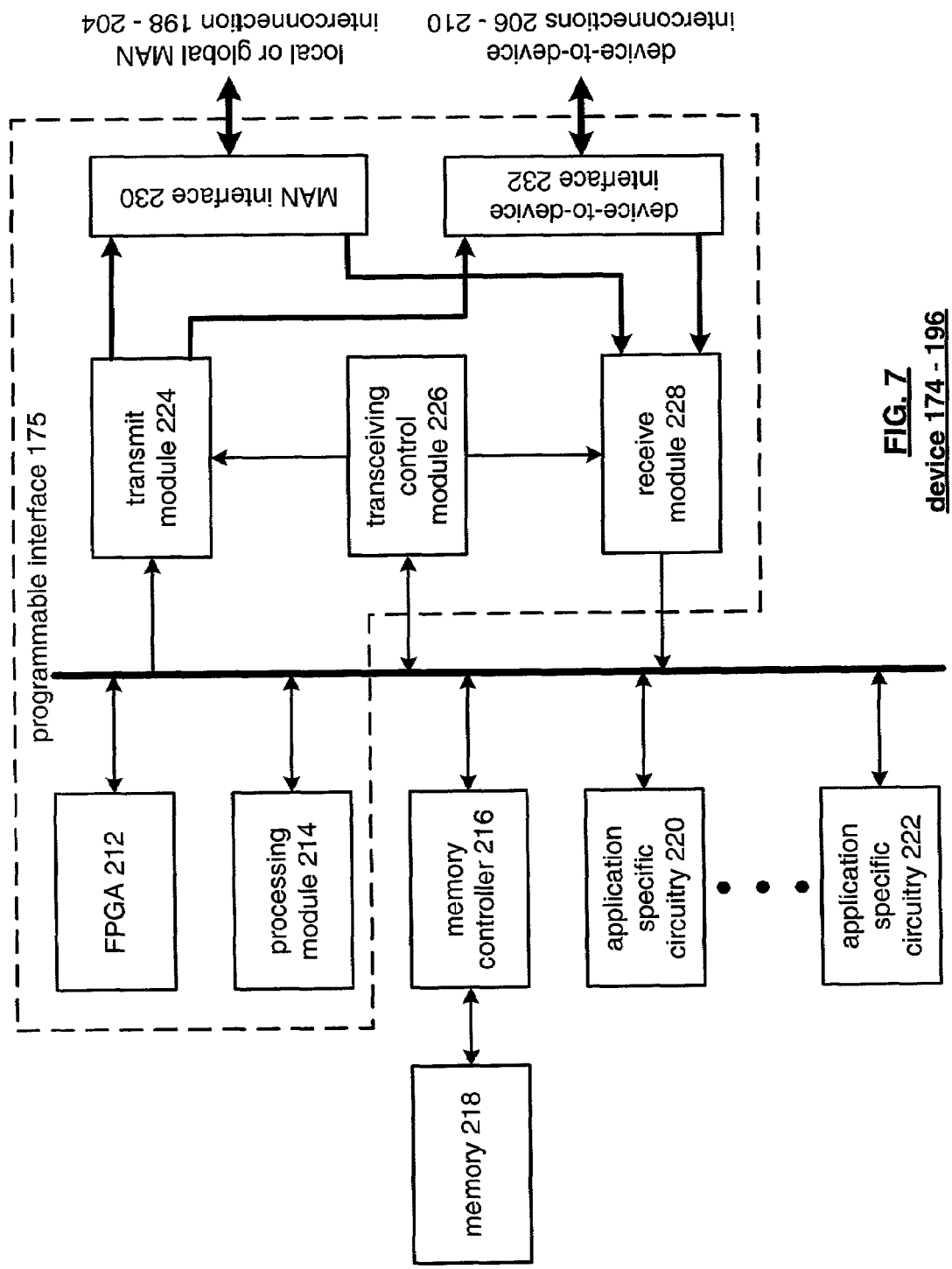
FIG. 7 illustrates a schematic block diagram of a device within a micro area network in accordance with the present invention.

FIG. 7 illustrates a schematic block diagram of a device 174-196 of FIG. 6. The device includes a programmable gate array 212, a processing module 214, memory controller 216, memory 218, a plurality of applications specific circuits 220-222, a transmit module 224, transceiving control module 226, receive module 228, MAN interface 230 and/or device-to-device interface 232. The processing module 214 may be an individual processing device or a plurality of processing devices. Such a processing device may be a microprocessor, microcontroller, microcomputer, central processing unit, digital signal processor, field programmable gate array, state machine, logic circuitry and/or any device that manipulates signals (analog or digital) based on operational instructions. Memory 218 may be a single memory device or a plurality of memory devices. Such a memory device may be a nonvolatile memory, volatile memory, dynamic memory, static memory, read only memory, random access memory, and/or any device that stores digital information. The MAN protocol processing performed by the processing module 214, and as may further be processed by the FPGA 212, is based on operational instructions stored in memory 218. Such operational instructions and execution thereof will be described in greater detail with reference to FIGS. 20-41.

The field programmable gate array (FPGA) 212, while listed as a field programmable gate array, may be a mask programmable gate array, field programmable logic device, mask programmable logic device, and/or any type of field or mask programmable device that includes logic circuitry that can be configured based on corresponding programming instructions. The field programmable gate array 212 in combination with the processing module 214 executes the operational instructions that are generally depicted in FIGS. 20-41 to achieve the MAN protocol processing within a network component. As one of average skill in the art will appreciate, the transmit module 224, transceiving control module 226 and receive module 228 may be separate devices and/or incorporated into the field programmable gate array 212 and/or processing module 214.

The application specific circuitry 220-222 provides a particular functionality for device 174-196. For example, if the device is a router, the application specific circuitry 220-222 will perform specific functions of routing including forwarding of packets, interpreting of packets, protocol conversions for Layers 1-4, et cetera. In addition, the field programmable gate array 212 and processing module 214 may perform other functions related to the functions performed by the application specific circuitry 220-222. For example, the FPGA 212 and processing module 214 may also perform functions related to routing. In addition, the FPGA 212 and processing module 214 further support the MAN protocol used within the component (i.e., micro-area network), as illustrated in FIG. 6.

As one of average skill in the art will also appreciate, device 174-196 may be an integrated circuit on a printed circuit board, a printed circuit board, a rack component, a rack and/or a combination thereof. In addition, each device may include a plurality of FPGAs and a plurality of application specific integrated circuits. Accordingly, if the device 174-196 is an integrated circuit, each of the elements 212-232 will be portions of an integrated circuit. If the device 174-196 is a printed circuit board, each of the elements 212-232 may be one or more integrated circuits. For example, FPGA 212 may be one or more integrated circuits containing FPGA functionality. In addition, an integrated circuit may include multiple elements 212-232. For example, an integrated circuit may include the FPGA 212 and the processing module 214.

If the device 174-196 is a rack component within a rack, each of the elements 212-232 may be separate printed circuit boards or integrated circuits on various printed circuit boards. Regardless of the configuration, the elements 212-232 of device 174-196 perform one or more corresponding functions of the overall network component.

In general, the device 174-196 will receive system level data (i.e., data into or out of the network component which may be a router, bridge, switch, gateway, DTE, end system, private branch exchange, packet switching exchange, et cetera) via the MAN interface 230. The MAN interface 230 provides the received data to the receive module 228. The receive module 228 determines whether the received data is already formatted in accordance with the desired MAN protocol. If it is, the receive module 228 places the data on the bus for subsequent processing by one of the other elements 212, 214, 220, and/or 222.

If the received data is still formatted in accordance with a network protocol, the receive module 228 converts the network protocol formatted data into MAN formatted data and provides it onto the bus for subsequent processing by one of the other elements 212, 214, 220, and/or 222. The MAN formatted data will include sufficient information within a header section for the device to perform its corresponding function upon the data. For example, if the device performs a switching function, the MAN header includes sufficient information to enable the device to switch the data to the appropriate destinations.

Once the data is processed and is destined to be transmitted out of the network component (e.g., to another network component or to another network), the processed data is received by the transmit module 224. The transmit module 224 converts the format from the MAN protocol to the corresponding protocol of the targeted network or network component. The data is then transmitted via the MAN interface 230 to the targeted network component or network.

The transceiving control module 226 coordinates the formatting and deformatting of incoming and outgoing packets in accordance with the destination of the data, characteristics of transmission paths within the network component, available resources within the network component, et cetera. Accordingly, the transceive control module 226 selects a MAN protocol that enables packets to be efficiently transported within the network component.

Data may also be transported between devices of a network component utilizing the device-to-device interconnections 206-210. The device-to-device interface 232 provides the received data to the receive module 228. The receive module 228 converts the data into MAN format, if not already done so, and then provides it onto the bus for processing by one of the elements 212, 214, 220 and/or 222.

The transmit module 224 provides MAN formatted data to other devices within the micro area network via the device-to-device interface 232. This is done so under instructions from the transceiving control module 226. In general, the transceiving control module 226 indicates to the transmit and receive modules the particular MAN protocol being used for a data conveyance and whether incoming or outgoing data is already formatted in accordance with the desired MAN protocol, whether the data is to be reformatted in accordance with a network protocol, and/or whether network protocol formatted data is to be passed without conversion to a MAN protocol. As one of average skill in the art will appreciate, the transmit module 224 and receive module 228 may include buffering for temporarily storing inbound and outbound data to ensure proper transmission and availability of necessary resources.

The transceiving control module 226 may select one of the plurality of MAN protocols based on the distance between the sources and destination device, the resources available between such devices, transmission path characteristics of the resources between devices, et cetera. Accordingly, a relatively large amount of options and configurations may be obtained based on the above-mentioned characteristics. Accordingly, the use of the FPGA 212 makes implementing such variations practical within real world network components. By the nature of an FPGA, which allows for on-the-fly reprogramming, various types of MAN protocols may be implemented quickly thereby enabling various transmission schemes to be utilized. In addition, FPGA's may be reprogrammed at future times to incorporate different versions of protocols et cetera. Thus, by incorporating an FPGA into device 174-196, a large amount of flexibility is available in protocol conversions between network devices and within network components.

Figure 8:
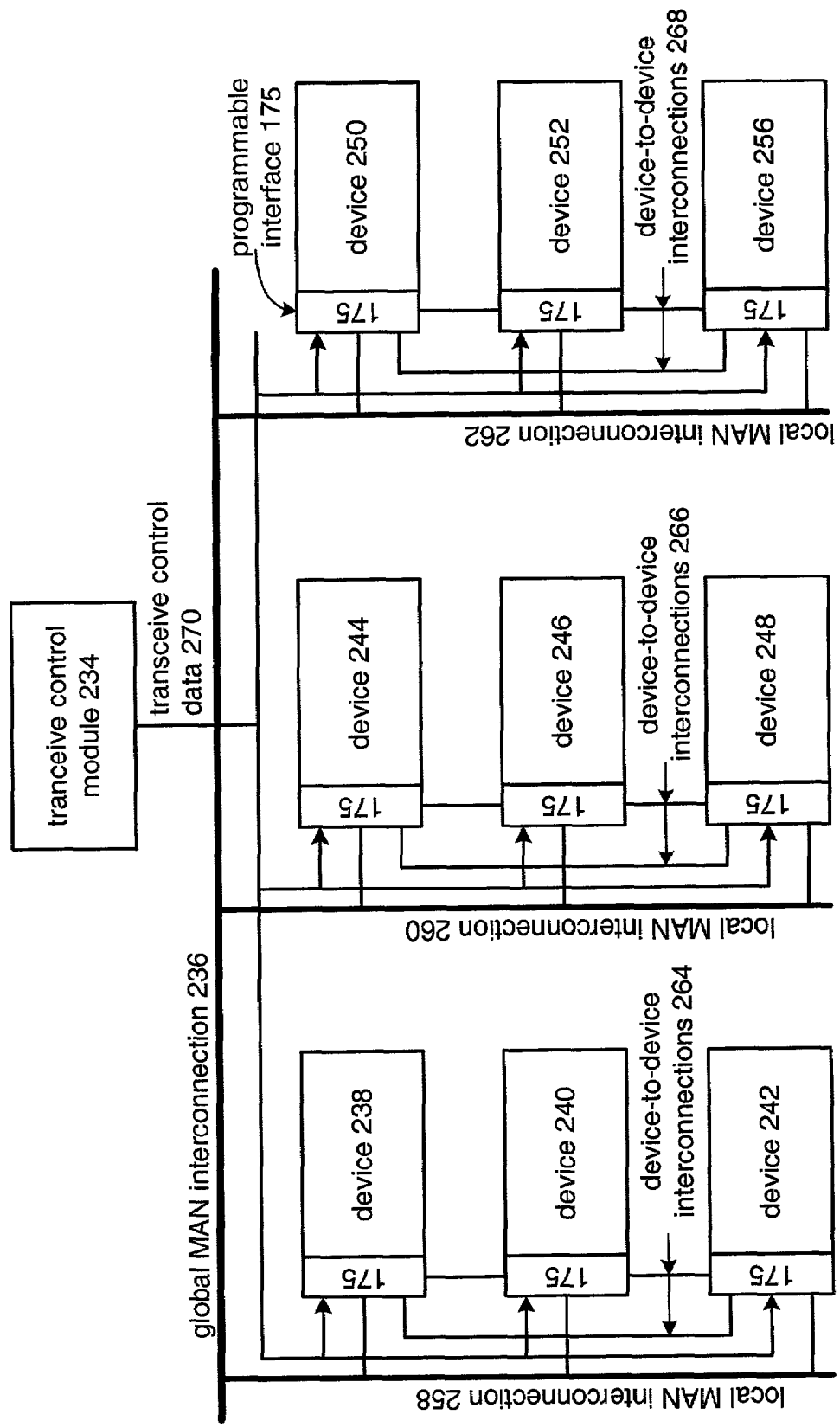
FIG. 8 illustrates an alternate schematic block diagram of a micro area network in accordance with the present invention.

FIG. 8 illustrates a schematic block diagram of a network component (e.g., switch, router, gateway, bridge, private branch exchange, packet switching exchange, DTE, end system, et cetera) that includes a plurality of devices 238-256 and a transceive control module 234. The devices 238-256 are arranged in groupings of three, 238-242, 244-248 and 250-256. As one of average skill in the art will appreciate, the network component may include more or less devices than shown in FIG. 6, 8 or 9 and have the groupings of devices in any number.

Each of the devices 238-256 includes a programmable interface 175. As illustrated, devices 238-242 are operably coupled via device-to-device interconnection 264 and via local MAN connection 258. Devices 244-248 are operably coupled via device-to-device interconnection 266 and local MAN interconnection 260. Devices 250-256 are operably coupled via device-to-device interconnection 268 and via local MAN interconnection 262. The local MAN interconnections 258-262 are operably coupled together via a global MAN interconnection 236. Each of the interconnections 236, 258-262, and 264-268 may be a single serial bus, multiple serial buses, parallel buses, and may further include a data bus, control bus, address bus, et cetera. In addition, each of the interconnects may be physically implemented utilizing twisted pairs, coaxial cables, fiber optics, traces on a printed circuit board, et cetera. As one of average skill in the art will appreciate, the device-to-device interconnections 264-268 may be omitted such that devices 238-256 communicate locally via the local MAN interconnections 258, 260 and 262.

The network component is operably coupled to receive and/or transmit network data. The network data may be packets that are to be converted to another network protocol, forwarded to one or more other network components, consumed by the network component and/or generated by the network component. Accordingly, each device 238-256 within the network component performs one or more functions to support the overall functionality of the network component. For example, if the network component is a router, devices 238-256 support routing the data packets from one network to another. Such routing may include protocol conversion of Layers 1-4, packet interpretation, et cetera. Data conveyed between the devices 238-256 within the network component utilize a local MAN protocol. As such, data external to the network component utilizes the corresponding network protocols of the networks in which the network component is coupled. Data within the network component, however, utilizes the local MAN protocol.

The transceive control module 234 is operably coupled to devices 238-256. The transceive control module 234 determines the particular local MAN protocol utilized by the devices 238-256 for internal network component communication. The transceive control module 234 generates transceive control data 270, which is provided to each of the devices 238-256, to coordinate the intra network component data conveyances. The transceive control data 270 includes the particular communication path or paths to use, the particular MAN protocol to use, controlling access to the local MAN interconnections 258-262 and/or controlling access to the global MAN interconnection 236.

The programmable interface 175 associated with each of the devices processes the transceive control data 270 to facilitate the formatting and deformatting of inbound and outbound network data into and from local MAN formatted data. The detailing of deformatting and formatting network data will be described in greater detail with reference to FIGS. 11-41.

As one of average skill in the art will appreciate, devices 238-256 may be integrated circuit boards, printed circuit boards, and/or rack components within a network component. In addition, each device may include the same functionality or complimentary functionality to facilitate the desired function of the network component. For example, if the network component is a router, each device may include all of the operations to perform routing such that multiple routing may be done in parallel by each device, or each device may include one or more functional steps of the routing process such that multiple devices 238-256 process a packet for routing.

The transceive control module 234, as configured, provides transceive control data 270 for the entire network component. Accordingly, the transceive control module 234 determines the best manner or most optimal manner in which to convey data within the network component among the devices. Accordingly, the transceive control module 234 will select the appropriate MAN protocol to use, the number of communication paths to use, and may further control access to the interconnections.

Figure 9:
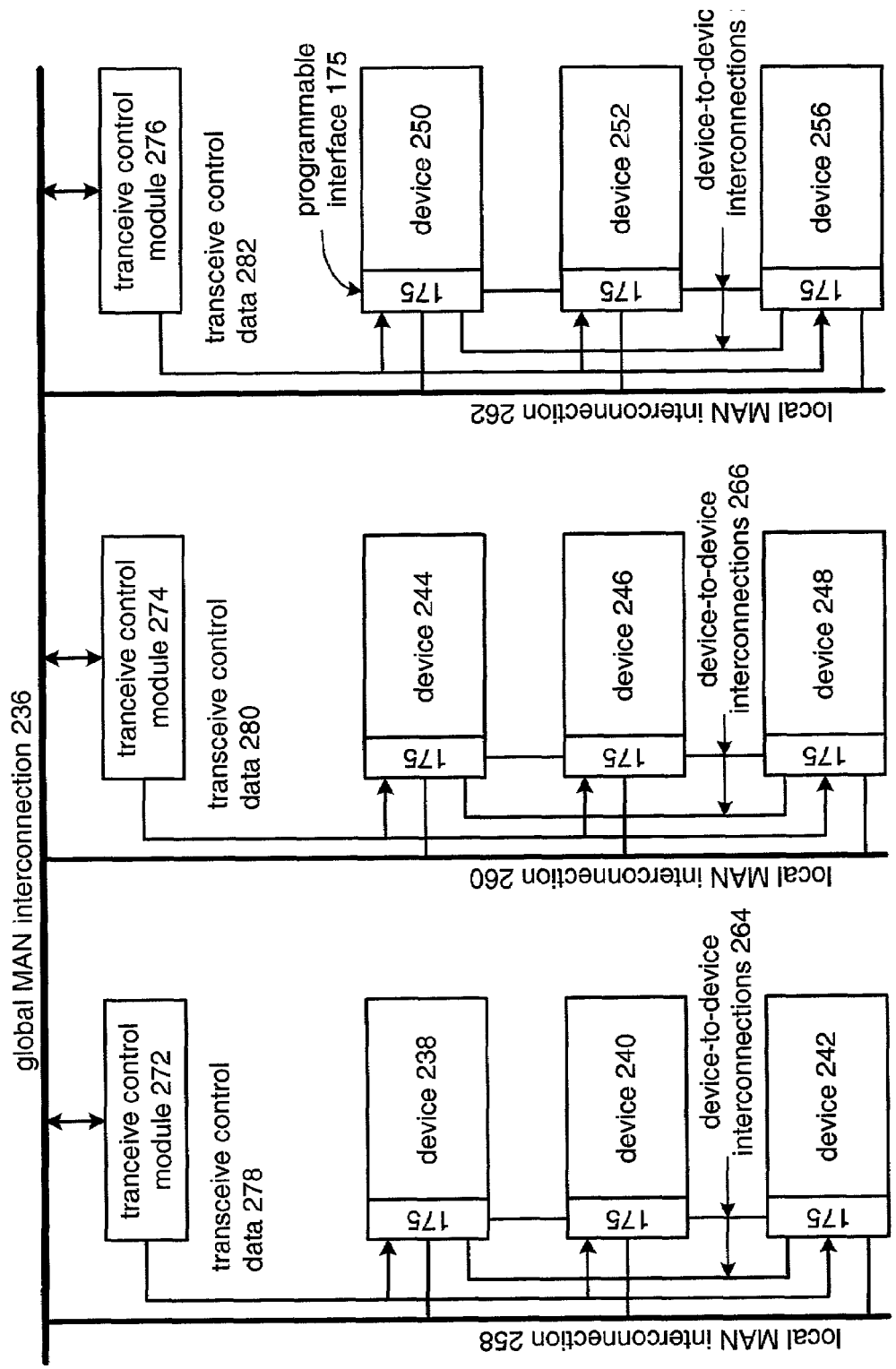
FIG. 9 illustrates yet another alternate schematic block diagram of micro area network in accordance with the present invention.

FIG. 9 illustrates an alternate schematic block diagram of a network component (e.g., router, bridge, gateway, switch, DTE, end system, private branch exchange, packet switching exchange, et cetera). The network component includes the plurality of devices 238-256, which each include a programmable interface 175. In this configuration, the grouping of devices each has its own associated transceive control module 272-276. As shown, devices 238-242 have an associated transceive control module 272. Devices 244-248 have an associated transceive control module 274. Devices 250-256 have an associated transceive control module 276. The functionality of devices 238-256 is as previously described with reference to FIG. 8 and will be further described with reference to FIG. 10. Each of the devices is operably coupled via device-to-device interconnections 264-268, via local MAN interconnections 258-262, and via a global MAN interconnection 236.

In this configuration, the transceive control module 272 produces transceive control data 278 for its associated devices 238-242. For example, devices 238-242 may be printed circuit boards within a rack component. As such, each rack component would include its own transceive control module. The transceive control module generates the control data 278 to indicate how data is to be transceived between devices 238 and 242 and other devices within the network component.

Transceive control module 274 and transceive control module 276 perform similar functions for its associated devices 244-248 and 250-256, respectively. Each of the transceive control modules 274, 276 generate transceive control data 280-282 which indicate for its associated devices how data is to be routed among the devices and to other devices. As such, the transceive control data 278-282 indicates the particular local MAN protocol to be utilized by the devices when communicating within their device group, with devices in the same network component and with devices outside of the network component.

Figure 10:
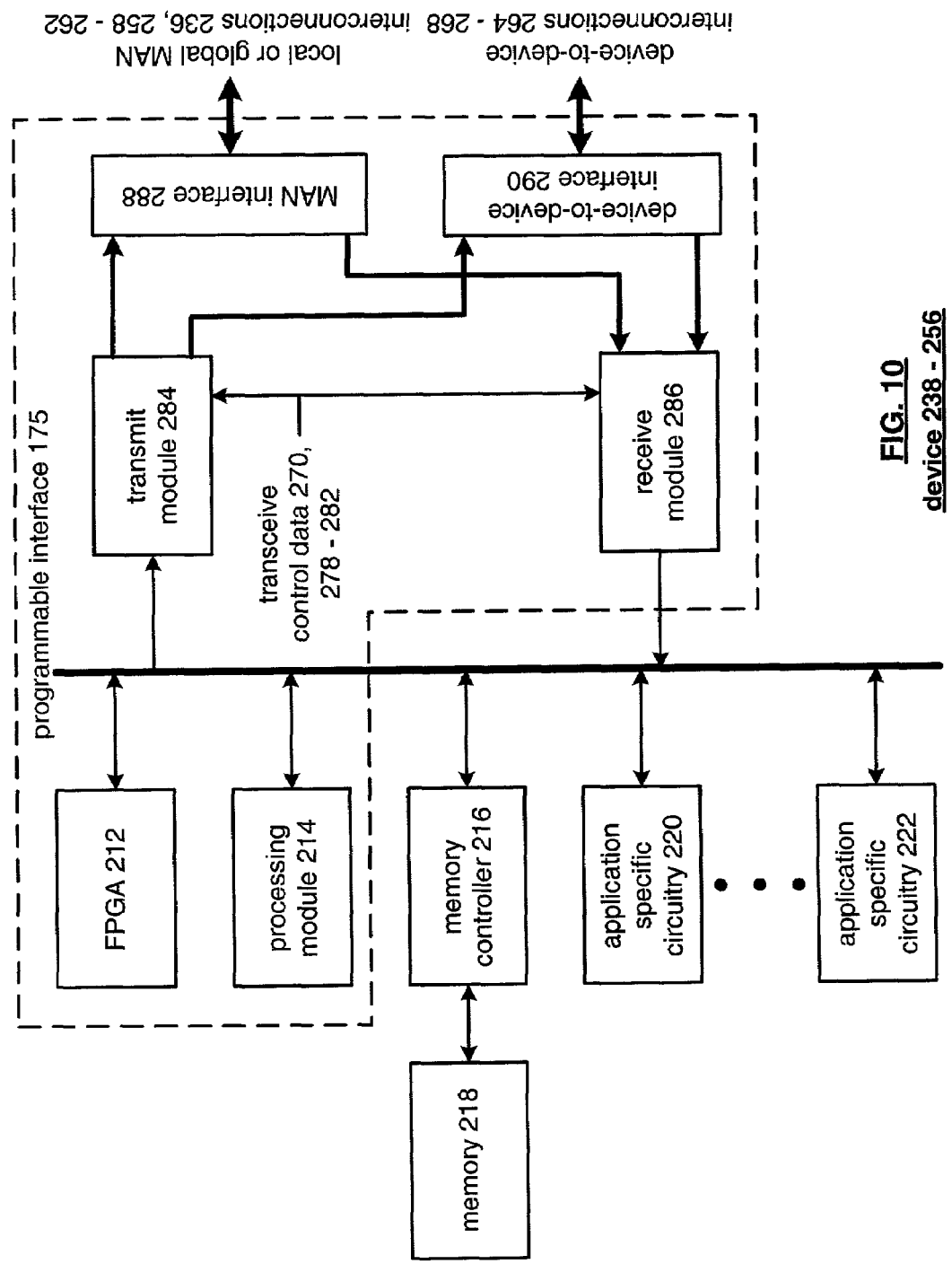
FIG. 10 illustrates a schematic block diagram of a device that may be utilized in the micro area networks of FIG. 8 or 9.

FIG. 10 illustrates a schematic block diagram of a device 238-256 of FIG. 8 or 9. The device includes an FPGA 212, a processing module 214, memory controller 216, memory 218, application specific circuitry 220-222, transmit module 284, receive module 286, a MAN interface 288 and a device-to-device interface 290. The programmable interface 175 may be implemented via the FPGA 212, processing module 214, transmit module 284, receive module 286, MAN interface 288 and device-to-device interface 290.

The transmit module 284 and receive module 286 are operably coupled to receive control data 270, 278-282. Control data 270 is received from transceive control module 234 of FIG. 8 while control data 278-282 is received via one of the transceive control modules 272-276 of FIG. 9. Note that each of the transceive control modules 234 or 272-276 may include a processing module and associated memory. The processing module may be a single memory device or a plurality of memory devices. Such a processing device may be a microcontroller, microcomputer, digital signal processor, programmable gate array, state machine, central processing unit, logic circuitry, and/or any device that manipulates signals (analog or digital) based on operational instructions. The memory may be a single memory device or a plurality of memory devices. Such a memory device may be non-volatile memory, volatile memory, static memory, dynamic memory, read-only memory, random access memory, and/or any device that stores digital information.

In general, the transceive control data 270 instructs the transmit module 284 as to how to format the data and which interface the formatted data should be transmitted on. Similarly, the transceive control data 270, 278-282 causes the receive module 286 to deformat incoming packets from interface 290 or interface 288. Alternatively, the transceive control data may instruct the transmit module and receive module to pass packets without formatting or deformatting. For example, if the incoming data that is being received by receive module 286 is already formatted in accordance with a selected MAN protocol, the receive module does not need to reformat and simply passes the formatted data onto the bus. Similarly, if the data being processed by the device 238-256 is already in the desired MAN format, the transmit module 284 passes the data onto one of the interfaces without further formatting. As a further example, if the data is to remain in the desired network format (e.g., TCP/IP, Ethernet, et cetera) the transmit and receive modules may pass such packets without formatting and/or deformatting. The formatting and deformatting performed by the transmit and receive modules will be further described with reference to FIGS. 11-41.

As one of average skill in the art will appreciate, the transmit module 284 and receive module 286 may be implemented as stand-alone devices utilizing a processing module and associated memory, may be implemented by processing module 214 utilizing memory 218 and/or implemented via the FPGA 212. FPGA 212, processing module 214, memory controller 216, memory 218, and application specific circuitry 220-222 has been previously discussed with reference to FIG. 7.

Figure 11:
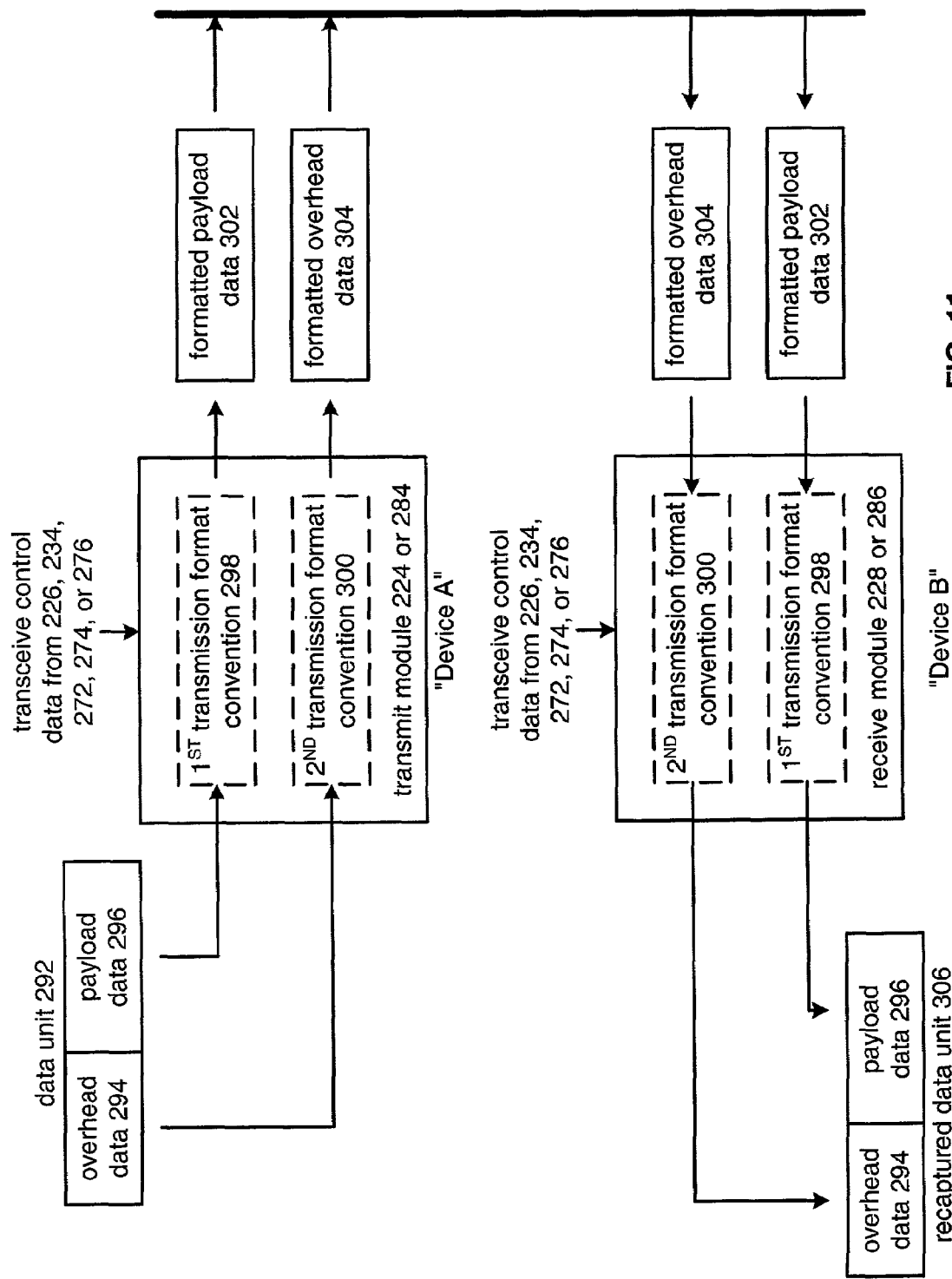
FIG. 11 illustrates a graphical representation of a data conveyance within a micro-area network in accordance with the present invention.

FIG. 11 illustrates a graphical diagram of the formatting and deformatting performed by the transmit module 224 or 284 of FIGS. 7 and 10, respectively and the deformatting performed by receive module 228 or 286 of FIGS. 7 and 10, respectively. As shown, the transmit module 224 or 284 of device A receives a data unit 292. The data unit is formatted in accordance with a network protocol of a network in which the network component incorporating device A resides or is coupled to. As shown, the data unit 292 includes overhead data 294 and payload data 296. The overhead data is interpreted to identify at least one target within the network component containing device A. In this particular example, device B of the network component is the identified target. For example, if the network component containing device A and device B is a network switch, device A may be associated with the communication port coupling to a first network while device B is associated with an output communication port coupling to another network. As such, the switch is configured to provide network switching to couple the data unit to be routed through device A to device B to the outgoing communication port.

The transmit module 224 or 228 is operably coupled to receive the data unit 292 and format the payload section 296 and the overhead section 294. To facilitate the formatting of the payload section 296, the transmit module 224 or 284, based on the transceive control data, utilizes a first transmission format convention 298 to produce formatted payload data 302. The details of the formatting used by the transmit module will be discussed in greater detail with reference to FIG. 12.

The transmit module 224 or 284 formats the overhead data 294 utilizing a second transmission format convention 300. The second transmission format convention 300 is a different formatting convention than the first transmission format convention 298. The transmit module 224 or 284 outputs the formatting overhead data 304 onto one of the buses coupling device A to device B.

As one of average skill in the art will appreciate, the second transmission format convention 300 is selected in relation to the first transmission format convention 298 such that the time it takes to transmit the overhead data is reduced thus increasing the available time for transmitting the payload data. As such, the network component including devices A and B becomes more efficient since a greater amount of payload data can be conveyed within the network component.

As one of average skill in the art will further appreciate, the formatted payload data 302 and the formatted overhead data 304 may be synchronously transmitted over different paths between device A and device B, may be serially transmitted between device A and device B, or asynchronously transmitted over the same or different buses.

In device B, the receive module 228 or 286 receives the formatted overhead data 304 and the formatted payload data 302. Utilizing the inverse of the second transmission format convention 300, the receive module 228 or 286 recaptures the overhead data 294 from the formatted overhead data 304. Similarly, the receive module 228 or 286 utilizes the inverse of the first transmission format convention 298 to recapture the payload data 296 from the formatted payload data 302. The receive module 228 or 284 then produces a recaptured data unit 306. The receive module 228 or 286 outputs the recaptured data unit 306 based on the transceive control data and/or an interpretation of the overhead data 294. Accordingly, the receive module 228 may interpret the overhead data 294 to determine a destination address to use for outputting the recaptured data unit 306.

If the data unit 292 does not require formatting, the transmit module 224 or 284 passes the data unit 292 without formatting. Similarly, receive module 228 or 286 in device B passes the received data without deformatting to produce data unit 306. In this instance, the transceive control data would indicate that the incoming data is to be passed without formatting or deformatting. Such an instance may arise when device A and device B are intermediate processing devices within a network component. Such an intermediate processing device is not directly coupled to an input port or an output port, wherein the data unit 292 received by transmit module 224 is already in the desired MAN format. Alternatively, device A may be directly coupled to the input communication port of the network component while device B is directly coupled to the output port of the network component and the data is simply to pass from device A to device B. In such an instance, the data unit 292 may be passed in accordance with its network format from device A to device B via the transmit and receive modules.

Figure 12:
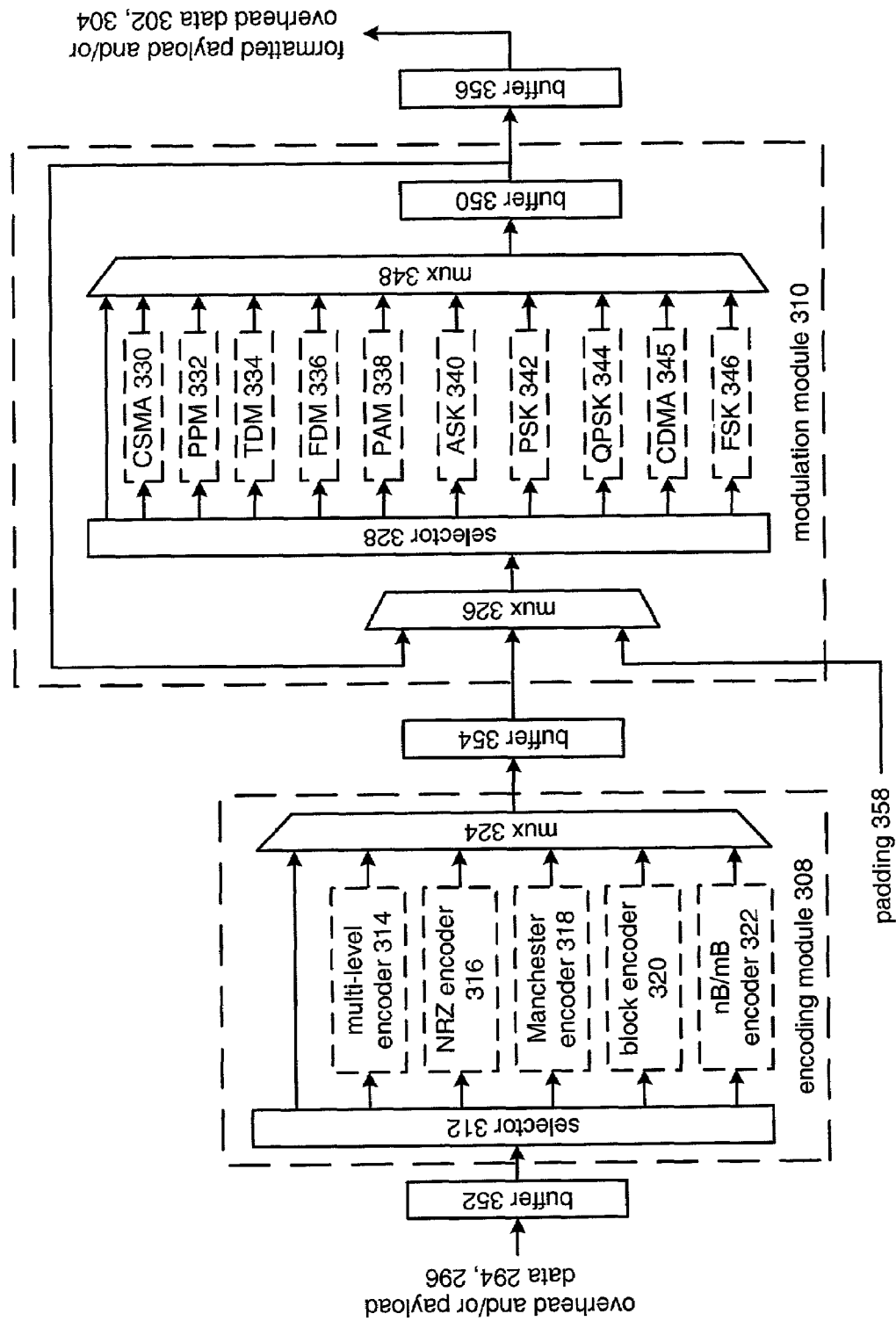
FIG. 12 illustrates a schematic block diagram of a transmitting module of a device within a micro area network in accordance with the present invention.

FIG. 12 illustrates a schematic block diagram of the transmit module 224 or 228. The transmit module 224 or 228 includes at least one of a plurality of buffers 352, 354, 350 and 356, an encoding module 308 and a modulation module 310. The encoding module 308 includes a selector 312, programmable logic that may be implemented to perform multi-level encoding 314, non-return to zero encoding 316, Manchester encoding 318, block encoding 320 and/or nB/mB encoding 322 (where n is less than m), and an output multiplexor 324. The modulation module 310 includes an input multiplexor 326, selector 328, programmable logic that may be programmed to implement CSMA module 330, pulse position modulation module 332, time division multiplexing module 334, frequency division multiplexing module 336, pulse amplitude modulation module 338, amplitude shift keying module 340, phase shift keying module 342, quadrature phase shift keying module 344, frequency shift keying module 346, an output multiplexor 348 and a buffer 350.

The transmitting module 224 or 284 may include a single encoding module 308 and/or a single modulation module 310. In such an embodiment, the encoding module 308 and/or the modulation module 310 processes both the overhead data and payload data. In an alternate embodiment, the transceiving module 224 or 284 may include an encoding module 308 and/or a modulation module 310 for processing the overhead data and another encoding module 308 and/or modulation module 310 for processing the payload data.

In operation, buffer 352 is operably coupled to receive and temporarily store overhead data and/or payload data. Based on the transceive control data, the selector 312 retrieves the overhead data and/or payload data from buffer 352 and provides it to one of the encoding modules or passes it directly to multiplexor 324. As one of average skill in the art will appreciate, encoding module 308 may include separate encoders for performing the multi-level encoding 314, the non-return to zero encoding 316, Manchester encoding 318, block encoding 320, and/or nB/mB encoding 322. Alternatively, the transceive control data may cause programmable logic to be configured to perform one or more of the encoding functions. In this embodiment, the nB/mB encoding may be, for example, 4B/5B encoding, 8B/10B encoding, et cetera. Multi-level encoding, non-return to zero encoding, Manchester encoding, block encoding and 4B/5B, 8B/10B encoding are known. Thus, no further discussion of the particular encoding process will be described except to further illustrate the concepts of the present invention.

As one of average skill in the art will appreciate, other encoding schemes may be used besides 314-322 as listed. For example, an inverted non-return to 0 may be utilized, differential Manchester encoding may be utilized, analog to digital conversion or digital to analog conversion may be utilized, alternate mark inversion encoding, bipolar with 800 substitution encoding, high density bipolar 3 encoding, and/or combinations thereof.

Multiplexor 324, based on the transceive control data, outputs the encoded data to buffer 354. As one of average skill in the art will appreciate, if the various types of encoding are implemented utilizing a programmable device such as FPGA 212, the selector 312 and multiplexor 324 may be omitted such that the incoming and outgoing data of encoder module 308 is stored in buffers 352 and 354, respectively. In other embodiments, the FPGA will be encoded to perform multiple types of encoding such that selector 312 and multiplexor 324 are operable to input and output the data to the appropriate encoder section of the FPGA.

The modulation module 310 includes an input multiplexor 326, a selector 328, programmable logic that may be implemented to perform CSMA 330, PPM (pulse position modulation) 332, TDM (time division multiplexing) 334, FDM (frequency division multiplexing) 336, PAM (pulse amplitude modulation) 338, ASK (amplitude shift keying) 340, PSK (phase shift keying) 342, QPSK (quadrature phase shift keying) 344, FSK (frequency shift keying) 346, CDMA 345, an output multiplexor 348 and an optional buffer 350. The input multiplexor 326 is operably coupled to select, based on the transceive control data either data stored in buffer 350, data stored in buffer 354, or padding data 358. The use of padding 358 will be described in greater detail with reference to FIGS. 25-27.

The selector 328 receives the output of multiplexor 326 and provides it to the bypass line or to one of the modulation modules based on the transceive control data. The output multiplexor 348 selects the output of one of the modules or the bypass line based on the transceive control information and provides its output to buffer 350. By providing feedback from buffer 350 to multiplexor 326, the modulation module 310 may implement nested modulation schemes. For example, a TDM concept may be utilized in combination with a CSMA concept, such that access to time slots of a TDM frame is obtained via CSMA. In addition, data may be pulse position modulated and then amplitude shift keyed to further embed data within the modulation concept. Once the modulation module 310 has modulated the data, it outputs the modulated data to buffer 356. When the data is to be transmitted by the transceive module, it is outputted from buffer 356 as the formatted payload data or formatted overhead data.

As one of average skill in the art will appreciate, there is an almost endless combination of encoding and modulating that may be performed on the payload data and overhead data to produce the formatted payload data and formatted overhead data. As one of average skill in the art will further appreciate, while the modulation module 310 is shown to include the previously described modulation concepts, other modulation concepts may be incorporated. The processing of the modulation concepts mentioned and illustrated in modulation module 310 is known. Thus, no further discussion of the particular functionality of such modulation concepts will be described except to further illustrate the concepts of the present invention.

Figure 13:
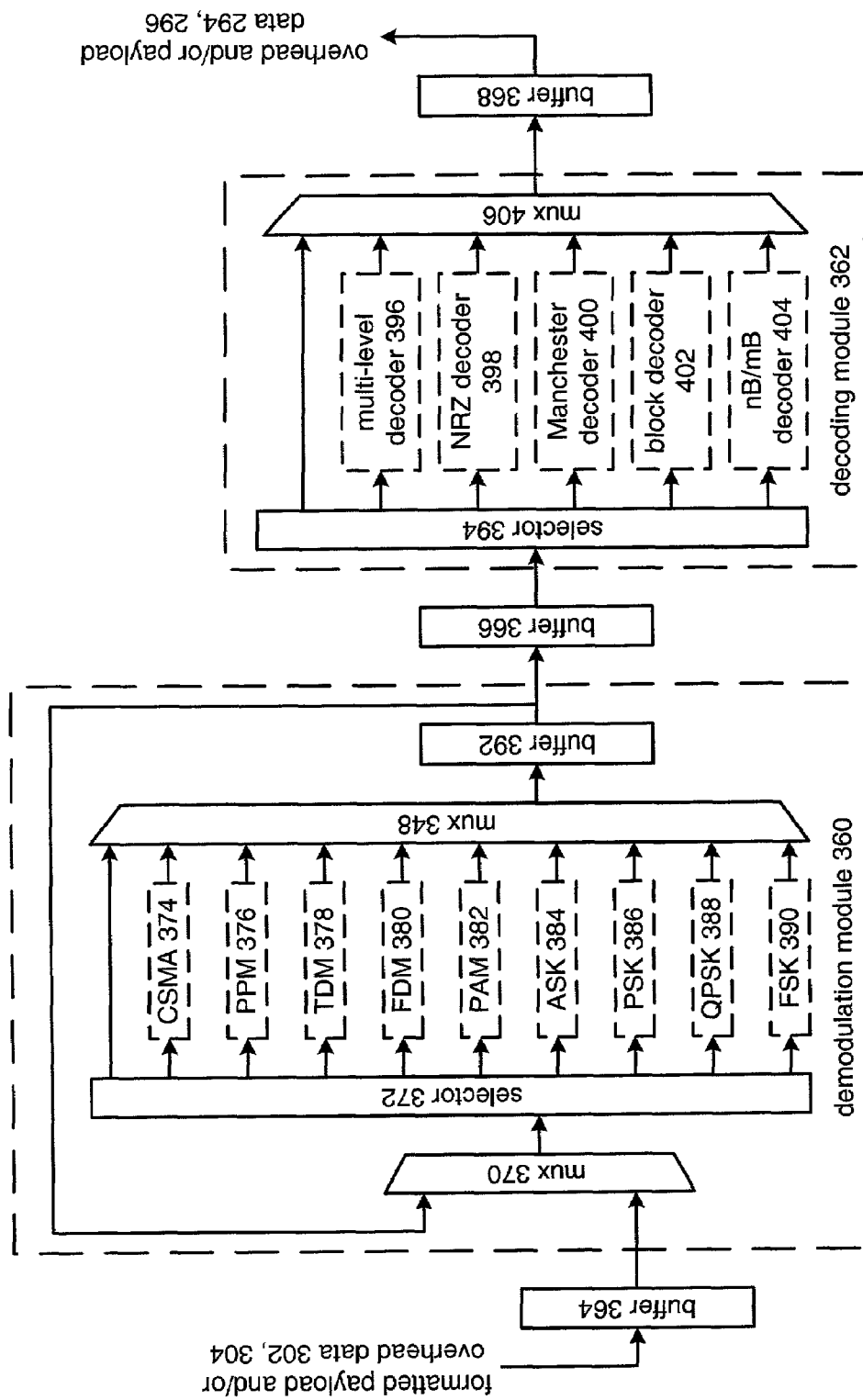
FIG. 13 illustrates a schematic block diagram of a receiving module of a device within micro area network in accordance with the present invention.

FIG. 13 illustrates a schematic block diagram of the receive module 228 or 286. The receive module 228 or 286 includes a plurality of buffers 364, 366, 368, at least one demodulation module and/or decoding module 362. For example, the receive module may include a demodulation module 360 and/or a decoding module 362 for both the formatted payload data and formatted overhead data. Alternatively, the receive module may include a separate demodulation module 360 and/or decode module 362 for the payload data and a separate demodulation module and/or decode module for the overhead data. The particular configuration of the receive module will be the inverse of the transceive module. Thus, if the transceive module only includes encoders, the receive module will only include decoders.

In operation, buffer 364 receives the formatted payload data and/or the formatted overhead data. The demodulation module 360 retrieves the formatted data from the buffer 364 via multiplexor 370. Based on transceive control data, multiplexor 370 outputs either the formatted payload or overhead data or the output of buffer 392 to the selector 372. The selector 372, based on transceive control data, provides the output of multiplexor 370 to one of the demodulation modules, which include CSMA 374, PPM 376, TDM 378, FDM 380, PAM 382, ASK 384, PSK 386, QPSK 388 and FSK 390, or to the bypass line.

The output multiplexor 348 of demodulation module 360 selects, based on transceive control data, the output of one of the demodulation modules or the bypass line. The multiplexor outputs the selected data to buffer 392. The feedback path from buffer 392 to input multiplexor 370 allows for data that has been modulated utilizing a nested modulation concept to be demodulated.

The decoding module retrieves demodulated data from buffer 366 and provides it, via selector 394, to one of the decoding modules to the mux 406 through the bypass line. The decoding modules form the corresponding decoding function corresponding to a multi-level decoding 396, non-return to zero decoding 398, Manchester decoding 400, block decoding 402, nB/mB decoding 404. Multiplexor 406 outputs the decoded data to buffer 368. The particular decoding performed is based on the transceive control data. The demodulation module 360 and the decoding module 362 may be implemented via a processing module and/or FPGA such that the demodulation functions and decoding functions may be programmed on an as-need basis or fixed programmed demodulation and/or decoding modules.

As one of average skill in the art will appreciate, the transmit module 224 or 284 and the receive module 228 or 286 may each include a logic unit that performs various logic functions, mathematical operations such as, add, subtract, divide, multiply, and/or filtering.

Figure 14:
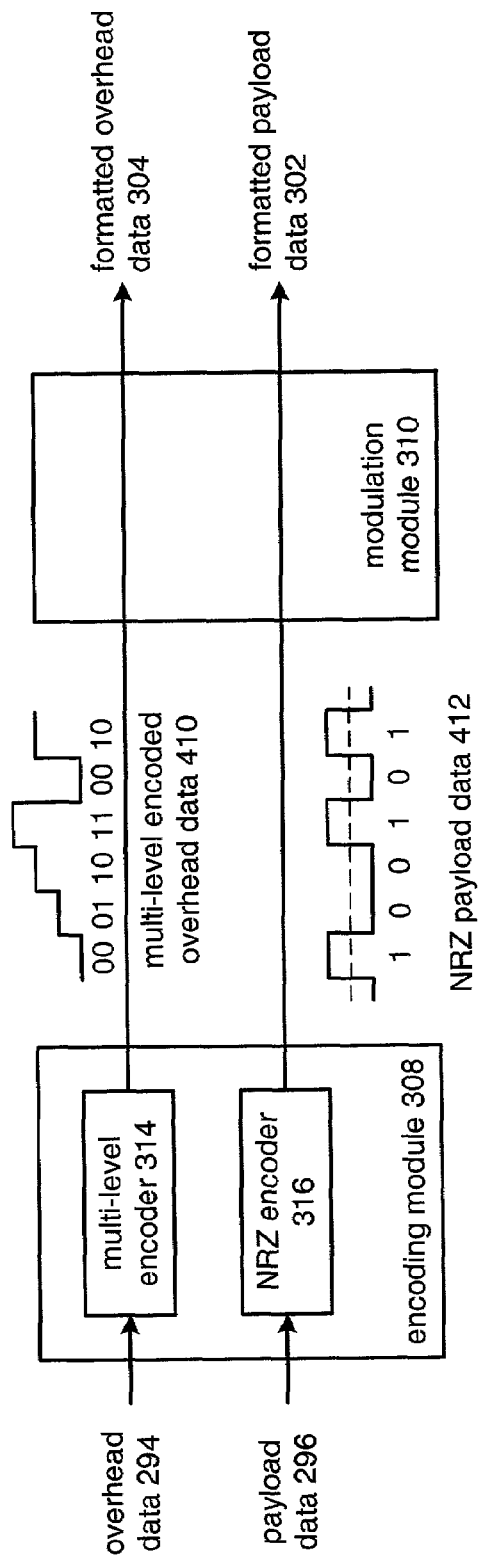
FIG. 14 illustrates a graphical diagram of formatting data within a micro area network in accordance with the present invention.

FIG. 14 illustrates an example embodiment wherein the encoding module 308 utilizes multi-level encoding 314 to encode the overhead data 294 and non-return to zero encoding 316 to encode payload data 296. The modulation module 310 is configured to pass through the multi-level encoded overhead data 410 and the non-return to zero payload data 412.

In this example, the multi-level encoder 314 of encoding module 308 processes the overhead data 294. The multi-level encoder 314 outputs multi-level encoded overhead data 410. The level of the encoding may be 4-level 2-bit encoding, 8-level 3-bit encoding, et cetera. As such, for 4-level 2-bit encoding, 2 bits of data are transmitted for every interval of overhead data. As such, by utilizing multi-level encoding as opposed to, for example, non-return to 0 encoding, for the overhead data, twice as much overhead data may be transmitted in the same period of time. As such, less time is dedicated to transmitting overhead data thus, making more time available for transmitting payload data.

In this example, the payload data 296 is encoded utilizing the non-return to zero encoder 316. The resulting data is non-return to zero payload data 412. Thus, the overhead data 294 is formatted utilizing a different convention than the convention used to format the payload data.

The formatted overhead data 304 and formatted payload data 302 may be outputted in serial or parallel on one or more communication paths. When transmitted in a parallel fashion, the formatted overhead data 304 and formatted payload data 302 may each be marked to relate the formatted payload data 302 with the formatted overhead data 304. The encoding module 308 or the modulation module 310 marks the data 302 and 304.

While the modulation module 310 is shown to pass the encoded overhead data 410 and the encoded payload data 412, the modulation module could also perform CSMA function, TDMA function, or FDMA function. In these configurations, the modulation module would control placing the data on the appropriate communication bus or buses. When the modulation module 310 is a straight pass through, the transceive control module may control the associated bus, by a token ring passing concept, or a slotted ring concept.

As one of average skill in the art will appreciate, if the transmit module includes the encoding module 308 and modulation module 310 as illustrated in FIG. 14, the receive module would include a decoding module that decodes multi-level data and decodes non-return to zero data to recapture the overhead data and payload data. The demodulation module within the receiver would be a pass through device. Alternatively, if the modulation module 310 utilizes CSMA, TDMA, FDMA, token ring, et cetera, the demodulation module would include the corresponding demodulation processing to accurately recapture the overhead data 294 and payload data 296.

Figure 15:
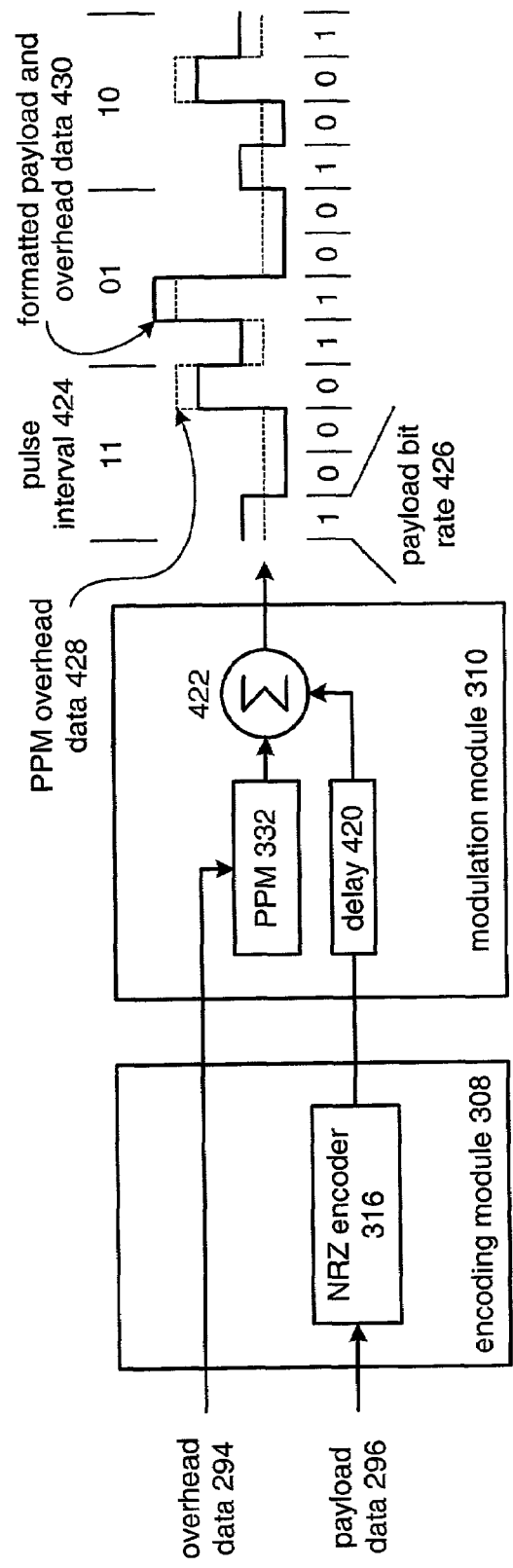
FIG. 15 illustrates an alternate graphical representation of formatting data for conveyance within a micro area network in accordance with the present invention.

FIG. 15 illustrates an alternate example embodiment of the transmit module 224 or 284. The encoding module 308 passes through overhead data 294 and utilizes non-return to zero encoding for the payload data 296. The modulation module 310 includes pulse position modulation for the overhead data 294 and delays the incoming non-return to zero encoded payload data. The pulse position modulated overhead data is summed with the non-return to zero encoded data to produce the formatted payload and overhead data. This is graphically illustrated at the output of the summing module 422.

As illustrated, the pulse position modulated overhead data 428 includes a pulse in a corresponding time slot of a particular pulse interval 424. In the illustration, each pulse interval 424 has 4 time slots. The pulse position modulated overhead data 428 is shown by a dashed line. For the $1^{st}$ pulse interval 424, data (1,1) has been encoded. In accordance with pulse position modulation, data (1,1) would be positioned in the $4^{th}$ time slot of pulse interval 424. The next pulse interval for the overhead data 428 encodes a data value of (0,1). This data is encoded by placing a pulse in the $2^{nd}$ time slot of the pulse interval 424. Continuing with the example, the $3^{rd}$ time interval encodes data (1,0) by placing a pulse in the $3^{rd}$ time slot of the $3^{rd}$ pulse interval.

The non-return to zero encoded payload data has its bit rate in accordance with the time slots (e.g., the same rate, a multiple thereof, or a divisor thereof), which divide the pulse intervals 424. By summing the non-return to zero data with the PPM overhead data 428, the resulting formatted payload and overhead data 430 appears. For example, during the $1^{st}$ interval 424 where the overhead data of (1,1) is encoded by placing a pulse in the $4^{th}$ time slot, the $1^{st}$ 3 bits of the non-return to zero encoded payload data are summed with a 0 signal thus producing what the non-return to 0 encoded payload data itself. During the $4^{th}$ time slot, where a pulse is placed for the PPM overhead data 428, the non-return to zero encoded payload data is modulated on top of the pulse thus producing the waveform as shown.

In this example, the overhead data is transmitted simultaneously with the payload data to maximize the available bandwidth for transmitting payload data. As one of average skill in the art will appreciate, the corresponding receiving module will include a demodulation module that filters the PPM overhead data 428 from the non-return to zero encoded payload data. The demodulation module will also include a demodulator that retrieves the data from the pulse position modulated data to recapture the overhead data. The decoding module of the corresponding receiver will include a non-return to zero decoder to recapture the payload data 296.

As one of average skill in the art will appreciate, FIGS. 14 and 15 illustrate two of a large number of possible configurations for formatting the payload data and the overhead data within a network component. Accordingly, a large number of encoding and/or modulating combinations may be utilized to achieve the desired results of improving bandwidth utilization within a network component.

Figure 16:
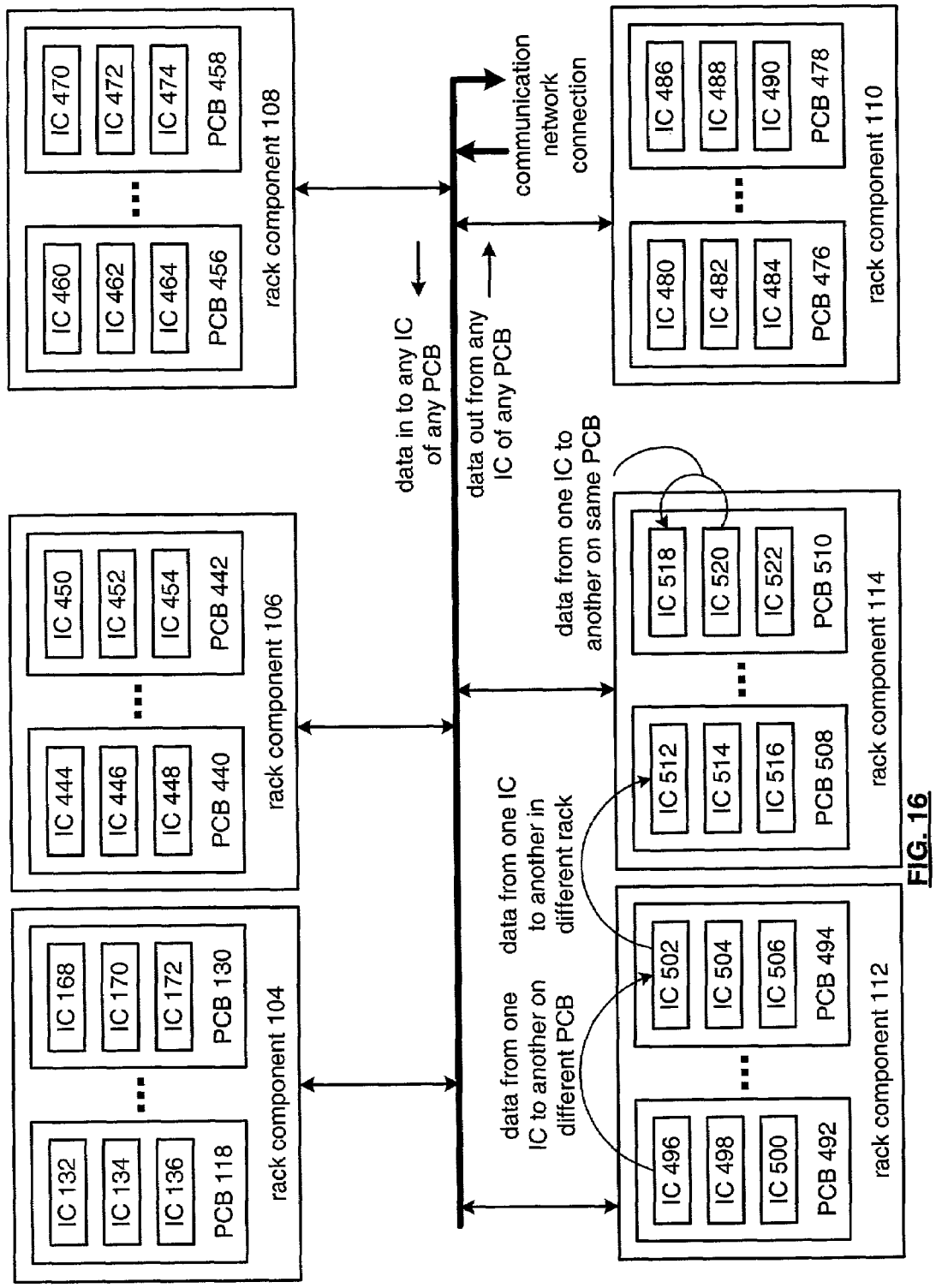
FIG. 16 illustrates a schematic block diagram of an internetworking unit and the data conveyance paths within the internetworking unit in accordance with the present invention.

FIG. 16 illustrates a block diagram of a rack of a network component (e.g., router, switch, bridge, gateway, DTE, end system, private branch exchange, packet switching exchange, et cetera). While only one rack is shown, one of average skill in the art will appreciate that the network component may include a plurality of racks similar to the rack illustrated in FIG. 16. The rack illustrated includes a plurality of rack components 104-114. Each rack component includes a plurality of printed circuit boards (PCBs) and each printed circuit board includes a plurality of integrated circuits (ICs). The rack components 104-114 are operably coupled together via at least one communication path that includes twisted pair connection, coaxial cable connection, and/or fiber optics connection.

Rack component 104 includes printed circuit boards 118-130. Printed circuit board 118 includes a plurality of integrated circuits 132-136, while PCB 130 includes a plurality of integrated circuits 168-172. Rack component 106 includes a plurality of printed circuit boards 440-442. PCB 440 includes a plurality of integrated circuits 444-448, while PCB 442 includes a plurality of integrated circuits 450-454. Rack component 108 includes a plurality of printed circuit boards 456-458. Printed circuit board 456 includes a plurality of integrated circuits 460-464 and printed circuit board 458 includes a plurality of integrated circuits 470-474. Rack component 110 includes a plurality of printed circuit boards 476-478. PCB 476 includes a plurality of integrated circuits 480-484 and PCB 478 includes a plurality of integrated circuits 486-490. Rack component 112 includes a plurality of printed circuit boards 492-494. PCB 492 includes a plurality of integrated circuits 496-500. Printed circuit board 494 includes a plurality of integrated circuits 502-506. Rack component 114 includes a plurality of printed circuit boards 508-510. PCB 508 includes a plurality of integrated circuits 512-516. PCB 510 includes a plurality of integrated circuits 518-522.

As configured, any integrated circuit on any of the printed circuit boards may receive data via a communication network connection, or port. Such a communication network connection couples the network component to one or more networks depending on the functionality of the network component. In addition, the communication network connection is operably coupled such that any integrated circuit from any printed circuit may output data via the communication network connection. As such, data inputted or outputted via the communication network connection will be in accordance with the network protocol of the network coupled to the communication network connection. Once the data is within the network component, the network component utilizes a MAN protocol to more efficiently route the data among the components (rack components, PCBs, and ICs) therein.

Within the network component, data may be routed from one integrated circuit to another on the same printed circuit board as illustrated with reference to rack component 114. Data may be routed from one integrated circuit on one printed circuit board to another integrated circuit on a different printed circuit board as illustrated with reference to rack component 112. Data may be routed from one integrated circuit in one rack component to another integrated circuit in a different rack component as illustrated with reference to rack components 112 and 114. As such, data may be routed anywhere within the network component for the appropriate processing of the data.

For this illustration, each of the printed circuit boards within each of the rack components will have a similar schematic architecture as illustrated in FIGS. 6-10. Accordingly, a PCB is a corresponding device as shown in FIGS. 6-10. Accordingly, the transceive control module affiliated with the printed circuit board, which may be a global transceive control module for all printed circuit boards and all of the rack components, controls the particular protocol used for conveyance of data between the integrated circuits, printed circuit boards, and rack components. In addition, the transceive control module coordinates the transmission resources within the network component to transmit data. As previously mentioned, the printed circuit boards within a rack may be operably coupled together via a plurality of communication paths. Each rack component may be operably coupled to other rack components utilizing a plurality of communication paths. Accordingly, the transceive control module may function as a bus arbitration for accessing the particular communication paths or facilitate a CSMA with collision avoidance and/or collision detection to gain access to the communication paths.

FIGS. 17-19 illustrate a graphical representation of data maintained by the transceive control module to establish the internal MAN protocol used for transmitting data within a network component. As shown, FIG. 17 is a table for transmission assignments 524, FIG. 18 is a table containing scheme/resource assignments 526, and FIG. 19 is a table for encoding/modulation/serial parallel 528. Collectively, the information in FIGS. 17-19 constitutes data use information for the network component.

FIG. 17 illustrates the transmission assignments 524 and includes a source field, a destination field and a scheme field. The source field includes the address of a particular component within the network component. For example, as illustrated, the 1$^{st}$ entry in the source field is 132-118-104. This corresponds to integrated circuit 132 of PCB 118 of rack component 104. The destination address includes a similar 3 level code, which as illustrated is 134-118-104. This destination address corresponds to integrated circuit 134 of printed circuit board 118 of rack component 104. As such, for the 1$^{st}$ entry, data is being conveyed from one integrated circuit on the same printed circuit board within the same rack component to another. Thus, the transceive control module has selected a particular protocol formatting convention to use, which has been designated as scheme A.

The next entry has a source address corresponding to integrated circuit 132 of printed circuit board 118 of rack component 104. The destination address corresponds to the integrated circuit 136 of printed circuit board 118 of rack component 104. Again, the communication path is on the same printed circuit board within the same rack component between different integrated circuits. For this example however, the formatting convention has been selected to be scheme B. Note that the particular schemes will be discussed in greater detail with reference to FIGS. 18 and 19.

The next entry in the transmission assignment table 524 has a source address corresponding to integrated circuit 132 of printed circuit board 118 of rack component 104. The destination address corresponds to any integrated circuit on printed circuit board 130 within rack component 104. As such, for any data conveyances between integrated circuit 132 on printed circuit board 118 in rack component 104 to any integrated circuit on printed circuit board 130 within rack 104, the formatting convention will correspond to scheme C.

The next entry in the transmission assignment table 524 has a source address of integrated circuit 132 of printed circuit board 118 of rack component 104. The destination address corresponds to any integrated circuit on any printed circuit board in rack component 106. For any such data conveyances between integrated circuit 132 on printed circuit board 118 of rack component 104 to any integrated circuit on any printed circuit board within rack component 106 the formatting convention will be in accordance with scheme D.

The next entry in the transmission assignment table is similar to the previous entry except that the communication is to any integrated circuit on any printed circuit board in rack component 108. For such data conveyances, the formatting convention will again be scheme D. For communications between integrated circuit 132 of PCB 118 within rack component 104 to any integrated circuit on any printed circuit board in rack components 110, 112 or 114, the formatting convention will be in accordance with scheme E.

The transmission assignment table 524 will include source destination and scheme information for every integrated circuit on every printed circuit board within each rack component similar to that shown for integrated circuit 132 on printed circuit board 118 of rack component 104. Alternatively, the transmission assignment table 524 may be simplified in that any communication on a printed circuit board between integrated circuits uses one formatting convention, communications between integrated circuits on different printed circuit boards within the same rack component will utilize another formatting convention and integrated circuits within different rack components will use another formatting convention. As one of average skill in the art will appreciate, the granularity of formatting conventions for data conveyances may be as detailed or as high-leveled as desired. In addition, one of average skill in the art will appreciate that the data of the tables illustrated in FIGS. 17-19, may be obtained at setup of the network component wherein test signals are transmitted between components within the network component to determine the most efficient formatting convention to utilize. Once this is obtained, the data is recorded in one of the tables of FIGS. 17-19. Alternatively, the data may be preprogrammed based on simulations and/or may be obtained periodically by performing tests of the network component. As one of average skill in the art will further appreciate, the addressing convention used in FIG. 17 may be of any addressing convention to identify different elements in a network.

FIG. 18 illustrates a scheme/resource assignment table 526 that includes a scheme field, a resources field and an encoding/modulation/serial-parallel field. The scheme field of FIG. 18 corresponds to the scheme field of FIG. 17. As such, when a particular transmission assignment addresses a particular scheme is addressing one of the scheme resource assignments in FIG. 18. The first entry in table 526 corresponds to scheme A for which the resources will be one communication path, the encoding modulation and serial parallel transmission will have a code of 1-0-S. The 1-0-S code will be further described with reference to FIG. 19. The next entry in table 526 is for scheme B that will utilize two communication paths with an encoding modulation serial parallel scheme of 1-0-P. The next entry is for scheme C, which indicates that the overhead data will be on one communication path and the payload data will be on a separate communication path. The encoding modulation and serial parallel scheme for scheme C is 2-1-S. Table 526 will include further entries for each of the schemes that may be utilized within the network component. Note that one of the schemes may be designed as a default scheme such that if in table 524 of FIG. 17 a scheme is not designated, the default scheme will be utilized.

FIG. 19 illustrates an encoding/modulation/serial-parallel table 528 that includes an encode/modulation/serial-parallel field, an overhead encoding field, a payload encoding field, overhead modulation field, payload modulation field, and a serial/parallel field. The first entry in Table 528 has an encode modulation serial parallel code of 1-0-S. This corresponds to scheme A of FIG. 18. For this particular encoding modulation serial parallel scheme, the overhead data will be encoded utilizing multi-level encoding, the payload will be encoded utilizing non-return to zero. The overhead and payload data will not be modulated. The one communication resource that has been allocated for this data conveyance will be a serial transmission of the overhead data and payload data as indicated by the serial/parallel field.

The next entry in Table 528 has an encode/modulation/serial parallel code of 1-0-P. As indicated, the overhead data will be encoded utilizing multi-level encoding, the payload data will be encoded utilizing non-return to zero encoding. The encoded modulated data and payload data will not be modulated as indicated in the overhead modulation and payload modulation fields. In this instance, the data will be transmitted in parallel such that the overhead data will be transmitted on one path and the payload data will be transmitted on another path in parallel. The next entry in Table 528 has an encode/modulation/serial-parallel code of 2-1-S. For this particular code, the overhead data will be encoded utilizing multi-level encoding and the payload data will be encoded utilizing nB/mB encoding. (For example, 4B/5B encoding.) Neither the payload data nor the overhead data will be modulated. For this instance, the overhead data will be transmitted on one path and the payload data will be transmitted on a second path. The next entry in Table 528 has an encode/modulation/serial-parallel code of 0-1-S. For this code, the overhead data is not encoded and the payload data is encoded utilizing non-return to zero. The overhead data is modulated utilizing a PPM modulation scheme and the encoded payload data is mixed or summed with the modulated overhead data. The resulting signal is transmitted in serial over a single communication path.

The remainder of Table 528 includes any number of combinations of encoding of the overhead data, encoding of the payload data, modulation of the overhead data, and modulation of the payload data over one or more communication paths in serial or in parallel. As such, the level of options for the encoding modulation and serial-parallel combinations is almost endless and may be as complex or as simple as desired for the particular applications of the network component.

Figure 20:
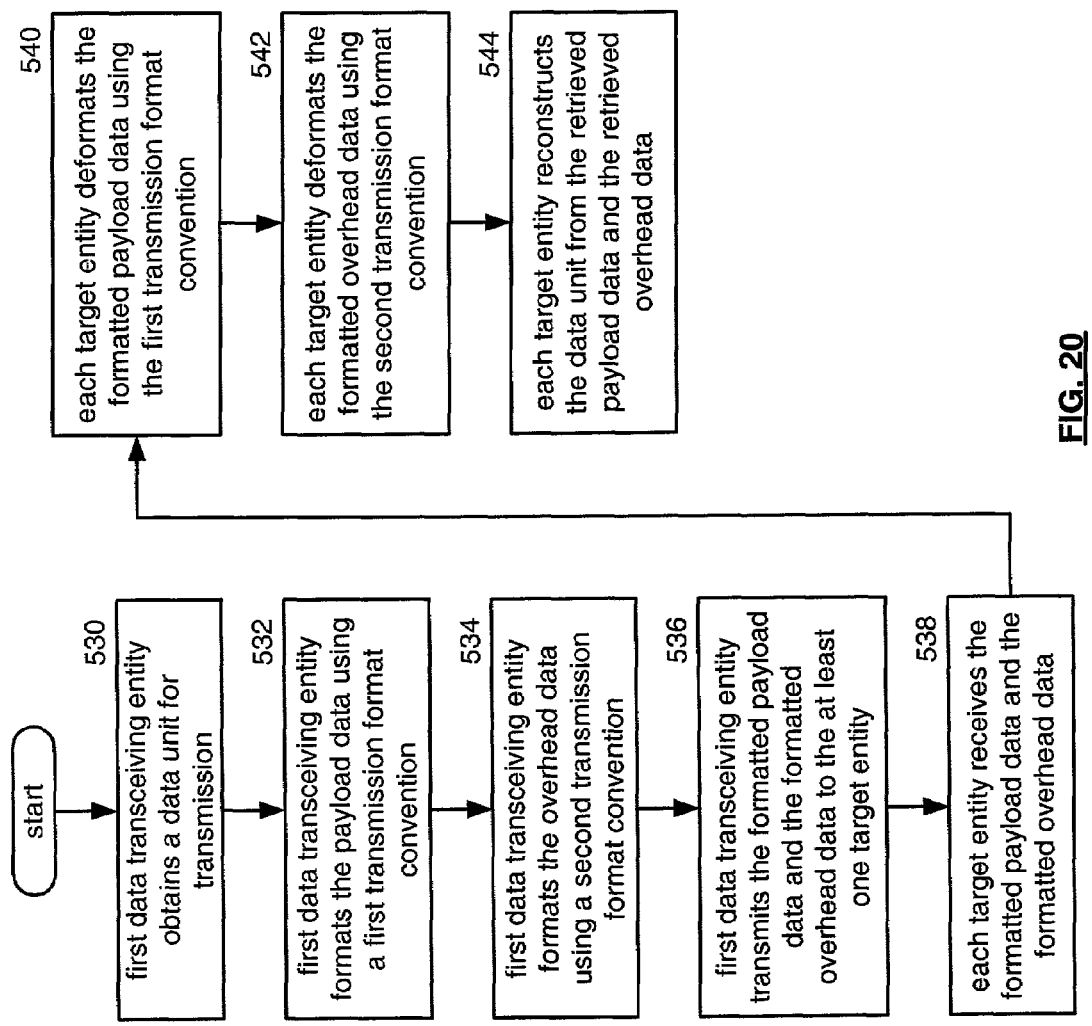
FIG. 20 illustrates a logic diagram of a method for conveying data within a micro area network in accordance with the present invention.

FIG. 20 illustrates a logic diagram of a method for transceiving data in a micro-area network (e.g., within a network component) that includes a plurality of transceiving entities (e.g., devices having a programmable interface). The process begins at Step 530 where a $1^{st}$ data transceiving entity obtains a data unit for transmission. The data unit includes payload data and overhead data. The overhead data directly or indirectly identifies at least one target entity in the micro-area network for receiving the data. The overhead data will directly address the receiving device when the device is the destination of the data. The overhead data will indirectly address the receiving device when the receiving device is in the processing path to get the data to the destination.

The $1^{st}$ data transceiving entity may obtain the data unit by receiving the data from a source external to the micro-area network, receiving the data from a source within the micro-area network, and/or generating the data. Note that the data unit may be a datagram, data packet, and/or data frame wherein each of these data units may include nested network packets within physical layer packets.

The process proceeds to Step 532 where the $1^{st}$ data transceiving entity formats the payload data using a $1^{st}$ transmission format convention. The $1^{st}$ transmission format convention, as previously described with reference to FIGS. 11 and 12, indicates that the payload data may be encoded and/or modulated in a multitude of combinations. For example, the payload data may be encoded utilizing one or more of multi-level encoding, non-return to zero encoding, Manchester encoding, block encoding, and nB/mB encoding where n<m. An example of nB/mB encoding may be 4B/5B, 8B/10B, et cetera. If the $1^{st}$ transmission format convention indicates encoding only, the encoded format data will be processed as the formatted payload data. If, alternatively, the $1^{st}$ transmission format convention indicates that the encoded payload data is also to be modulated, the $1^{st}$ data transceiving entity modulates the encoded payload data. Such modulation schemes include pulse position modulation, time division multiplexing, frequency division multiplexing, pulse amplitude modulation, amplitude shift keying, frequency shift keying, phase shift keying, quadrature phase shift keying, and carrier sense multiple access. As yet another alternative, the $1^{st}$ transmission format convention may indicate that the payload data is to only be modulated. In this instance, the $1^{st}$ data transceiving entity would modulate the payload data to produce formatted payload data.

The process then proceeds to Step 534 where the $1^{st}$ data transceiving entity formats the overhead data using a $2^{nd}$ transmission format convention. In most applications, the $2^{nd}$ transmission format convention will be different than the $1^{st}$ transmission format convention. However, in certain situations, the $1^{st}$ and $2^{nd}$ transmission format conventions may be the same. For example, if the data being processed by the $1^{st}$ transceiving entity is already in the appropriate format (i.e., in the desired MAN protocol), the processing for the overhead data and payload data by the $1^{st}$ transceiving entity will be the same.

As with formatting the payload data, the $1^{st}$ transceiving entity may format the overhead data by encoding the overhead data and/or modulating the overhead data. The encoding may be done by utilizing any type of encoding scheme including, but not limited to, multi-level encoding, non-return to zero encoding, Manchester encoding, block encoding, nB/mB encoding, where n<m. The modulation scheme used by the $1^{st}$ data transceiving entity may include any modulation scheme including, but not limited to, pulse position modulation, time division multiplexing, frequency division multiplexing, pulse amplitude modulation, amplitude shift keying, frequency shift keying, phase shift keying, quadrature phase shift keying, and carrier sense multiple access.

The process then proceeds to Step 536 where the $1^{st}$ data transceiving entity transmits the formatted payload data and the formatted overhead data to at least one target entity. This was graphically illustrated and described with reference to FIG. 11. The $1^{st}$ data transceiving entity may transmit the formatted payload and overhead data in a variety of ways. For example, the formatted overhead data may be transmitted on a $1^{st}$ communication path while the formatted payload data may be transmitted on a $2^{nd}$ communication path. Such a communication path may include one or more physical connections that include printed circuit board traces, twisted pairs, coaxial cables, and/or fiber optic coupling. As another example, the $1^{st}$ data transceiving entity may transmit the formatted payload and overhead data synchronously such that the formatted overhead data and payload data have a time-dependency association when received by the target entity. Alternatively, the $1^{st}$ data transceiving entity may transmit the formatted overhead data and payload data asynchronously by including an identifier within the formatted payload data and formatted overhead data to associate the formatted overhead and payload data as being part of a single packet. As yet another example, the $1^{st}$ data transmission entity may transmit the formatted payload data and formatted overhead data in a frame in accordance with a TDMA concept, token ring concept, and/or slotted ring concept. As a still further example, the $1^{st}$ data transceiving entity may transmit the formatted payload and overhead data utilizing a carrier sense multiple access (CSMA) protocol, CSMA with collision avoidance, and/or CSMA with collision detection.

The process then proceeds to Step 538 where each target entity receives the formatted payload data and the formatted overhead data. This was graphically illustrated in FIG. 11. The reception of the formatted payload and overhead data will depend on how the data was transmitted. For example, the formatted overhead data may be received on a $1^{st}$ communication path while the formatted payload data is received on a $2^{nd}$ communication path. The data may be received synchronously such that the overhead data and payload data are associated in time thereby constituting a packet. Alternatively, the formatted payload data and overhead data may be received asynchronously wherein the formatted overhead data and formatted payload data are interpreted to associate the formatted overhead data with the formatted payload data. As yet another alternative, the formatted payload data and the formatted overhead data may be received in a frame in accordance with a TDMA concept, token ring concept, slotted ring concept, et cetera. As a still further example, the formatted payload data and formatted overhead data may be received in accordance with a CSMA concept, CSMA with collision avoidance, and/or CSMA with collision detection.

The process then proceeds to Step 540 where each target entity deformats the formatted payload data using the $1^{st}$ transmission format convention. This was graphically illustrated in FIG. 11 utilizing the receiving module as illustrated in FIG. 13. In particular, each target entity deformats the formatted payload data based on how it was formatted. Accordingly, the target entity may decode the formatted payload data and/or demodulate the formatted data. The decoding may include one or more of any known decoding scheme including, but not limited to, multi-level decoding, non-return to zero decoding, Manchester decoding, block decoding, nB/mB decoding where n<m. The demodulation may include any known demodulating scheme including, but not limited to pulse position demodulation, time division multiplexing demodulation, frequency division multiplexing demodulation, pulse amplitude demodulation, amplitude shift keying demodulation, frequency shift keying demodulation, phase shift keying demodulation and quadrature phase shift keying demodulation. Note that the encoding and subsequent decoding may include utilizing the network layer/physical layer overhead for a $1^{st}$ packet and indicating in subsequent packets a MAN overhead that identifies the reuse of the $1^{st}$ packet in a series of related packets.

The process then proceeds to Step 542 where each of the target entities deformats the formatted overhead data using the $2^{nd}$ transmission format convention. This was graphically illustrated in FIG. 11 and may be done in accordance with the receive module illustrated in FIG. 13. The deformatting is dependent on the modulation scheme and/or encoding scheme identified by the $2^{nd}$ transmission format convention. As such, each target entity may decode and/or demodulate the formatted overhead data to recapture the overhead data.

The process then proceeds to Step 544 where each target entity reconstructs the data unit from the retrieved payload data and the retrieved overhead data. Once the data unit is reconstructed, the target entity processes it accordingly. Such processing may include forwarding the packet outside of the micro-area network (e.g., outside of the network component to a network), and/or consumption of the data for internal processing.

Figure 21:
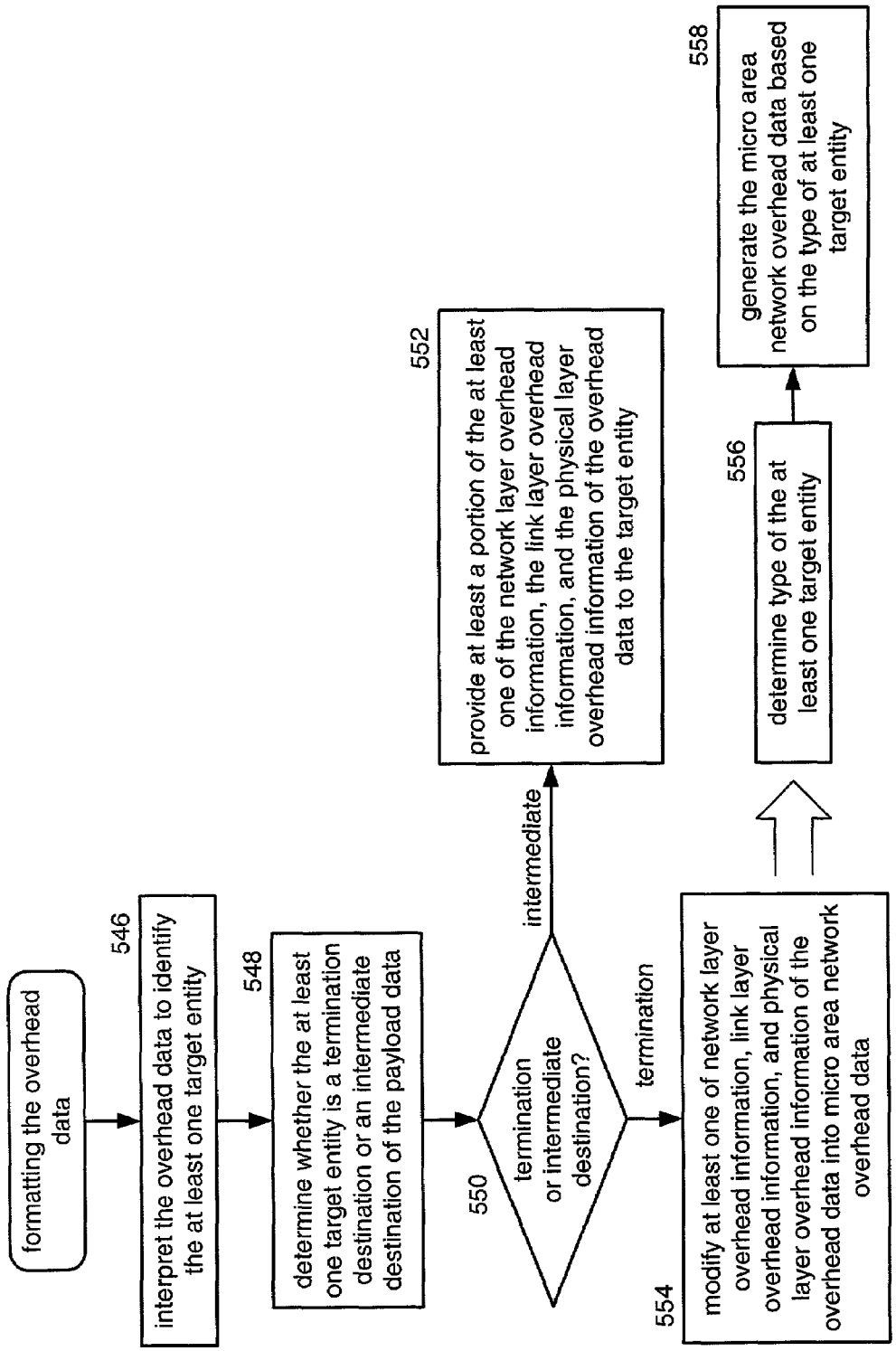
FIG. 21 illustrates a logic diagram of a method for formatting the overhead data of FIG. 20.

FIG. 21 illustrates a logic diagram that further illustrates the formatting of the overhead data as depicted in FIG. 20. The process begins at Step 546 where the overhead data is interpreted to identify at least one target entity. The interpretation is done to identify the destination address or addresses of the particular packet or packets. The process then proceeds to Step 548 where a determination is made as to whether the target entity is a termination destination or an intermediate destination of the payload data. A termination destination is a destination in which the data is to be consumed by the particular transceiving entity. For example, if the micro-area network is in an end user system, and the targeted entity is a video graphics processor and/or associated central processing unit, the targeted transceiving entity would be the termination destination (i.e., the entity that consumes the data for presentation to the user). An intermediate destination is one that may do some processing, such as switching, forwarding, routing, et cetera, but passes the data along to another entity either within the micro-area network or external to the micro-area network.

The process then proceeds to Step 550 where a branch decision is made based on whether the target entity is a termination destination or an intermediate destination. When the target entity is an intermediate destination, the process proceeds to Step 552. At Step 552, at least a portion of at least one of the network layer overhead information, the link layer overhead information and/or the physical layer overhead information is provided within the overhead data to the target entity. For example, the overhead data that is provided to the target entity may be the exact network overhead section of the packet received by the micro-area network formatted as previously described with reference to FIGS. 14 and 15 and as will be described with reference to FIG. 22. As an alternative example, the physical layer network layer and/or link layer overhead may be modified to produce the overhead data that is provided to the target entity within the micro-area network. Such modification may include replacing actual data with lookup table indexes that the micro-area network employs to encode the actual overhead data. For example, the header link, which specifies the length of a datagram, may be encoded and/or omitted by utilizing fixed sized datagrams within the micro-area network. As yet another example, the overhead section may be replaced by a MAN overhead section, which indicates, for a series of packets, to use the overhead section of the $1^{st}$ packet in the series. The $1^{st}$ packet in the series includes the network layer overhead, physical layer overhead and/or link layer overhead of the particular packets. This example will be further described with reference to FIG. 23.

If the target entity is a termination destination, the process proceeds to Step 554. At Step 554, the network layer overhead information, the link layer overhead information and/or the physical layer overhead information of the overhead section of the data packet is modified into a micro-area network overhead section. In this instance, the micro-area network overhead data identifies the target entity and the data use information. As previously mentioned, the data use information indicates how the information within the packet is to be decoded and/or demodulated to retrieve the actual information. As an additional example, since the data is at the destination, all network layer, physical layer and link layer overhead information may be removed except the particular address within the micro-area network of the target entity.

The processing of Step 554 may be further described with reference to Steps 556 and 558. At Step 556, a determination is made as to the type of the target entity or entities. The process then proceeds to Step 558 where the micro-area network overhead data is generated based on the type of the target entity or entities. For example, if the target entity is a video graphics processor within an end system, the overhead section is stripped-down to provide the information necessary for the video graphics processor to render the data within the packet.

Figure 22:
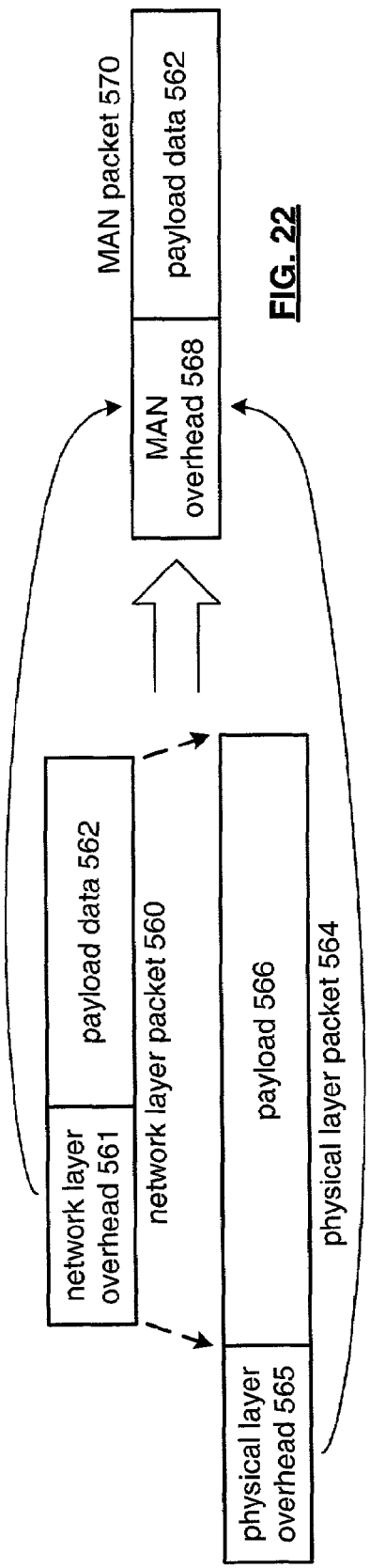
FIG. 22 illustrates a graphical representation of packetizing data in accordance with the present invention.

FIG. 22 illustrates a graphical representation of modifying the overhead data of a particular packet to produce a micro-area network overhead section. In this example, the packet being processed includes a physical layer packet 564 that includes a physical layer overhead section 565 and a payload section 566. Within the payload section 566 is a network layer packet 560. The network layer packet 560 includes a network layer overhead section 561 and a payload data section 562.

In this example, the target entity is a termination destination for the packet 564. In accordance with the present invention, the network layer overhead data 561 and physical layer overhead data 565 may be modified to produce an MAN overhead data 568. Thus, producing a MAN packet 570 that includes the MAN overhead section 568 and the payload data 562. Since the MAN packet 570 is destined for consumption by the target entity, the MAN overhead section 568 needs to utilize the information in the network layer overhead 561 and the physical layer overhead 565 such that the target entity knows that it is the target of the data and what to do with the data 562 when it gets it. By modifying the overhead section 568, the number of bits being transmitted within the micro-area network is reduced. By reducing the number of bits transmitted for overhead data, the relative throughput of the micro-area network is improved.

For example, if the physical layer is formatted in accordance with the Ethernet standard, and the network layer is formatted in accordance with TCP/IP, the MAN overhead section 568 merely needs to contain sufficient addressing information to identify the target entity or entities in the micro area network. As such, the addressing information in the network layer overhead section 561 and the physical layer overhead section 565 will be interpreted to determine the particular micro-area network address of the target entity. Once this address is obtained within the micro-area network, it may be utilized within the MAN overhead 568 as opposed to the TCP/IP address and the physical layer address.

Figure 23:
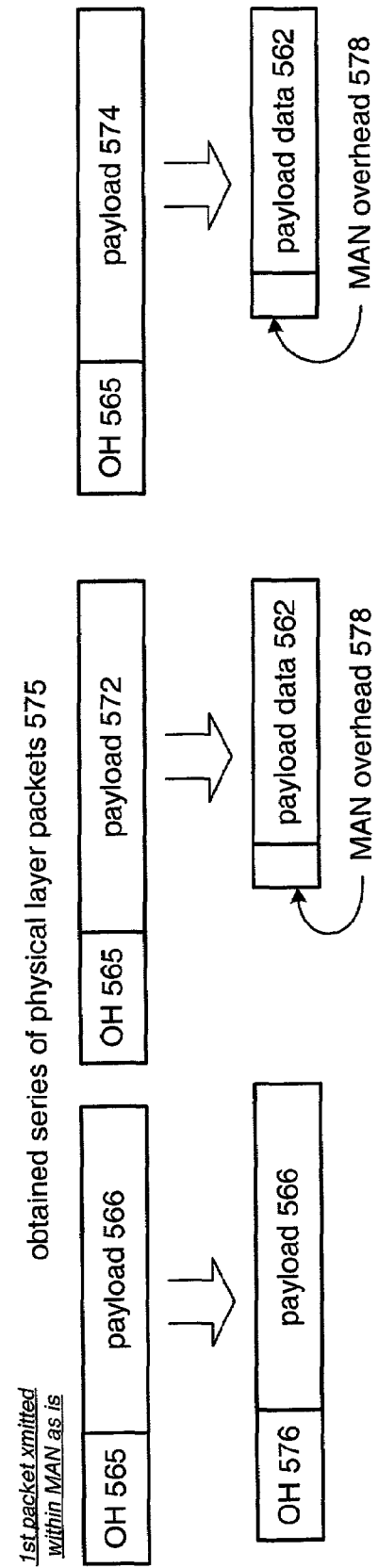
FIG. 23 illustrates a graphical representation of an alternate example of packetizing data in accordance with the present invention.

FIG. 23 illustrates a graphical representation of an alternate method for modifying the overhead section. In this example, a series of physical layer packets 575 is received by the micro-area network. The physical layer packets 575 include the same information in the overhead section. For example, the series of physical layer packets 575 may be generated by an end user downloading an MP3 file, video file, text file, et cetera from an Internet content provider. As such, the payload data for each packet will be different but the overhead section will be very similar for each packet in the series.

When the micro-area network receives the $1^{st}$ packet of the series of packets 575, it provides the $1^{st}$ packet, which includes overhead section 576 and payload 566 to the target entity. In addition, the micro-area network, via the transceiving module that receives the data and is transmitting it to another entity within the micro-area network, generates a MAN overhead section 578. The MAN overhead section 578 indicates to the receiving entities within the micro-area network that the same overhead section 576 of the $1^{st}$ packet is to be used for X number of remaining packets in the series 575. The number X corresponds to the number of packets in the series of physical packets. This may be done based on a packet-by-packet basis where the transceiving entity recognizes that the next packet in the series of packets is related to the $1^{st}$ packet or based on an indication that the next X number of packets are all part of the same series.

When each of the target entities receives the $1^{st}$ packet that includes overhead 576 and payload 566, it stores the overhead data 576. For the next packet, which includes MAN overhead section 578 and payload data 562, the target entity may strip off the MAN overhead 578 and replaces it with overhead 576 for subsequent processing. The same process is followed for each of the remaining packets in the series. Accordingly, the transmitting entity within the micro-area network adds the MAN overhead 578 in place of the physical layer overhead 576. Each of the receiving entities recognizes the MAN overhead 578 and replaces it with overhead section 576 for routing, switching, et cetera.

As one of average skill in the art will appreciate, the packets transmitted within the micro-area network as illustrated in the examples of FIGS. 22 and 23 may incorporate the encoding and/or modulation schemes graphically depicted in FIGS. 14 and 15. For example, the $1^{st}$ packet in the series of packets may be transmitted as illustrated in FIG. 14 wherein the overhead section is encoded utilizing multi-level encoding thereby decreasing the amount of time to transmit the overhead data. Alternatively, the overhead data may be encoded utilizing pulse position modulation as illustrated in FIG. 15. As yet a further example, the overhead section may not be modified and transmitted in accordance with the examples illustrated in FIGS. 14 and/or 15. As demonstrated by the preceding examples, there is a wide variety of ways in which throughput of data within a micro-area network (e.g., network component such as a switch, router, bridge, gateway, DTE, end system, PBX, packet switching exchange, et cetera) may be improved by manipulating the overhead data section. As one of average skill in the art will further appreciate, the micro-area network, while provided as examples of being in a network component, may also be a network in a relatively small area where the distances between devices of the network is relatively short and of a fixed distance.

Figure 24:
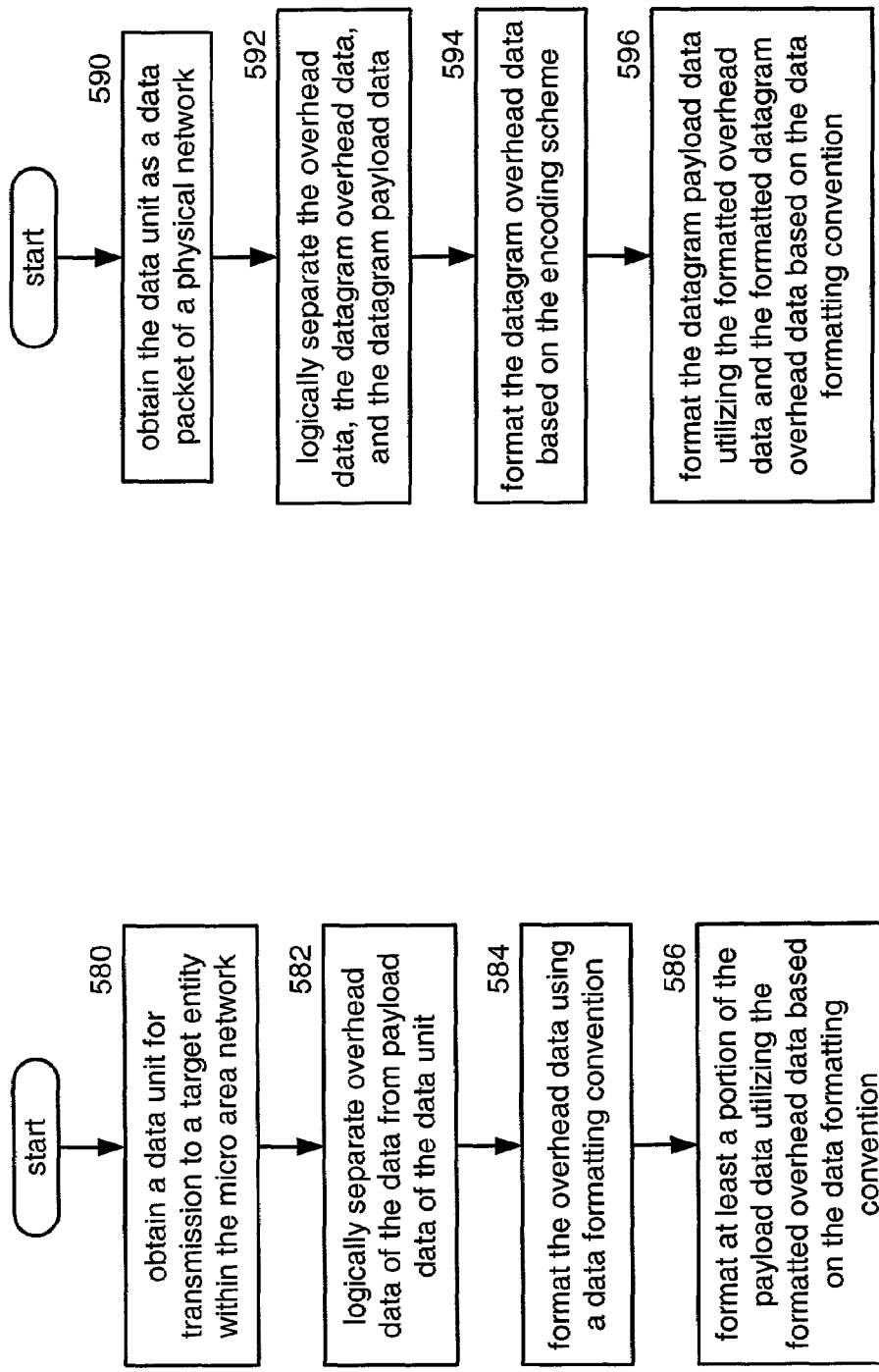
FIG. 24 illustrates a logic diagram of a method for transmitting data within a micro area network in accordance with the present invention.

FIG. 24 illustrates a logic diagram of a method for transmitting data within a micro-area network. The process begins at Step 580 where a data unit for transmission to a target entity within the micro-area network is obtained. The data unit may be obtained by reception from a device external to the micro-area network generated within the micro-area network and/or received from another entity within the micro-area network. In particular, the data unit may be a datagram, data packet and/or data frame.

The process then proceeds to Step 582 where the transmitting entity logically separates the overhead data from the payload data of the data unit. The process then proceeds to Step 584 where the transmitting entity formats the overhead data using a data formatting convention. The data formatting convention may be done in a variety of ways. For example, the formatting may be done by determining the rate of the payload data, the size of the payload data and the size of the overhead data. Based on this information, the rate of the overhead data is adjusted. Once the rate of the overhead data is adjusted, it is then encoded and/or modulated to produce the formatted data in accordance with the data formatting convention.

As the rate of the overhead data is adjusted, a determination may be made as to whether the adjusted rate-size product of the overhead data is within acceptable tolerance limits of the rate-size product of the payload data. When the adjusted rate-size product of the overhead data is not within acceptable tolerance limits, the overhead data is padded to bring the rate-size product of the overhead data within the acceptable limits. The padding may be done by adding idle data and will be discussed in greater detail with reference to FIGS. 27-29. A further example of formatting the overhead data, control data may be provided with the overhead data. The control data indicates how the formatting is done, what to do with the data upon receipt, et cetera. For example, the control data may be transmitted using the default formatting convention. When the control data is deformatted, the actual formatting convention may be retrieved for subsequent use.

The process then proceeds to Step 586 where at least a portion of the payload data is formatted utilizing the formatted overhead data based on the data formatting convention. For example, the payload data may be modulated on the formatted overhead data. FIG. 15 illustrates one example of the process of FIG. 24. As one of average skill in the art will appreciate, there is a wide variety of ways in which the payload data may be modulated and/or encoded based on modulated and/or encoded overhead data. The concept is to simultaneously transmit the overhead data and payload data to improve the throughput of payload data within a micro-area network by modulating and/or encoding the payload data on the overhead data or vice versa.

Figure 25:
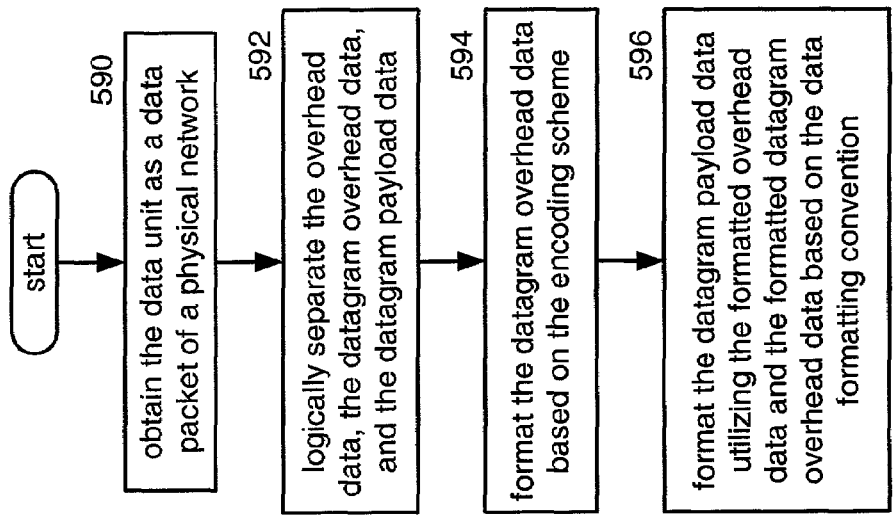
FIG. 25 illustrates a logic diagram of an alternate method for transmitting data within a micro area network in accordance with the present invention.

FIG. 25 illustrates a more detailed logic diagram of the method of FIG. 24 when the data unit is a physical layer packet. The process begins at Step 590 where the data unit is obtained as a data packet formatted in accordance with a physical layer protocol. In this instance, the payload data of the data unit includes a datagram, which in turn includes a datagram overhead data and a datagram payload data. The process then proceeds to Step 592 where the transmitting entity logically separates the overhead data, the datagram overhead data and the datagram payload data. The process then proceeds to Step 594 where the transmitting entity formats the datagram overhead data based on an encoding scheme. Such an encoding scheme may be in accordance with the data formatting convention described with reference to FIGS. 12 and 24. The process then proceeds to Step 596 where the transmitting entity formats the datagram payload data utilizing the formatted overhead data and the formatted datagram overhead data in accordance with the data formatting convention. As such, when a data packet includes nested packets as illustrated in FIG. 22, the network layer overhead section 561 of network layer packet 550 of FIG. 22 may be encoded using one encoding data formatting convention, the physical layer overhead 565 of the physical layer packet 564 of FIG. 22 may be formatted in accordance with another data formatting convention wherein both of the formatted overhead sections may be utilized to format the payload section. In this example, the network layer overhead data, the physical layer overhead data and the payload data 562 of FIG. 22 are transmitted simultaneously. Alternatively, the payload data may be formatted based on one of the overhead sections as graphically illustrated in FIG. 15 and the other overhead section may be multi-level encoded as illustrated in FIG. 14.

Figure 26:
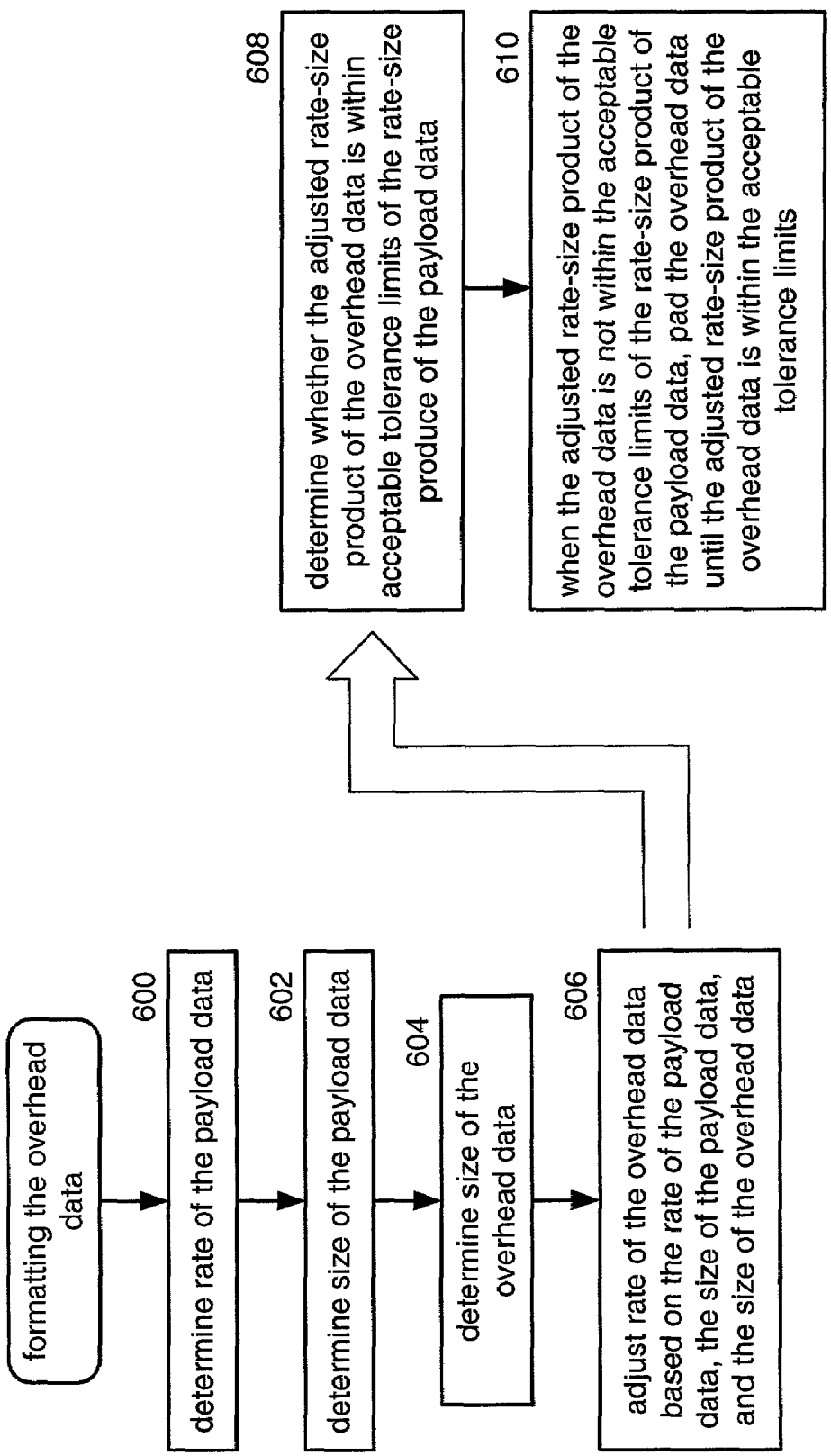
FIG. 26 illustrates a logic diagram of formatting the overhead data of FIG. 25.

FIG. 26 illustrates a logic diagram for formatting the overhead data of Step 584 of FIG. 24 or Step 594 of FIG. 25. The process begins at Step 600 where the rate of the payload data is determined. The rate of the payload data corresponds to the millions of bits per second being transmitted. The process then proceeds to Step 602 where the size of the payload data is determined. For example, the payload data may range from 46 bytes to 1500 bytes. The process then proceeds to Step 604 where the size of the overhead data is determined. The size of the overhead data may range from 24 bytes to 50 bytes.

The process then proceeds to Step 606 where the rate of the overhead data is adjusted based on the rate of the payload data, the size of the payload data and the size of the overhead data. This adjusting is done such that the rate-size product of the payload data substantially equals an adjusted rate-size product of the overhead data. The processing of Step 606 may be further defined with reference to Step 608 and 610. At Step 608, a determination is made as to whether the adjusted rate-size product of the overhead data is within acceptable tolerance limits of the rate-size product of the payload data, i.e., the product of the overhead is substantially equal to, or a divisor of, the product of the payload data.

The process then proceeds to Step 610, where, when the adjusted rate-size product of the overhead data is not within the acceptable tolerance limits, the overhead data is padded until the adjusted rate-size product of the overhead data is within acceptable tolerance limits. The concepts described in FIG. 26 are further illustrated with reference to FIGS. 27-29.

Figure 27:
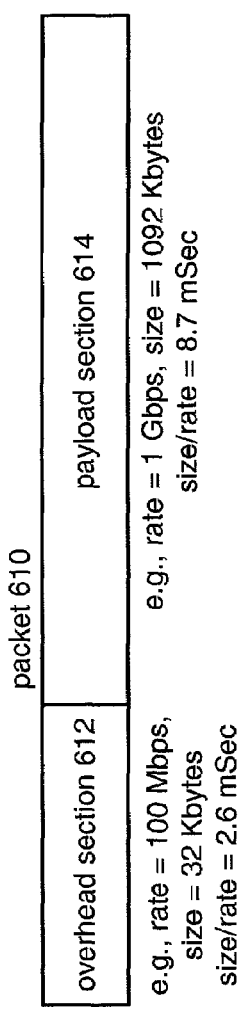
FIG. 27 illustrates a packet in accordance with the present invention.

FIG. 27 illustrates a packet 610 that includes an overhead section 612 and a payload section 614. For this example packet, the rate of the overhead data is 100 megabits per second, has a size of 32 kilobytes and thus has a rate-size product of 2.6 milliseconds (i.e., 100 Mbps/32 Kbytes). The payload section 614 has a rate of 1 gigabit per second and a size of 1,092 kilobytes, thus it has a rate-size product of 8.7 milliseconds (1 Gbps/1092 Kbytes).

Figure 28:
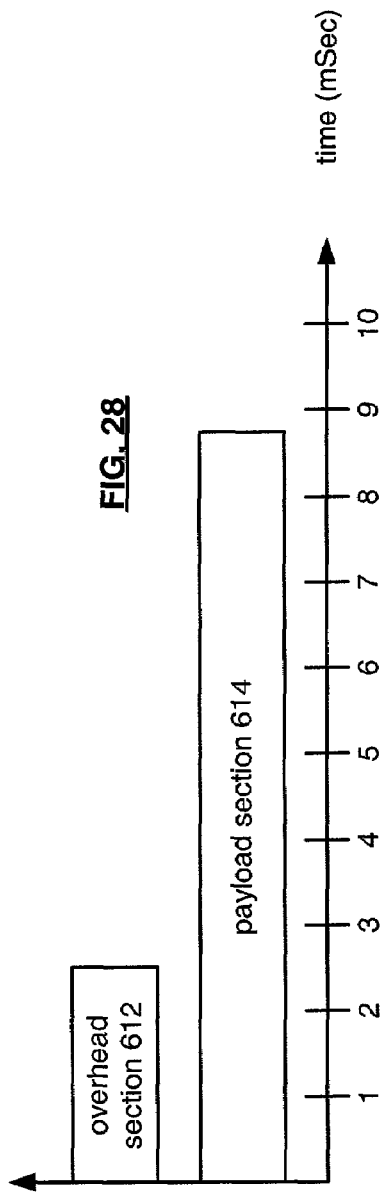
FIG. 28 illustrates a timing relationship between an overhead section and payload section of a packet in accordance with the present invention.

FIG. 28 graphically depicts the overhead section 612 and the payload section 614 graphed along a time axis. As shown, the overhead section 612 takes approximately 2.6 milliseconds to transmit while the payload section 614 requires 8.7 milliseconds. As such, the payload section takes almost 3 times as long to transmit as the overhead section.

If the overhead section and payload sections are transmitted on separate paths, the overhead section, rate-size product may not have to be adjusted and thus, transmitted as is. If, however, the overhead section and payload section are to be transmitted over a single communication path in a technique that modulates and/or encodes the payload data with respect to the overhead data, then the rate-size product of the overhead section needs to be adjusted.

Figure 29:
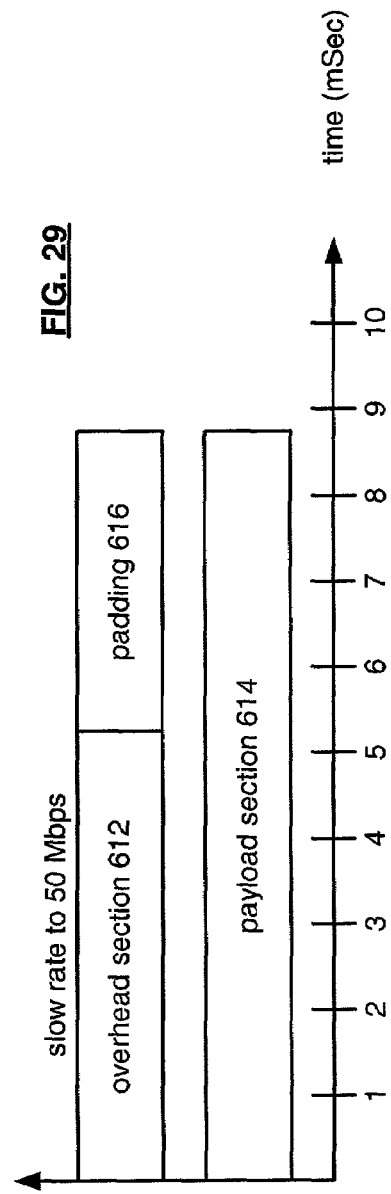
FIG. 29 illustrates a graphical representation of adjusting the rate of the overhead section with respect to the payload section in accordance with the present invention.

FIG. 29 illustrates the overhead section having its rate slowed to 50 megabits per second thus, taking 5.2 milliseconds to process. Since 5.2 milliseconds is not substantially equal to 8.7 milliseconds, the overhead section includes padding 616 at a 50 megabits per second rate such that 8.7 milliseconds of overhead data, with padding, is produced. In this form, the rate-size product of the overhead section with padding and the payload section substantially match. When this occurs, the encoding and/or modulation of the payload data with respect to the overhead data as one example of FIG. 15 illustrates, may be readily performed.

FIG. 30 illustrates a logic diagram of a method for receiving data within a micro-area network. The processing begins at Step 620 where a formatted data unit is received. The formatted data unit includes a formatted overhead section and a formatted payload section. The formatted overhead data and formatted payload data are separated for individual processing. For example, the receive module of FIG. 13 may receive the formatted data unit and perform the steps of FIG. 30.

The process then proceeds to Step 622 where the receiving entity deformats the formatted payload data utilizing the formatted overhead data based on a data formatting convention. For example, as illustrated in FIG. 15, the payload data is modulated based on the overhead data wherein the particular type of modulation and encoding of the overhead and payload data is dictated by the data formatting convention. Note that the formatted payload data may be separated from the formatted overhead data by filtering and/or demodulating the formatted data unit. As one of average skill in the art will appreciate, if filtering of the formatted data unit is used to extract the formatted payload data from the formatted overhead data, the data rate of the formatted payload data should be different from the rate of the formatted overhead data. For example, the formatted payload data may operate at 1 gigahertz while the formatted overhead data may operate at 100 megahertz.

The process then proceeds to Step 624 where the receiving entity deformats the formatted overhead using the data formatting convention. The deformatting of the formatted overhead data may be done by decoding the formatted overhead data utilizing multi-level decoding, pulse position demodulation, pulse amplitude demodulation, amplitude shift keying demodulation, phase shift keying demodulation, non-return to zero decoding, Manchester decoding, et cetera.

The deformatting of the overhead data may further include removing idle data from the overhead data and/or retrieving control data from the overhead data. The process then proceeds to Step 626 where the receiving entity within the micro-area network logically combines the retrieved overhead data and the retrieved payload data to recapture the data unit. As one of average skill in the art will appreciate, FIG. 30 illustrates a complimentary method of the formatting method of FIG. 24. In addition, the combination of FIGS. 24 and 30 are graphically represented via one example in FIG. 15. As one of average skill in the art will further appreciate, the overhead data and payload data may be encoded and/or modulated in a variety of ways to achieve the formatted data wherein the payload data is formatted based on encoding and/or modulation of the overhead data.

FIG. 31 illustrates a logic diagram of a method that begins processing at Step 630. At Step 630, a receiving entity within a micro-area network receives a formatted data unit that includes formatted overhead data, formatted datagram overhead data, and formatted datagram payload data. An example of the formatting of a datagram was illustrated in FIG. 22. The process then proceeds to Step 632 where the receiving entity deformats the formatted datagram payload data utilizing the formatted overhead data in accordance with a data formatting convention. The process then proceeds to Step 634 where the receiving entity deformats the formatted datagram overhead data using the data formatting convention. The process then proceeds to Step 636 where the receiving entity logically combines the retrieved overhead data, the retrieved datagram overhead data and the retrieved datagram payload data to produce a retrieved data unit. As previously mentioned with respect to FIGS. 22 and 27-29, the overhead data of a datagram, which includes a network layer packet embedded within a physical layer packet, the overhead section of the network layer and/or physical layer, may be processed in accordance with the general discussion provided with reference to FIGS. 27-29.

Alternatively, the overhead data of both the network layer packet and the physical layer packet may be processed serially in accordance with the description of FIGS. 27-29. For example, as shown in FIG. 29, the overhead section 612 may correspond to the physical layer overhead and the padding section 616 may be replaced with the network layer overhead. In this example, the overhead sections then would be modulated and/or encoded followed by the encoding and/or modulation of the payload data with respect to the encoded and/or modulated overhead data. One example of such dependent encoding and/or modulation was illustrated in FIG. 15.

FIG. 32 illustrates a logic diagram of a method for establishing a data transmission within a micro-area network utilizing a local protocol, which may be performed by the programmable interface 175 and/or the transmission control modules 234 or 272-276 as shown in FIGS. 6, 8 and 9. The process begins at Step 640 where the identity of a target entity within the micro-area network is determined. The identity of the target entity may be determined by receiving a data packet that includes a destination address. The destination address identifies directly or indirectly the target entity. The target entity would be directly addressed if it is the destination for the data transmission. The target entity is indirectly identified when it is required to perform a particular function upon a data unit and subsequently provided to the processed data to another device identified by the destination address. For example, if the micro-area network is within a network component, such as a switch, the target entity may perform a switching function upon the data and then provide the switched data to communication ports of the network component for subsequent transmission to one or more other networks.

An alternate method for identifying the target entity will be based on generating a data packet that includes the destination address where the target entity is either directly or indirectly addressed in accordance with the destination address. Note that if the target entity is the destination address, the micro-area network may be an end user system, DTE, et cetera.

The process then proceeds to Step 642 where transmission characteristics between the transmitting entity and the target entity are determined. The determination of the transmission characteristics will be further described with reference to FIG. 33. Once the transmission characteristics have been determined, the process proceeds to Step 644 where a transmission convention is determined based on the transmission characteristics. As one of average skill in the art will appreciate, Steps 642 and 644 may be done on a transmission-by-transmission basis such that they are calculated for each transmission, may be stored in a look-up table for obtaining this information for determining the particular transmission convention to be utilized, may be updated periodically during training periods within the micro-area network and/or any other means for obtaining data related to the transmission characteristics between two devices.

The process then proceeds to Step 646 where the transmission convention is provided to the target entity. The transmission convention may be provided in the overhead section of a packet as control data. Alternatively, the transmission convention may be looked-up by the target entity and/or provided by a supervisory module such as a transceiving control module. Further note that the transmission convention corresponds to the data formatting convention previously discussed.

The processing of FIG. 32 may further include having the transmitting entity wait for an acknowledge of receipt of the transmission convention from the target entity. When the acknowledgement is received within a predetermined period of time, the transmitting entity processes the data based on the transmission convention and transmits the data to the target entity in accordance with the transmission convention. This has been described in detail with reference to FIGS. 11-31. If the acknowledgment is not received within the predetermined time frame, the transmitting entity may resend the transmission convention to the target entity until an acknowledgment is received within a predetermined time period or a retry sequence has been exhausted. Still further, the transmitting entity, while awaiting an acknowledgment, may receive an error message from the target entity indicating that the data was not accurately received. As one of average skill in the art will appreciate, the use of acknowledgments within a micro-area network is dependent upon the presumed reliability of the transmissions within the micro-area network and the particular data convention (i.e., data formatting) used within the network. For example, if the data transmission is in accordance with an Ethernet based scheme, acknowledgments may not be used where if a TDMA full duplex communication concept is used, acknowledgments may be used.

FIG. 33 illustrates processing steps for determining the transmission characteristics as described in FIG. 32. The transmission characteristics may be determined in any one or more of the processing Steps 648-658. In addition, the transmission medium between the transmitting device and receiving device may be printed circuit board traces, twisted pairs, coaxial cable, and/or fiber optic connections.

At Step 648, the quantity of available transmission resources between the transmitting entity and target entities is determined. For example, if there are 16 connections between the transmitting entity and target entity and 4 are available, then the determination at Step 648 indicates that 4 resources are available. Note that the other 12 resources are used, or may be used, to support other communications within the micro-area network.

At Step 650, the desired data rate of the given transmission is determined. For example, if the transmission is a serial transmission, the data rate may range from 100 megahertz up to 10 gigahertz and beyond. At Step 652, the transmission distance between the transmitting entity and target entity is determined. As is generally understood in the art, the distance in which data has to traverse via a transmission medium affects the data rate or conversely the data rate limits the distance over which data may be traversed due to the transmission line characteristics of transmission mediums.

At Step 654, the encoding capabilities of the transmitting entity and target entity are determined. As previously mentioned, the encoding capabilities may include multi-level encoding, non-return to zero encoding, Manchester encoding, block encoding, nB/mB encoding where n<m, pulse position modulation, time division multiplexing, frequency division multiplexing, pulse amplitude modulation, amplitude shift keying, frequency shift keying, phase shift keying, quadrature phase shift keying, carrier sense multiple access, and/or any other type of data encoding and/or modulation.

At Step 656, a determination is made as to whether the target entity is a termination node or intermediate node of the data transmission. If the target entity is a termination node, this enables the overhead section of the original data unit to be replaced with addressing information for the target entity within the micro-area network and sufficient information for the target entity to process the data. If the target entity is an intermediate node, the overhead data of the original data unit to at least a degree must be maintained in order to allow the target entity to process the data and correctly forward the data to the next target entity and/or to an entity outside of the micro-area network.

At Step 658, the characteristics of the available transmission resources are determined. As one of average skill in the art will appreciate, the determinations made in Steps 648-658 may be done by utilizing a lookup table wherein the data was entered into the lookup table at initial configuration of the micro-area network, during periodic training sequences of the micro-area network and/or theoretical determinations.

Figure 34:
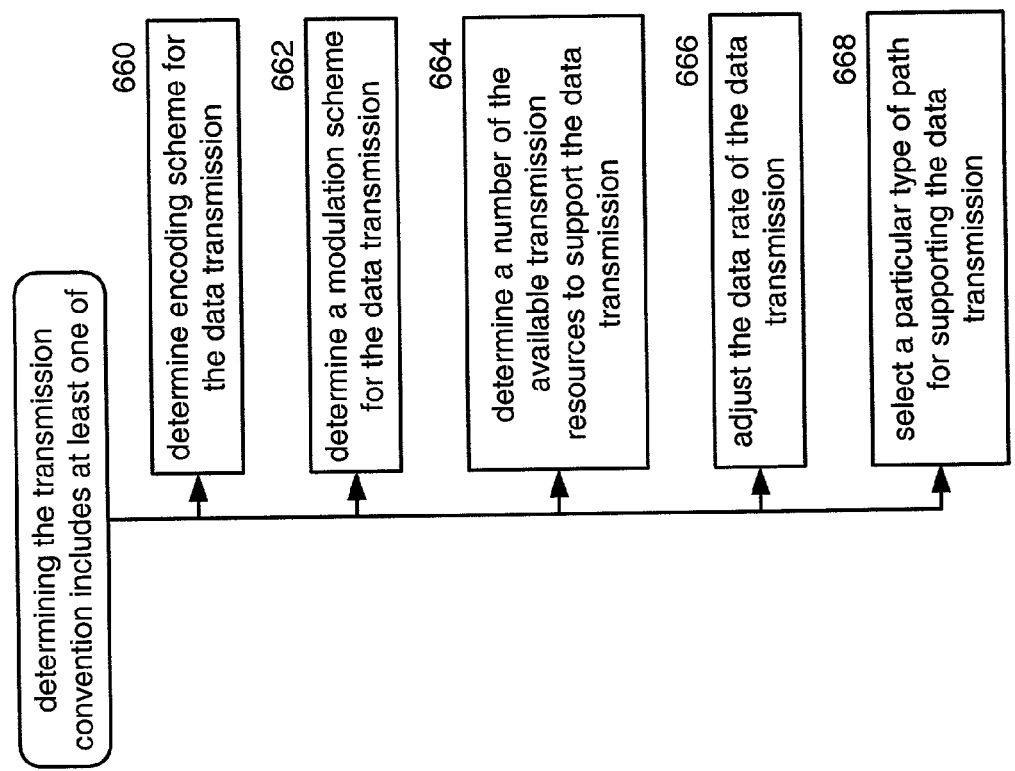

FIG. 34 illustrates various options for determining the transmission convention of FIG. 32. Steps 660-668 may be done independently or together to determine the transmission conventions. At Step 660, the encoding scheme for the data transmission is determined. The encoding scheme is based on the encoding capabilities of the transmitting and receiving entities as well as the other transmission characteristics. The encoding schemes include, but are not limited to, multi-level encoding, non-return to zero encoding, Manchester encoding, block encoding, nB/mB encoding where n<m.

At Step 662, a modulation scheme is determined for the transmission convention. This is based on again the capabilities of the transmitting and receiving entities as well as the transmission characteristics and available resources between the two entities. The modulation schemes include, but are not limited to, pulse position modulation, time division multiplexing, frequency division multiplexing, pulse amplitude modulation, amplitude shift keying, frequency shift keying, phase shift keying, quadrature phase shift keying, and/or carrier sense multiple access.

At Step 664, a number of the available transmission resources are determined to support the data transmission. For example, if the desired transmission rate is 10 gigabits per second, and 4 resources are available, the controlling entity may determine to use the 4 resources at 3.125 gigabits per second to achieve the 10-gigabit rate. When multiple paths are used to transmit serial data, a bonding convention must be utilized to ensure that the data is reconstructed in the proper sequence. Such bonding techniques for 3.125 gigabits per second data is known, thus no further discussion will be presented except to further illustrate the concepts of the present invention. Another factor for determining the number of transmission resources to utilize includes the data rate for the given transmission, the transmission distance between the transmitting entity and target entity, and the particular type of path supporting the transmission.

At Step 666, the data rate of the data transmission may be adjusted to facilitate the data transmission. For example, as previously mentioned with reference to FIG. 29, the overhead data may have its data rate adjusted to better facilitate a simultaneous transmission of overhead and payload data. Alternatively, the transmission medium between the transmitting entity and receiving entity may support a higher data rate than the original transmission such that the rate may be adjusted up. Alternatively, the available transmission mediums between the transmitting and receiving entities may not support the desired transmission rate thus may be required to be adjusted downward. The determination of the transmission conventions may be done on-the-fly for each data transmission and/or may be done by accessing a lookup table to determine one or more of the items listed in Steps 660-668.

Figure 35:
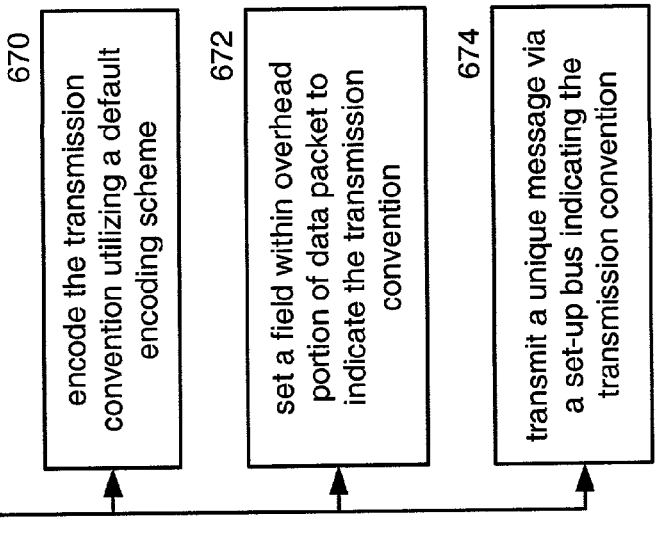

FIG. 35 illustrates a logic diagram of a method for providing the transmission convention to the target entity as generally described in Step 646 of FIG. 32. Steps 670-674 may be used separately or in any combination to provide the transmission convention.

At Step 670, the transmission convention is encoded utilizing a default-encoding scheme. Such a default encoding scheme may include transmitting raw data or utilizing a particular encoding scheme that has been designed as a default-encoding scheme. For example, a multi-level encoding may be designated as a default-encoding scheme for overhead data and non-return to zero may be designated as a default-encoding scheme for payload data.

At Step 672, a field within the overhead data section of a data packet may be set to indicate the particular transmission convention. For example, the various types of transmission conventions may be stored in a lookup table wherein the field would include the particular address corresponding to the particular transmission convention to be utilized.

At Step 674, a separate and unique message may be transmitted via a setup bus to indicate the particular transmission convention. For example, the micro-area network may include a control bus that allows for control data to be transmitted amongst the entities within the micro-area network. Utilizing this control bus, the transmitting entity may inform the receiving entity of the particular transmission convention to be used.

FIG. 36 illustrates a logic diagram of a method for a transceive control module (e.g., transceive control module 234 or 272-276) to establish a data transmission convention within a micro-area network. The process begins at Step 680 where a pending data transmission between a transmitting entity and target entity within the micro-area network is identified. The pending data transmission may be identified by receiving an indication from the transmitting entity and/or receiving a data packet from a source external to the network, interpreting the packet to identify the transmitting entity, and/or receiving an indication from the transmitting entity of the pending transmission.

The process then proceeds to Step 682 where the transmission characteristics between the transmitting entity and target entity are determined. This may be done as previously discussed with reference to FIG. 33.

The process then proceeds to Step 684 where a transmission convention is determined based on the transmission characteristics. This has been previously discussed with reference to FIG. 34. The process then proceeds to Step 686 where the transmission convention is provided to the transmitting entity and target entity. This was previously discussed with reference to FIG. 35.

FIG. 37 illustrates a logic diagram for a transmitting entity within a micro-area network to establish a data transmission. The process begins at Step 690 where the transmitting entity identifies a target entity regarding the data transmission. The process then proceeds to Step 692 where the transmitting entity, via the programmable interface, determines the bandwidth of the data transmission. The bandwidth of the data transmission may be determined by identifying transmission bandwidth capabilities of the transmitting entity and identifying reception bandwidth capabilities of the target entity. The bandwidth capabilities correspond to the number of connections between the two entities, the distance between the two entities, and the type of connection between the two entities. The bandwidth of each connection between the two entities corresponds to the number of bits per second the connection can reliably support.

The process then proceeds to Step 694 where the transmitting entity determines the number of transmission resources to utilize for the data transmission based on the bandwidth of the data transmission and a transmission convention. The determination of the transmission convention may be done in a variety of ways including determining a unique transmission convention for this particular transmission, utilizing a standard transmission convention for the network and/or utilizing a standard transmission convention for this particular transmitting entity.

The number of resources to utilize for the data transmission may be determined by determining the characteristics of the transmission resources between the transmitting entity and target entity and optimizing the transmission convention based on the characteristics of the transmission resources. For example, based on the number of resources available and their characteristics, the transmission convention (i.e., the transmission format convention, as previously described with reference to FIGS. 11-31), may be optimized. Accordingly, if the characteristics of the transmission convention support serial high-speed connections, the transmission convention may be selected to merely pass network data packets at the high rate without alternations. Conversely, if the characteristics of the transmission resources indicate that the rate at which the data is to be transmitted cannot be achieved, then multi-level encoding and/or dependent encoding as previously described with reference to FIGS. 11-30 may be utilized to improve the data throughput of the network component.

The process then proceeds to Step 696 where the number of transmission resources is accessed by the transmitting entity to transmit the data to the target entity. This may be done by utilizing a carrier sense multiple access protocol, a TDM access protocol, a token ring access protocol and/or a frequency division multiplexing protocol.

FIG. 38 illustrates a logic diagram for a transceive control module to establish a data transmission within a micro-area network. The processing begins at Step 700 where the identity of a transmitting entity and target entity regarding a data transmission are identified. The process then proceeds to Step 702 where the bandwidth of the data transmission is determined. This may be done by identifying the transmission bandwidth capabilities of the transmitting entity and the reception bandwidth capabilities of the target entity.

The process then proceeds to Step 704 where the transceive control module determines the number of transmission resources for the data transmission based on the bandwidth requirements of the data transmission and a transmission convention. This may be done by utilizing a standard transmission convention for the transmitting entity, utilizing a standard transmission convention for the overall network, and/or establishing a unique transmission convention for this particular data transmission. The transmission convention may be further optimized based on the characteristics of the transmission resources.

The process then proceeds to Step 706 where the number of transmission resources are accessed for transmitting the data from the transmit entity to the target entity. Access may be done in a TDMA fashion, FDMA fashion, token ring fashion, slotted ring fashion, and CSMA fashion, CSMA with collision avoidance CSMA with collision detection and/or any other method for obtaining access to a shared bus.

FIG. 39 illustrates a logic diagram of a method for establishing a data transmission within a micro-area network that includes a plurality of entities. The process begins at Step 710 where a transceive control module establishes configuration communications between a transmitting entity and a target entity. This may be done by one or more of: transmitting test data from the transmitting entity to the target entity at various data rates over various bandwidths; transmitting test data over each connection between the transmitting entity and target entity; transmitting test data from the transmitting entity to the target entity using various encoding schemes; and/or transmitting test data from the transmitting entity to the target entity using various modulation schemes.

The process then proceeds to Step 712 where, based on the configuration communications between the transmitting entity and target entity, the transmission characteristics for the various connections, bandwidths, data rates, encoding schemes, and/or modulation schemes are determined as transmission characteristics. The process then proceeds to Step 714 where at least one transmission convention is determined based on the transmission characteristics. The process then proceeds to Step 716 where the at least one transmission convention is maintained in a lookup table by the transmitting and target entities and/or a transceive control module.

Figure 41:
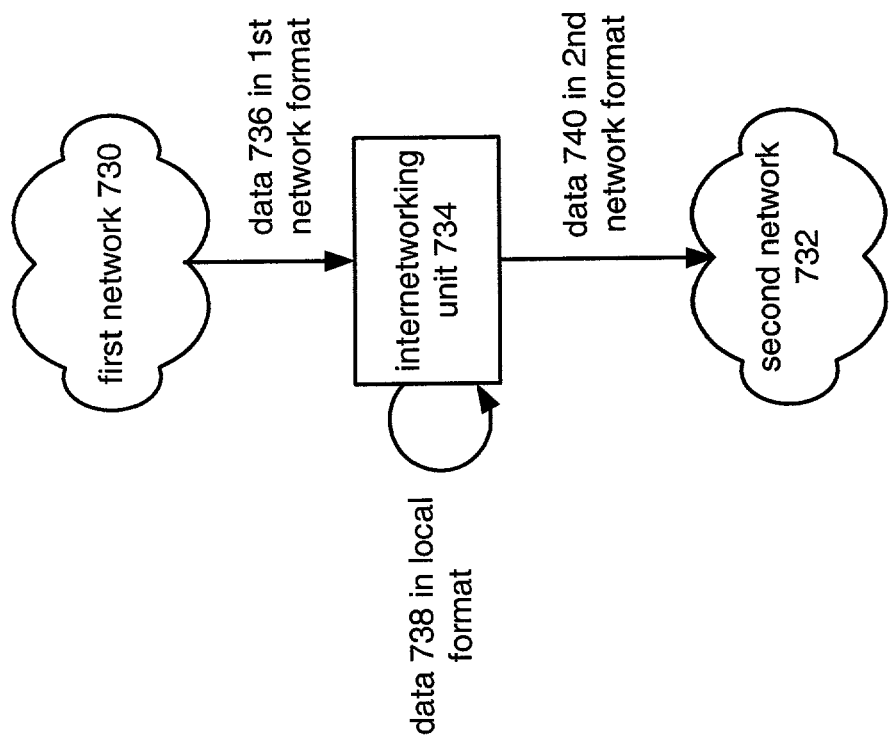
FIG. 41 illustrates a schematic block diagram of an internetworking unit processing data in accordance with the present invention.
Figure 40:
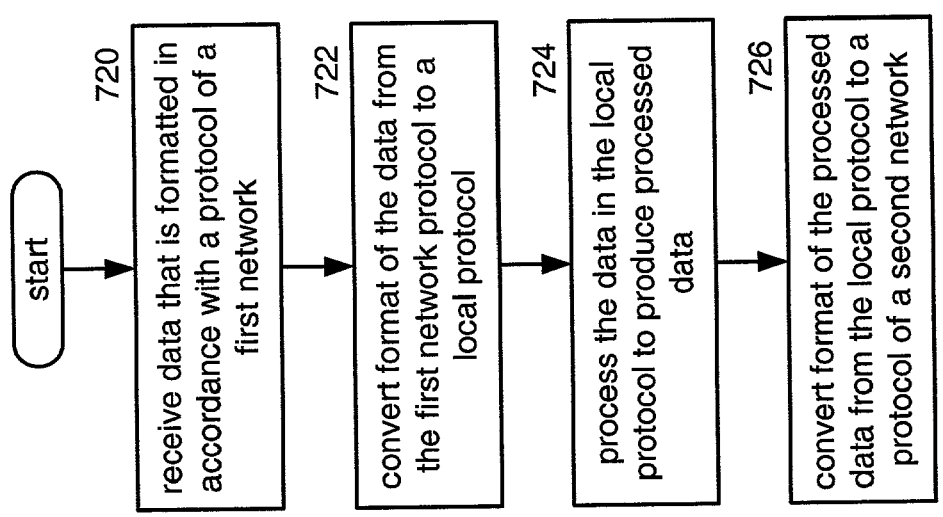
FIG. 40 illustrates a logic diagram of a method for processing data within a micro-area network in accordance with the present invention.

FIG. 40 illustrates a logic diagram of a method for transceiving data within an internetworking unit. The process begins at Step 720 where the internetworking unit receives data that is formatted in accordance with the protocol of a $1^{st}$ network. With reference to FIG. 41, an internetworking unit 734 is operably coupled to a $1^{st}$ network 730 and a $2^{nd}$ network 732. The $1^{st}$ and $2^{nd}$ networks may be local area networks and/or wide area networks. The internetworking unit 734 may be a gateway, bridge, router, switch, DTE, and/or any other device that couples networks together and that routes data, bridges data and/or switches data between the networks. The data 736 transmitted from the $1^{st}$ network 730 to the internetworking unit 734 is formatted in accordance with the network protocol of the $1^{st}$ network. For example, the $1^{st}$ network 730 may utilize a token ring concept, CSMA with collision avoidance, CSMA with collision detection, slotted ring, et cetera. The $2^{nd}$ network 732, processes data 740 in accordance with a $2^{nd}$ network protocol. The $2^{nd}$ network protocol may be CSMA with collision avoidance, CSMA with collision detection, token ring, slotted ring, TDMA, et cetera.

As illustrated in FIG. 41, the internetworking unit 734 receives data 736 in the $1^{st}$ network format and converts it into data 738 that is formatted in accordance with a local format. The internal processing performed by the internetworking unit 734 on data 738 is done within the local format. Once the data is processed and ready to be transmitted to the $2^{nd}$ network 732, the internetworking unit 734 converts the data 738 into data 740 that is formatted in accordance with the $2^{nd}$ network format.

Returning to the logic diagram of FIG. 40, the process proceeds to Step 722 where the internetworking unit converts the format of the data from the $1^{st}$ network protocol to a local protocol. This may be done by formatting the payload data of the receive data using a $1^{st}$ transmission format convention and formatting the overhead data using a $2^{nd}$ transmission format convention. This was discussed previously with reference to FIGS. 11-31. The process then proceeds to Step 724 where the data is processed in the local protocol to produce processed data. The particular processing performed by the internetworking unit will depend on the type of internetworking unit. For example, if the internetworking unit is a switch, the processing will be in accordance with setting up links within a switch matrix. If the internetworking unit is a router, the processing will be a routing function, et cetera. The process then proceeds to Step 726 where the format of the processed data is converted from the local protocol to the protocol of a $2^{nd}$ network for transmission to the $2^{nd}$ network.

The preceding discussion has presented a method and apparatus for transceiving data within a micro-area network (e.g., an internetworking unit, DTE, end user system, et cetera) to improve data throughput. By manipulating the overhead data to reduce the time for transmission of the overhead data more time is made available for transmitting the payload data. As such, the data throughput is improved. In addition, various techniques may be utilized for modifying the overhead data based on the transmission characteristics of communication paths between transceiving entities within the micro-area network as well as the number of resources available for each communication. As one of average skill in the art will appreciate, other embodiments may be derived from the teaching of the present invention without deviating from the scope of the claims.

What is claimed is:

1. A method for transmitting entity of a plurality of entities within a network to establish a data transmission within the network, the method comprises:

determining identity of a target entity of the plurality of entities;

determining transmission characteristics between the transmitting entity and the target entity, the transmission characteristics comprising network layer overhead data and physical layer overhead data;

determining a transmission convention based on the transmission characteristics;

combining data from two or more portions of a data packet into a single portion, the single portion containing less data than the two or more portions combined to reduce an amount of data transmitted in the data transmission and the two or more portions comprising network layer overhead data and physical layer overhead data;

providing the transmission convention to the target entity; and wherein the transmission convention is selected in response to the determined transmission characteristics of a transmission path between the transmitting entity and the target entity prior to the data transmission and wherein the transmission path between the transmitting entity and the target entity is a portion of a micro-area network.

2. The method of claim 1 further comprises:

awaiting an acknowledgement of receipt of the transmission convention from the target entity;

when the acknowledgement is received within a predetermined time frame, processing data based on the transmission convention to produce transmit data; and transmitting the transmit data to the target entity in accordance with the transmission convention.

3. The method of claim 2 further comprises:

when the acknowledgement is not received within the predetermined time frame, resending the transmission convention to the target entity until the acknowledgement is received within the predetermined time frame or a retry sequence has been exhausted.

4. The method of claim 2 further comprises at least one of:

awaiting an acknowledgement of receipt of the transmit data; and receiving an error message from the target entity that the transmit data was not accurately received.

5. The method of claim 1, wherein the determining the identity of the target entity further comprises:

receiving a data packet that includes a destination address, wherein the destination address directly or indirectly identifies the target entity.

6. The method of claim 1, wherein the determining the identity of the target entity further comprises:

generating a data packet that includes a destination address, wherein the destination address directly or indirectly identifies the target entity.

7. The method of claim 1, wherein the determining the transmission characteristics further comprises, for a given data transmission from the transmitting entity to the target entity, at least one of:

determining transmission resources available between the transmitting and target entities to produce available transmission resources;

determining desired data rate of the given data transmission;

determining transmission distance between the transmitting entity and the target entity;

determining encoding capabilities of the transmitting entity and of the target entity;

determining whether the target entity is a termination node or an intermediate node for the given data transmission; and determining characteristics of the available transmission resources.

8. The method of claim 7, wherein the determining the transmission convention further comprises at least one of:

determining encoding scheme for the given data transmission;

determining a modulation scheme for the given data transmission;

determining a number of the available transmission resources to support the given data transmission;

adjusting the data rate of the given data transmission; and selecting a particular type of path for supporting the given data transmission.

9. The method of claim 8, wherein the determining the encoding scheme comprises at least one of:

determining multilevel encoding for the given data transmission;

determining non return to zero (NRZ) encoding for the given data transmission;

determining Manchester encoding for the given data transmission;

determining block encoding for the given data transmission; and determining nB/mB encoding for the given data transmission, where n<m.

10. The method of claim 8, wherein the determining the modulation scheme further comprises at least one of:

determining pulse position modulation (PPM) for the given data transmission;

determining time division multiplexing (TDM) for the given data transmission;

determining frequency division multiplexing (FDM) for the given data transmission;

determining pulse amplitude modulation (PAM) for the given data transmission;

determining amplitude shift keying (ASK) for the given data transmission;

determining frequency shift keying (FSK) for the given data transmission;

determining phase shift keying (PSK) for the given data transmission;

determining quadrature phase shift keying (QPSK) for the given data transmission; and determining carrier sense multiple access for the given data transmission.

11. The method of claim 8, wherein the determining the number of the available transmission resources to support the given data transmission further comprises:

determining whether the given data transmission will be a serial transmission or a parallel transmission based, at least in part, on the data rate of the given data transmission, the transmission distance between the transmitting entity and the target entity, and the particular type of path for supporting the given data transmission.

12. The method of claim 1, wherein the determining the transmission characteristics further comprises, for a given data transmission:

accessing a look-up table to obtain at least one of:

transmission resources available between the transmitting and target entities to produce available transmission resources, desired data rate of the given data transmission, transmission distance between the transmitting entity and the target entity, encoding capabilities of the transmitting entity and of the target entity, and characteristics of the available transmission resources.

13. The method of claim 1, wherein the determining the transmission convention further comprises, for a given data transmission:

accessing a look-up table to obtain at least one of:

encoding scheme for the given data transmission,

MODULATION SCHEME FOR THE GIVEN DATA TRANSMISSION, number of the available transmission resources to support the given data transmission, desired data rate of the given data transmission, and particular type of path for supporting the given data transmission.

14. The method of claim 1, wherein the providing the transmission convention further comprises at least one of:

encoding the transmission convention utilizing a default encoding scheme to produce encoding transmission convention;

setting a field within overhead portion of data packet to indicate the transmission convention; and transmitting a unique message via a set-up bus indicating the transmission convention.

15. A method for establishing a data transmission within a network that includes a plurality of entities, the method comprises:

identifying a pending data transmission between a transmitting entity of the plurality of entities and a target entity of the plurality of entities;

determining transmission characteristics between the transmitting entity and the target entity, the transmission characteristics comprising network layer overhead data and physical layer overhead data;

determining a transmission convention based on the transmission characteristics;

combining data from two or more portions of a data packet into a single portion, the single portion containing less data than the two or more portions combined to reduce an amount of data transmitted in the data transmission and the two or more portions comprising network layer overhead data and physical layer overhead data;

providing the transmission convention to the transmitting entity and the target entity; and wherein the transmission convention is selected in response to the determined transmission characteristics of a transmission path between the transmitting entity and the target entity prior to the data transmission and wherein the path is a portion of a micro-area network.

16. The method of claim 15, wherein the identifying a pending data transmission further comprises:

receiving an indication from the transmitting entity.

17. The method of claim 15, wherein the identifying a pending data transmission further comprises:

receiving a data packet relating to the data transmission from a source external to the network;

interpreting the data packet to identify the transmitting entity for initial receipt of the data packet within the network; and receiving an indication from the transmitting entity of the data transmission with the target entity.

18. The method of claim 15, wherein the determining the transmission characteristics further comprises at least one of:
- determining transmission resources available between the transmitting and target entities to produce available transmission resources;
- determining desired data rate of the given data transmission;
- determining transmission distance between the transmitting entity and the target entity;
- determining encoding capabilities of the transmitting entity and of the target entity;
- determining whether the target entity is a termination node or an intermediate node for the given data transmission; and
- determining characteristics of the available transmission resources.

19. The method of claim 18, wherein the determining the transmission convention further comprises at least one of:
- determining encoding scheme for the data transmission;
- determining a modulation scheme for the data transmission;
- determining a number of the available transmission resources to support the data transmission;
- adjusting the data rate of the data transmission; and
- selecting a particular type of path for supporting the data transmission.

20. The method of claim 15, wherein the determining the transmission characteristics further comprises:
- accessing a look-up table to obtain at least one of:
  - transmission resources available between the transmitting and target entities to produce available transmission resources,
  - desired data rate of the given data transmission, transmission distance between the transmitting entity and the target entity,
  - encoding capabilities of the transmitting entity and of the target entity, and
  - characteristics of the available transmission resources.

21. The method of claim 15, wherein the determining the transmission convention further comprises:
- accessing a look-up table to obtain at least one of:
  - encoding scheme for the given data transmission,
  - modulation scheme for the given data transmission,
  - number of the available transmission resources to support the given data transmission,
  - desired data rate of the given data transmission, and
  - particular type of path for supporting the given data transmission.

22. The method of claim 15, wherein the providing the transmission convention further comprises at least one of:
- encoding the transmission convention utilizing a default encoding scheme to produce encoding transmission convention;
- transmitting a unique message via a set-up bus indicating the transmission convention.

23. A method for establishing a data transmission within a network that includes a plurality of entities, the method comprises:
- establishing configuration communication between a transmitting entity and a target entity of the plurality of entities;
- determining transmission characteristics between the transmitting entity and the target entity, the transmission characteristics comprising network layer overhead data and physical layer overhead data;
- determining at least one transmission convention based on the transmission characteristics;
- combining data from two or more portions of a data packet into a single portion, the single portion containing less data than the two or more portions combined to reduce an amount of data transmitted in the data transmission and the two or more portions comprising network layer overhead data and physical layer overhead data;
- maintaining the at least one transmission convention by the transmitting and target entities; and
- wherein the at least one transmission convention is selected in response to the determined transmission characteristics of a transmission path between the transmitting entity and the target entity prior to the data transmission and wherein the transmission path between the transmitting entity and the target entity is a portion of a micro-area network.

24. The method of claim 23, wherein the establishing configuration communication further comprises at least one of:
- transmitting test data from the transmitting entity to the target entity at varying bandwidths;
- transmitting test data over each connection between the transmitting entity and the target entity;
- transmitting test data from the transmitting entity to the target entity using various encoding schemes; and
- transmitting test data from the transmitting entity to the target entity using various modulation schemes.

25. The method of claim 24 further comprises:
- deriving a table of transmission conventions based on at least one of: the varying bandwidths, characteristics of each connection, the various encoding schemes, and the various modulation schemes.

26. The method of claim 25, wherein the determining the at least one transmission convention further comprises:
- selecting the at least one transmission convention based on at least one of: available connections between the transmitting entity and the target entity, bandwidth of data, and characteristics of the available connections.

27. A transmitting entity within a network comprises:
processing module; and
memory operably coupled to the processing module, wherein the memory includes operational instructions that cause the processing module to establish a data transmission within the network by:
- determining identity of a target entity of the plurality of entities;
- determining transmission characteristics between the transmitting entity and the target entity, the transmission characteristics comprising network layer overhead data and physical layer overhead data;
- determining a transmission convention based on the transmission characteristics;
- combining data from two or more portions of a data packet into a single portion, the single portion containing less data than the two or more portions combined to reduce an amount of data transmitted in the data transmission;
- providing the transmission convention to the target entity; and
- wherein the transmission convention is selected in response to the determined transmission characteristics of a transmission path between the transmitting entity and the target entity prior to the data transmission and wherein the transmission path between the transmitting entity and the target entity is a portion of a micro-area network.

28. The transmitting entity of claim 27, wherein the memory further comprises operational instructions that cause the processing module to:

await an acknowledgement of receipt of the transmission convention from the target entity;

when the acknowledgement is received within a predetermined time frame, process data based on the transmission convention to produce transmit data; and transmit the transmit data to the target entity in accordance with the transmission convention.

29. The transmitting entity of claim 27, wherein the memory further comprises operational instructions that cause the processing module to determine the identity of the target entity by:

receiving a data packet that includes a destination address, wherein the destination address directly or indirectly identifies the target entity.

30. The transmitting entity of claim 27, wherein the memory further comprises operational instructions that cause the processing module to determine the identity of the target entity by:

generating a data packet that includes a destination address, wherein the destination address directly or indirectly identifies the target entity.

31. The transmitting entity of claim 27, wherein the memory further comprises operational instructions that cause the processing module to determine the transmission characteristics, for a given data transmission from the transmitting entity to the target entity, by at least one of:

determining transmission resources available between the transmitting and target entities to produce available transmission resources;

determining desired data rate of the given data transmission;

determining transmission distance between the transmitting entity and the target entity;

determining encoding capabilities of the transmitting entity and of the target entity;

determining whether the target entity is a termination node or an intermediate node for the given data transmission; and determining characteristics of the available transmission resources.

32. The transmitting entity of claim 31, wherein the memory further comprises operational instructions that cause the processing module to determine the transmission convention by at least one of:

determining encoding scheme for the given data transmission;

determining a modulation scheme for the given data transmission;

determining a number of the available transmission resources to support the given data transmission;

adjusting the data rate of the given data transmission; and selecting a particular type of path for supporting the given data transmission.

33. The transmitting entity of claim 27, wherein the memory further comprises operational instructions that cause the processing module to determine the transmission characteristics for a given data transmission by:

accessing a look-up table to obtain at least one of:

transmission resources available between the transmitting and target entities to produce available transmission resources, desired data rate of the given data transmission, transmission distance between the transmitting entity and the target entity, encoding capabilities of the transmitting entity and of the target entity, and characteristics of the available transmission resources.

34. The transmitting entity of claim 27, wherein the memory further comprises operational instructions that cause the processing module to determine the transmission convention for a given data transmission by:

accessing a look-up table to obtain at least one of:

encoding scheme for the given data transmission, modulation scheme for the given data transmission, number of the available transmission resources to support the given data transmission, desired data rate of the given data transmission, and particular type of path for supporting the given data transmission.

35. The transmitting entity of claim 27, wherein the memory further comprises operational instructions that cause the processing module to provide the transmission convention by at least one of:

encoding the transmission convention utilizing a default encoding scheme to produce encoding transmission convention;

setting a field within overhead portion of data packet to indicate the transmission convention; and transmitting a unique message via a set-up bus indicating the transmission convention.

36. An apparatus for establishing a data transmission within a network that includes a plurality of entities, the apparatus comprises:

processing module; and memory operably coupled to the processing module, wherein the memory includes operational instructions that cause the processing module to:

identify a pending data transmission between a transmitting entity of the plurality of entities and a target entity of the plurality of entities;

determine transmission characteristics between the transmitting entity and the target entity, the transmission characteristics comprising network layer overhead data and physical layer overhead data;

determine a transmission convention based on the transmission characteristics;

combine data from two or more portions of a data packet into a single portion, the single portion containing less data than the two or more portions combined to reduce an amount of data to be transmitted in the pending data transmission and the two or more portions comprising network layer overhead data and physical layer overhead data;

provide the transmission convention to the transmitting entity and the target entity; and wherein the transmission convention is selected in response to the determined transmission characteristics of a transmission path between the transmitting entity and the target entity prior to the data transmission and wherein the transmission path between the transmitting entity and the target entity is a portion of a micro-area network.

37. The apparatus of claim 36, wherein the memory further comprises operational instructions that cause the processing module to identify a pending data transmission by:

receiving an indication from the transmitting entity.

38. The apparatus of claim 36, wherein the memory further comprises operational instructions that cause the processing module to identify a pending data transmission by:

receiving a data packet relating to the data transmission from a source external to the network;

interpreting the data packet to identify the transmitting entity for initial receipt of the data packet within the network; and receiving an indication from the transmitting entity of the data transmission with the target entity.

39. The apparatus of claim 36, wherein the memory further comprises operational instructions that cause the processing module to determine the transmission characteristics by at least one of:
  determining transmission resources available between the transmitting and target entities to produce available transmission resources;
  determining desired data rate of the given data transmission;
  determining transmission distance between the transmitting entity and the target entity;
  determining encoding capabilities of the transmitting entity and of the target entity;
  determining whether the target entity is a termination node or an intermediate node for the given data transmission; and
  determining characteristics of the available transmission resources.

40. The apparatus of claim 39, wherein the memory further comprises operational instructions that cause the processing module to determine the transmission convention by at least one of:
  determining encoding scheme for the data transmission;
  determining a modulation scheme for the data transmission;
  determining a number of the available transmission resources to support the data transmission;
  adjusting the data rate of the data transmission; and
  selecting a particular type of path for supporting the data transmission.

41. The apparatus of claim 36, wherein the memory further comprises operational instructions that cause the processing module to determine the transmission characteristics by:
  accessing a look-up table to obtain at least one of:
    transmission resources available between the transmitting and target entities to produce available transmission resources,
    desired data rate of the given data transmission, transmission distance between the transmitting entity and the target entity,
    encoding capabilities of the transmitting entity and of the target entity, and
    characteristics of the available transmission resources.

42. The apparatus of claim 36, wherein the memory further comprises operational instructions that cause the processing module to determine the transmission convention by:
  accessing a look-up table to obtain at least one of:
    encoding scheme for the given data transmission,
    modulation scheme for the given data transmission,
    number of the available transmission resources to support the given data transmission,
    desired data rate of the given data transmission, and
    particular type of path for supporting the given data transmission.

43. The apparatus of claim 36, wherein the memory further comprises operational instructions that cause the processing module to provide the transmission convention by at least one of:
  encoding the transmission convention utilizing a default encoding scheme to produce encoding transmission convention;
  transmitting a unique message via a set-up bus indicating the transmission convention.

44. An apparatus for establishing a data transmission within a network that includes a plurality of entities, the apparatus comprises:
  processing module; and
  memory operably coupled to the processing module, wherein the memory includes operational instructions that cause the processing module to:
    establish configuration communication between a transmitting entity and a target entity of the plurality of entities;
    determine transmission characteristics between the transmitting entity and the target entity, the transmission characteristics comprising network layer overhead data and physical layer overhead data;
    determine at least one transmission convention based on the transmission characteristics;
    combine data from two or more portions of a data packet into a single portion, the single portion containing less data than the two or more portions combined to reduce an amount of data transmitted in the data transmission and the two or more portions comprising network layer overhead data and physical layer overhead data;
    maintain the at least one transmission convention by the transmitting and target entities; and
    wherein the at least one transmission convention is selected in response to the determined transmission characteristics of a transmission path between the transmitting entity and the target entity prior to the data transmission and wherein the transmission path between the transmitting entity and the target entity is a portion of a micro-area network.

45. The apparatus of claim 44, wherein the memory further comprises operational instructions that cause the processing module to establish configuration communication by at least one of:
  transmitting test data from the transmitting entity to the target entity at varying bandwidths;
  transmitting test data over each connection between the transmitting entity and the target entity;
  transmitting test data from the transmitting entity to the target entity using various encoding schemes; and
  transmitting test data from the transmitting entity to the target entity using various modulation schemes.

46. The apparatus of claim 45, wherein the memory further comprises operational instructions that cause the processing module to:
  derive a table of transmission conventions based on at least one of: the varying bandwidths, characteristics of each connection, the various encoding schemes, and the various modulation schemes.

47. The apparatus of claim 46, wherein the memory further comprises operational instructions that cause the processing module to determine the at least one transmission convention by:
  selecting the at least one transmission convention based on at least one of: available connections between the transmitting entity and the target entity, bandwidth of data, and characteristics of the available connections.

* * * * *